US012596494B2

(12) United States Patent
Fujiwara et al.

(10) Patent No.: US 12,596,494 B2
(45) Date of Patent: Apr. 7, 2026

(54) INTEGRATED CIRCUIT AND METHOD OF FORMING THE SAME

(71) Applicant: TAIWAN SEMICONDUCTOR MANUFACTURING COMPANY, LTD., Hsinchu (TW)

(72) Inventors: Hidehiro Fujiwara, Hsinchu (TW); Kao-Cheng Lin, Hsinchu (TW); Yen Lin Chung, Hsinchu (TW); Wei Min Chan, Hsinchu (TW); Yen-Huei Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 145 days.

(21) Appl. No.: 18/363,251

(22) Filed: Aug. 1, 2023

(65) Prior Publication Data

US 2024/0302980 A1 Sep. 12, 2024

Related U.S. Application Data

(60) Provisional application No. 63/489,083, filed on Mar. 8, 2023.

(51) Int. Cl.
*G11C 16/04* (2006.01)
*G06F 3/06* (2006.01)

(52) U.S. Cl.
CPC .......... *G06F 3/0638* (2013.01); *G06F 3/0604* (2013.01); *G06F 3/0679* (2013.01)

(58) Field of Classification Search
CPC ..... G06F 3/0638; G06F 3/0604; G06F 3/0679
See application file for complete search history.

(56) References Cited

U.S. PATENT DOCUMENTS

| | | | | |
|---|---|---|---|---|
| 5,285,421 | A * | 2/1994 | Young | G11C 7/103 |
| | | | | 365/230.03 |
| 6,269,017 | B1 * | 7/2001 | Lu | H10B 20/00 |
| | | | | 257/E27.102 |
| 2009/0237972 | A1 * | 9/2009 | Loeffler | G11C 5/14 |
| | | | | 365/230.03 |
| 2019/0273084 | A1 | 9/2019 | Wang | |
| 2021/0375883 | A1 | 12/2021 | Hsu et al. | |
| 2022/0199624 | A1 | 6/2022 | Huang et al. | |

* cited by examiner

*Primary Examiner* — Pho M Luu
(74) *Attorney, Agent, or Firm* — Hauptman Ham, LLP

(57) ABSTRACT

A memory cell array includes a first bank of memory cells, a second bank of memory cells adjacent to the first bank of memory cells, a first set of bit lines and a second set of bit lines. The first set of bit lines extend in a first direction, is coupled to the first bank of memory cells, and is on at least a first metal layer above a front-side of a substrate. The second set of bit lines extend in the first direction, is coupled to the second bank of memory cells, and is on at least a second metal layer below a back-side of the substrate opposite from the front-side of the substrate.

20 Claims, 27 Drawing Sheets

200A

200B

800

| 802 | Generate a layout design of an integrated circuit |
| --- | --- |

| 804 | Manufacture the integrated circuit based on the layout design |
| --- | --- |

INTEGRATED CIRCUIT AND METHOD OF FORMING THE SAME

PRIORITY CLAIM

This application claims the benefit of U.S. Provisional Application No. 63/489,083, filed Mar. 8, 2023, which is herein incorporated by reference in its entirety.

BACKGROUND

The semiconductor integrated circuit (IC) industry has produced a wide variety of digital devices to address issues in a number of different areas. Some of these digital devices, such as memory macros, are configured for the storage of data. As ICs have become smaller and more complex, the resistance of conductive lines within these digital devices is also changed affecting the operating voltages of these digital devices and overall IC performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
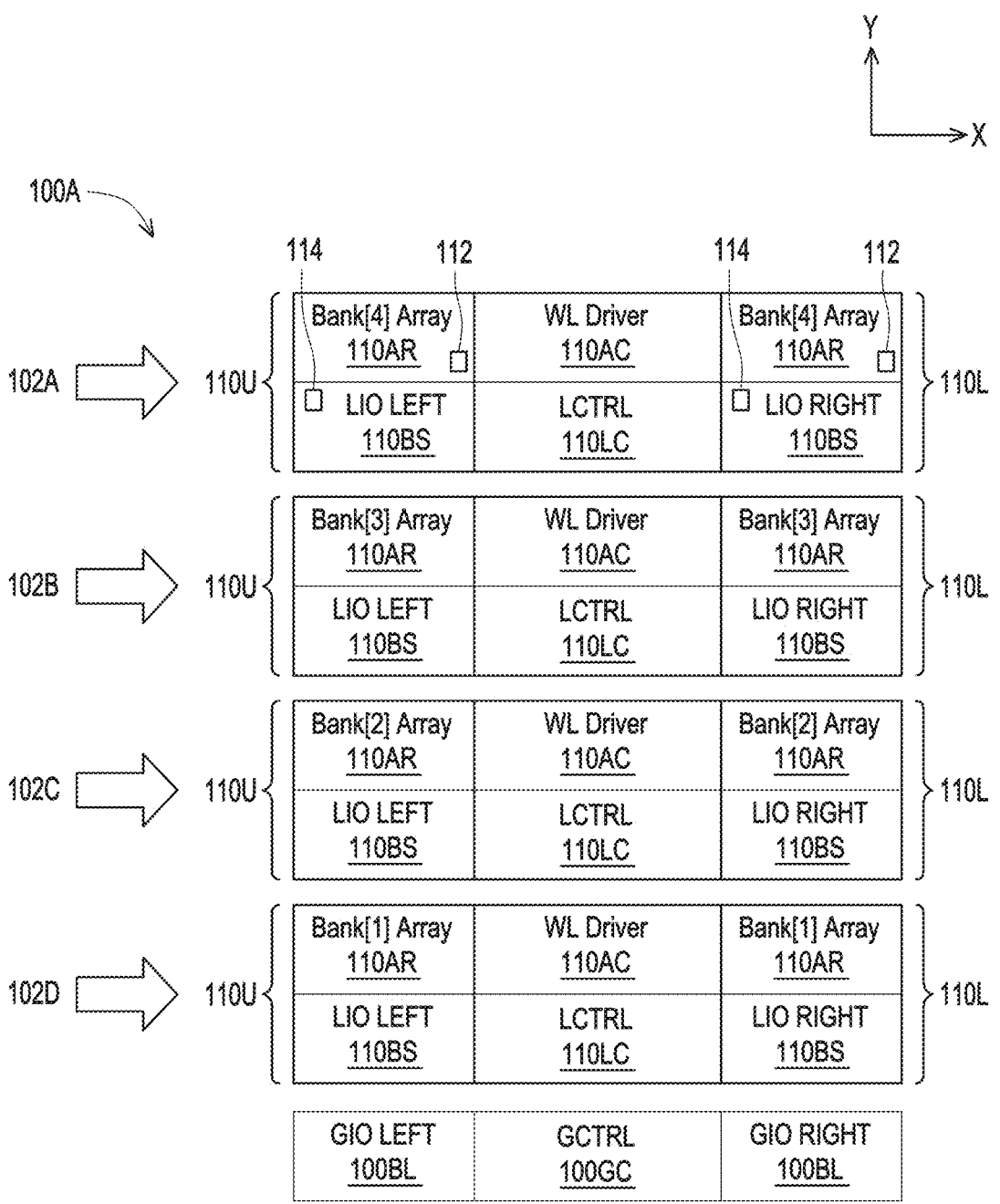
FIGS. 1A-1C are corresponding block diagrams of a corresponding memory circuit, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a memory cell array includes a first bank of memory cells and a second bank of memory cells. In some embodiments, the second bank of memory cells is adjacent to the first bank of memory cells.

In some embodiments, the memory cell array further includes a first set of bit lines extending in a first direction. In some embodiments, the first set of bit lines is coupled to the first bank of memory cells. In some embodiments, the first set of bit lines is on at least a first metal layer. In some embodiments, the first metal layer is above a front-side of a substrate.

In some embodiments, the memory cell array further includes a second set of bit lines extending in the first direction. In some embodiments, the second set of bit lines is coupled to the second bank of memory cells. In some embodiments, the second set of bit lines is on at least a second metal layer. In some embodiments, the second metal layer is below a back-side of the substrate. In some embodiments, the back-side of the substrate is opposite from the front-side of the substrate.

In some embodiments, by configuring one or more bit lines of the first set of bit lines on the front-side of the substrate, and by configuring one or more bit lines of the second set of bit lines on the back-side of the substrate thereby causes memory cell array to have reduced resistance capacitance (RC) loading compared to other approaches thereby causing the memory cell array to have increased speed and reduced power consumption than other approaches.

Figure 1B:
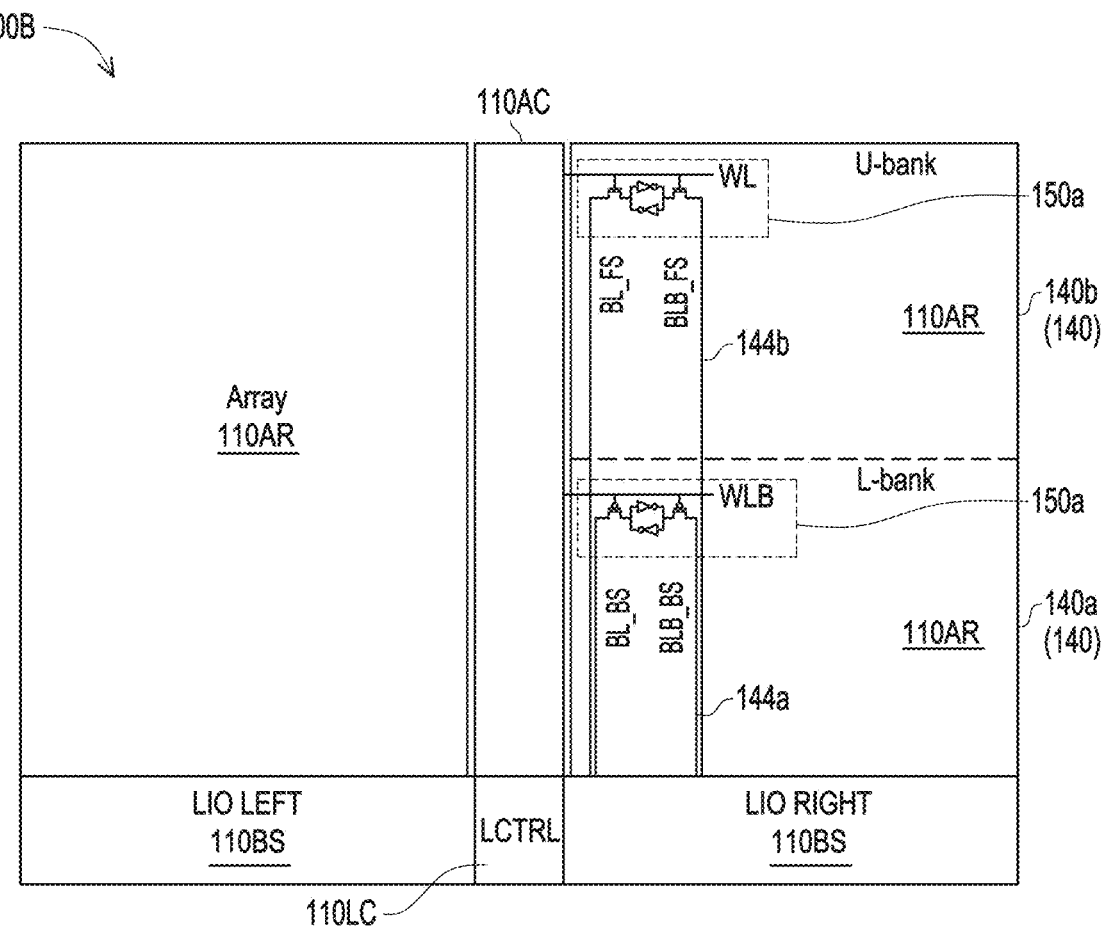
Figure 1C:
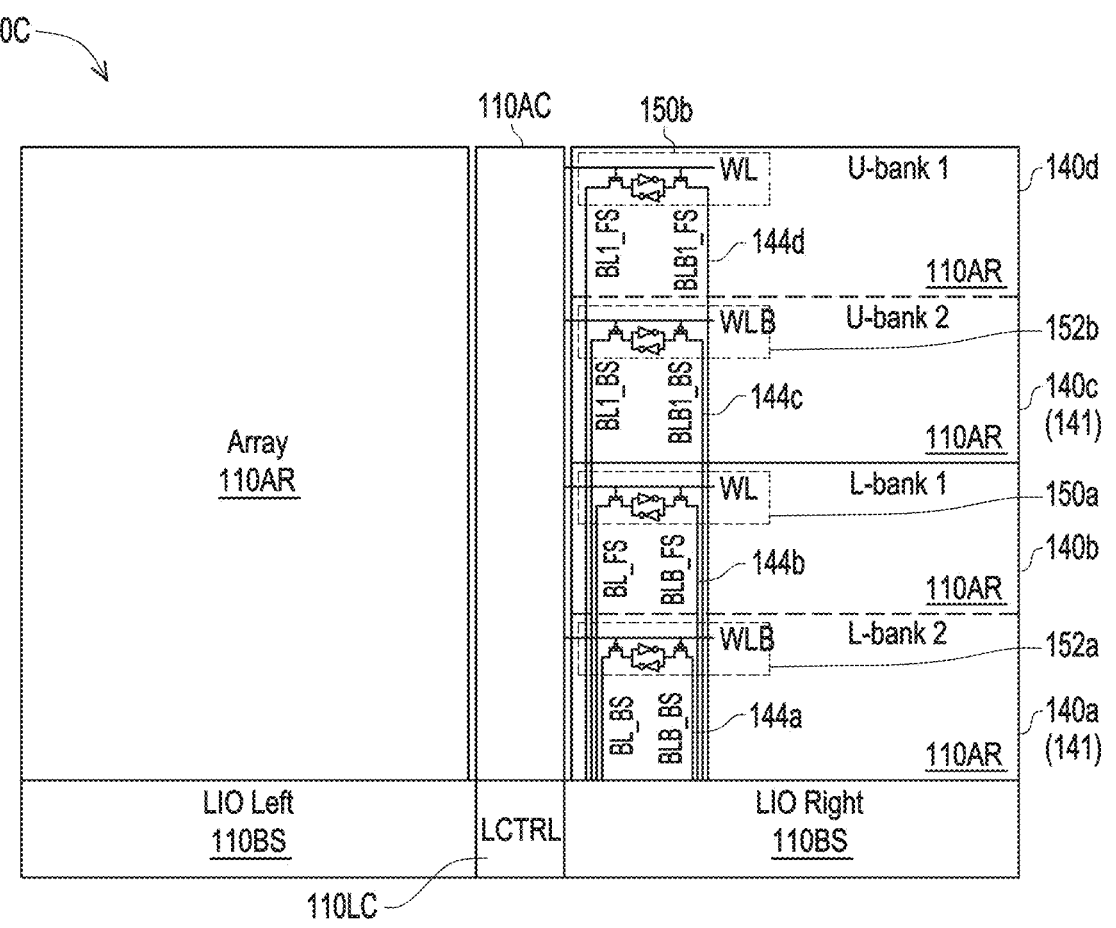

FIGS. 1A-1C are corresponding block diagrams of corresponding memory circuit 100A-100C, in accordance with some embodiments.

FIGS. 1A-1C are simplified for the purpose of illustration. In some embodiments, memory circuit 100A-100C include various elements in addition to those depicted in FIGS. 1A-1C or is otherwise arranged to perform the operations discussed below.

Memory circuit 100A is an IC that includes memory partitions 102A-102D, a global control circuit 100GC and global input output (GIO) circuits 100BL.

Each memory partition 102A-102D includes memory banks 110U and 110L adjacent to a word line (WL) driver circuit 110AC and a local control circuit 110LC. Each memory bank 110U and 110L includes a memory cell array 110AR and a local input output (LIO) circuit 110BS.

A memory partition, e.g., a memory partition 102A-102D, is a portion of memory circuit 100A that includes a subset of memory devices (not shown in FIGS. 1A-1C) and adjacent circuits configured to selectively access the subset of memory devices in program and read operations. In the FIG. 1A embodiment, memory circuit 100A includes a total of four partitions. In some embodiments, memory circuit 100A includes a total number of partitions greater or fewer than four.

GIO circuit 100BL is configured to control access to one or more electrical paths, e.g., bit lines, to each memory device of the corresponding memory bank 110U or 110L of each memory partition 102A-102D, e.g., by generating one or more bit line signals. In some embodiments, GIO circuit 100BL includes a global bit line driver circuit. In some embodiments, GIO circuit 100BL is coupled to each memory bank 110U and 110L by a corresponding global bit line (not shown).

Global control circuit 100GC is configured to control some or all of program and read operations on each memory partition 102A-102D, e.g., by generating and/or outputting one or more control and/or enable signals.

In some embodiments, global control circuit 100GC includes one or more analog circuits configured to interface with memory partitions 102A-102D, cause data to be programmed in one or more memory devices, and/or use data received from one or more memory devices in one or more circuit operations. In some embodiments, global control circuit 100GC includes one or more global address decoder or pre-decoder circuits configured to output one or more address signals to the WL driver circuit 110AC of each memory partition 102A-102D.

Each WL driver circuit 110AC is configured to generate word line signals on corresponding word lines WL. In some embodiments, each WL driver circuit 110AC is configured to output word line signals on corresponding word lines WL to the adjacent memory banks 110U and 110L of the corresponding memory partition 102A-102D.

Each local control circuit 110LC is an electronic circuit configured to receive one or more address signals. Each local control circuit 110LC is configured to generate signals corresponding to adjacent subsets of memory devices identified by the one or more address signals. In some embodiments, the adjacent subsets of memory devices correspond to columns of memory devices. In some embodiments, each local control circuit 110LC is configured to generate each signal as a complementary pair of signals. In some embodiments, each local control circuit 110LC is configured to output the signals to corresponding word line driver circuits within the adjacent WL driver circuit 110AC of the corresponding memory partition 102A-102D. In some embodiments, the local control circuit 110LC includes a bank decoder circuit.

Each LIO circuit 110BS is configured to selectively access one or more bit lines (shown in FIG. 2) coupled to adjacent subsets of memory devices of the corresponding memory cell array 110AR responsive to GIO circuit 100BL, e.g., based on one or more BL control signals. In some embodiments, the adjacent subsets of memory devices correspond to rows of memory devices. In some embodiments, the LIO circuit 110BS includes a bit line selection circuit.

Each LIO circuit 110BS includes one or more circuits 114. For ease of illustration, circuit 114 is not shown in memory bank 110U and 110L of memory partitions 102B, 102C and 102D. In some embodiments, each circuit 114 includes at least a sense amplifier circuit. In some embodiments, during a read operation, the sense amplifier circuit is configured to read data from at least one memory cell 112 in a corresponding column of memory cells in the corresponding memory cell array 110AR, in accordance with some embodiments. In some embodiments, each circuit 114 in LIO circuit 110BS is coupled to a corresponding column of memory devices 112 in memory cell array 110AR.

Each memory bank 110U and 110L includes the corresponding memory cell array 110AR including memory cells or memory devices 112 configured to be accessed in program and read operations by the adjacent LIO circuit 110BS and the adjacent WL driver circuit 110AC.

Each memory cell array 110AR includes an array of memory devices 112 having N rows and M columns, where M and N are positive integers. The rows of cells in memory cell array 102 are arranged in a first direction X. The columns of cells in memory cell array 102 are arranged in a second direction Y. The second direction Y is different from the first direction X. In some embodiments, the second direction Y is perpendicular to the first direction X. In some embodiments, each memory cell array 110AR is divided into an upper region and a lower region (not shown). In some embodiments, each column of memory devices 112 in memory cell array 110AR is coupled to a corresponding circuit 114 in LIO circuit 110BS.

Memory device 112 is shown in memory bank 110U and 110L of memory partition 102A. For ease of illustration, memory device 112 is not shown in memory bank 110U and 110L of memory partitions 102B, 102C and 102D.

Memory device 112 is an electrical, electromechanical, electromagnetic, or other device configured to store bit data represented by logical states. At least one logical state of memory device 112 is capable of being programmed in a write operation and detected in a read operation. In some embodiments, a logical state corresponds to a voltage level of an electrical charge stored in a given memory device 112. In some embodiments, a logical state corresponds to a physical property, e.g., a voltage, a current, a resistance or a magnetic orientation, of a component of a given memory device 112.

In some embodiments, memory device 112 includes one or more single port (SP) static random access memory (SRAM) cells. In some embodiments, memory device 112 includes one or more dual-port (DP) SRAM cells. In some embodiments, memory device 112 includes one or more multi-port SRAM cells. Different types of memory cells in memory device 112 are within the contemplated scope of the present disclosure. In some embodiments, memory device 112 includes one or more dynamic random access memory (DRAM) cells. In some embodiments, memory device 112 includes one or more one-time programmable (OTP) memory devices such as electronic fuse (eFuse) or anti-fuse devices, flash memory devices, random-access memory (RAM) devices, resistive RAM devices, ferroelectric RAM devices, magneto-resistive RAM devices, erasable programmable read only memory (EPROM) devices, electrically erasable programmable read only memory (EEPROM) devices, or the like. In some embodiments, memory device 112 is an OTP memory device including one or more OTP memory cells.

Other configurations of memory circuit 100A are within the scope of the present disclosure.

FIG. 1B is a block diagram of a memory circuit 100B, in accordance with some embodiments.

Memory circuit 100B is at least one of memory partition 102A, 102B, 102C or 102D, and similar detailed description is therefore omitted.

Memory circuit 100B includes a memory cell array 110AR, a left LIO circuit 110BS, a memory cell array 140, a right LIO circuit 110BS, WL driver circuit 110AC and local control circuit 110LC.

Memory cell array 140 is an embodiment of memory cell array 110AR, and similar detailed description is therefore omitted.

Memory cell array 140 includes a memory cell array 140a and memory cell array 140b. In some embodiments, memory cell array 140a is also referred to as "a first bank of memory cells," and memory cell array 140b is also referred to as "a second bank of memory cells."

Memory cell array 140a includes at least one memory cell 152a. In some embodiments, memory cell array 140a includes one or more memory cells. In some embodiments, memory cell 152a is memory cell 200B of FIG. 2B (described below), and similar detailed description is therefore omitted.

Memory cell array 140b includes at least one memory cell 150a. In some embodiments, memory cell array 140b includes one or more memory cells. In some embodiments, memory cell 150a is memory cell 200A of FIG. 2A (described below), and similar detailed description is therefore omitted.

Memory cell array 140a is adjacent to memory cell array 140b.

Memory circuit 100B further includes a set of conductors 144a and a set of conductors 144b.

In some embodiments, the set of conductors 144b includes at least a bit line BL_FS and a bit line bar BLB_FS. In some embodiments, the set of conductors 144b includes a plurality of bit lines BL_FS and a plurality of bit line bars BLB_FS. In some embodiments, the bit line BL_FS and bit line bar BLB_FS are coupled to memory cell array 140b. In some embodiments, the bit line BL_FS and bit line bar BLB_FS are coupled to memory cell 150a. In some embodiments, the bit line BL_FS and bit line bar BLB_FS are on at least a first metal layer above a front-side of a substrate (e.g., front-side 403a of substrate 490 in FIGS. 4A-4H). In some embodiments, the first metal layer is a metal-0 (M0) layer. Other metal layers are within the scope of the present disclosure. In some embodiments, the first metal layer is a metal-1 (M1) layer.

In some embodiments, the bit line BL_FS and bit line bar BLB_FS overlap memory cell array 140a. In some embodiments, the bit line BL_FS and bit line bar BLB_FS extend through memory cell array 140a.

In some embodiments, the set of conductors 144a includes at least a bit line BL_BS and a bit line bar BLB_BS. In some embodiments, the set of conductors 144a includes a plurality of bit lines BL_BS and a plurality of bit line bars BLB_BS. In some embodiments, the bit line BL_BS and bit line bar BLB_BS are coupled to memory cell array 140a. In some embodiments, the bit line BL_BS and bit line bar BLB_BS are coupled to memory cell 152a. In some embodiments, the bit line BL_BS and bit line bar BLB_BS are on at least a second metal layer below a back-side of a substrate (e.g., back-side 403b of substrate 490 in FIGS. 4A-4H). In some embodiments, the second metal layer is a backside metal-0 (BM0) layer. Other metal layers are within the scope of the present disclosure. In some embodiments, the second metal layer is a backside metal-1 (BM1) layer.

In some embodiments, the bit line BL_BS and bit line bar BLB_BS overlap memory cell array 140b. In some embodiments, the bit line BL_BS and bit line bar BLB_BS extend through memory cell array 140b.

In some embodiments, the bit line BL_BS and bit line bar BLB_BS do not overlap memory cell array 140a. In some embodiments, the bit line BL_BS and bit line bar BLB_BS do not extend through memory cell array 140a.

In some embodiments, by configuring the set of conductors 144a as a bit line BL_BS and a bit line bar BLB_BS arranged on the back-side of the substrate, and by configuring the set of conductors 144b as a bit line BL_FS and a bit line bar BLB_FS arranged on the front-side of the substrate, thereby causes memory circuit 100B to have reduced RC loading compared to other approaches thereby causing the memory circuit 100B to have increased speed and reduced power consumption than other approaches.

Other configurations of memory circuit 100B are within the scope of the present disclosure.

FIG. 1C is a block diagram of a memory circuit 100C, in accordance with some embodiments.

Memory circuit 100C is at least one of memory partition 102A, 102B, 102C or 102D, and similar detailed description is therefore omitted.

Memory circuit 100C includes a memory cell array 110AR, a left LIO circuit 110BS, a memory cell array 141, a right LIO circuit 110BS, WL driver circuit 110AC and local control circuit 110LC, set of conductors 144a, set of conductors 144b, a set of conductors 144c and a set of conductors 144d.

Memory circuit 100C is a variation of memory circuit 100B of FIG. 1B, and similar detailed description is therefore omitted. In comparison with memory circuit 100B of FIG. 1B, memory cell array 141 of memory circuit 100C replaces memory cell array 140 of FIG. 1B, and similar detailed description is therefore omitted.

In comparison with memory circuit 100B of FIG. 1B, memory circuit 100C further includes a set of conductors 144c and a set of conductors 144d, and similar detailed description is therefore omitted.

Memory cell array 141 is an embodiment of memory cell array 110AR, and similar detailed description is therefore omitted.

Memory cell array 141 is similar to memory cell array 140, and similar detailed description is therefore omitted. Memory cell array 141 includes memory cell array 140a, memory cell array 140b, a memory cell array 140c and a memory cell array 140d.

In some embodiments, memory cell array 140c is also referred to as "a third bank of memory cells," and memory cell array 140d is also referred to as "a fourth bank of memory cells."

Memory cell array 140c includes at least one memory cell 152b. In some embodiments, memory cell array 140c includes one or more memory cells. In some embodiments, memory cell 152b is memory cell 200B of FIG. 2B (described below), and similar detailed description is therefore omitted.

Memory cell array 140d includes at least one memory cell 150b. In some embodiments, memory cell array 140d includes one or more memory cells. In some embodiments, memory cell 150b is memory cell 200A of FIG. 2A (described below), and similar detailed description is therefore omitted.

Memory cell array 140c is adjacent to memory cell array 140d.

In some embodiments, the set of conductors 144*d* includes at least a bit line BL1_FS and a bit line bar BLB1_FS. In some embodiments, the set of conductors 144*d* includes a plurality of bit lines BL1_FS and a plurality of bit line bars BLB1_FS. In some embodiments, the bit line BL1_FS and bit line bar BLB1_FS are coupled to memory cell array 140*d*. In some embodiments, the bit line BL1_FS and bit line bar BLB1_FS are coupled to memory cell 150*b*. In some embodiments, the bit line BL1_FS and bit line bar BLB1_FS are on at least a third metal layer above a front-side of a substrate (e.g., front-side 403*a* of substrate 490 in FIGS. 4A-4H). In some embodiments, the third metal layer is a metal-3 (M3) layer. Other metal layers are within the scope of the present disclosure. In some embodiments, the third metal layer is a M0 layer.

In some embodiments, the bit line BL1_FS and bit bar BLB1_FS overlap memory cell arrays 140*a*, 140*b*, 140*c* and 140*d*. In some embodiments, the bit line BL1_FS and bit line bar BLB1_FS extend through memory cell arrays 140*a*, 140*b*, 140*c* and 140*d*.

In some embodiments, the set of conductors 144*c* includes at least a bit line BL1_BS and a bit line bar BLB1_BS. In some embodiments, the set of conductors 144*c* includes a plurality of bit lines BL1_BS and a plurality of bit line bars BLB1_BS. In some embodiments, the bit line BL1_BS and bit line bar BLB1_BS are coupled to memory cell array 140*c*. In some embodiments, the bit line BL1_BS and bit line bar BLB1_BS are coupled to memory cell 152*b*. In some embodiments, the bit line BL1_BS and bit line bar BLB1_BS are on at least a fourth metal layer below a back-side of a substrate (e.g., back-side 403*b* of substrate 490 in FIGS. 4A-4H). In some embodiments, the fourth metal layer is a backside metal-3 (BM3) layer. Other metal layers are within the scope of the present disclosure. In some embodiments, the fourth metal layer is a BM0 layer.

In some embodiments, the bit line BL1_BS and bit line bar BLB1_BS overlap memory cell arrays 140*a*, 140*b*, and 140*c*. In some embodiments, the bit line BL1_BS and bit line bar BLB1_BS extend through memory cell arrays 140*a*, 140*b*, and 140*c*.

In some embodiments, the bit line BL1_BS and bit line bar BLB1_BS do not overlap memory cell array 140*d*. In some embodiments, the bit line BL1_BS and bit line bar BLB1_BS do not extend through memory cell array 140*d*.

In some embodiments, by configuring the set of conductors 144*a* as a bit line BL_BS and a bit line bar BLB_BS arranged on the back-side of the substrate, by configuring the set of conductors 144*b* as a bit line BL_FS and a bit line bar BLB_FS arranged on the front-side of the substrate, by configuring the set of conductors 144*c* as a bit line BL1_BS and a bit line bar BLB1_BS arranged on the back-side of the substrate, and by configuring the set of conductors 144*d* as a bit line BL1_FS and a bit line bar BLB1_FS arranged on the front-side of the substrate, thereby causes memory circuit 100C to have reduced RC loading compared to other approaches thereby causing the memory circuit 100C to have increased speed and reduced power consumption than other approaches.

Other configurations of memory circuit 100C are within the scope of the present disclosure.

Figure 2A:
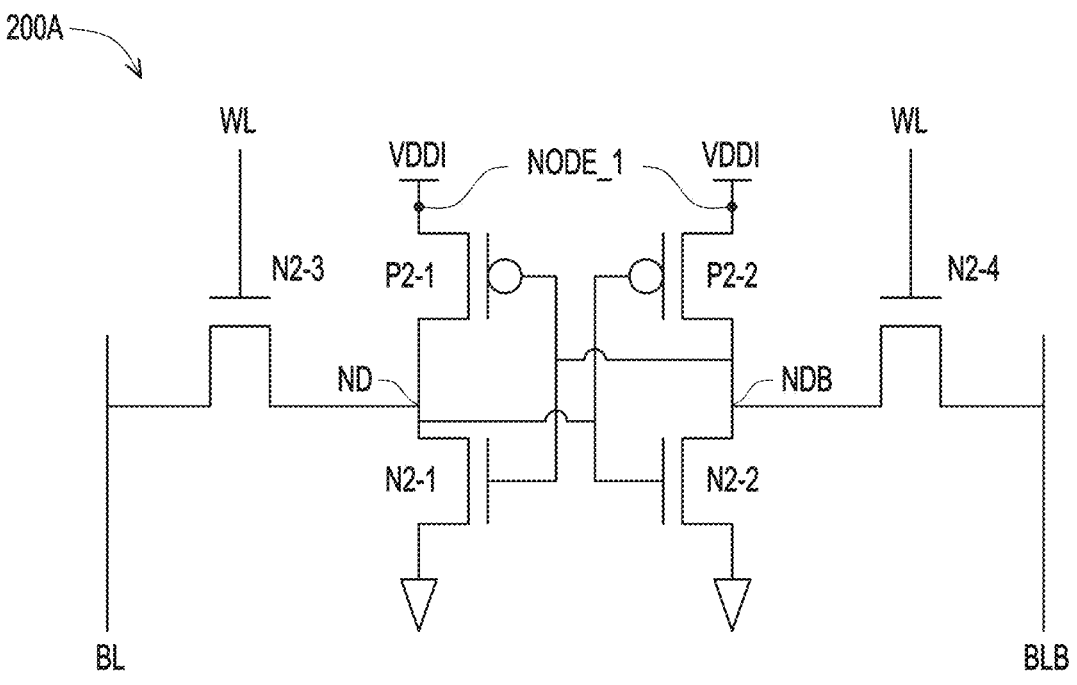
FIGS. 2A-2B are corresponding circuit diagrams of corresponding memory cells usable in FIGS. 1A-1C, in accordance with some embodiments.
Figure 2B:
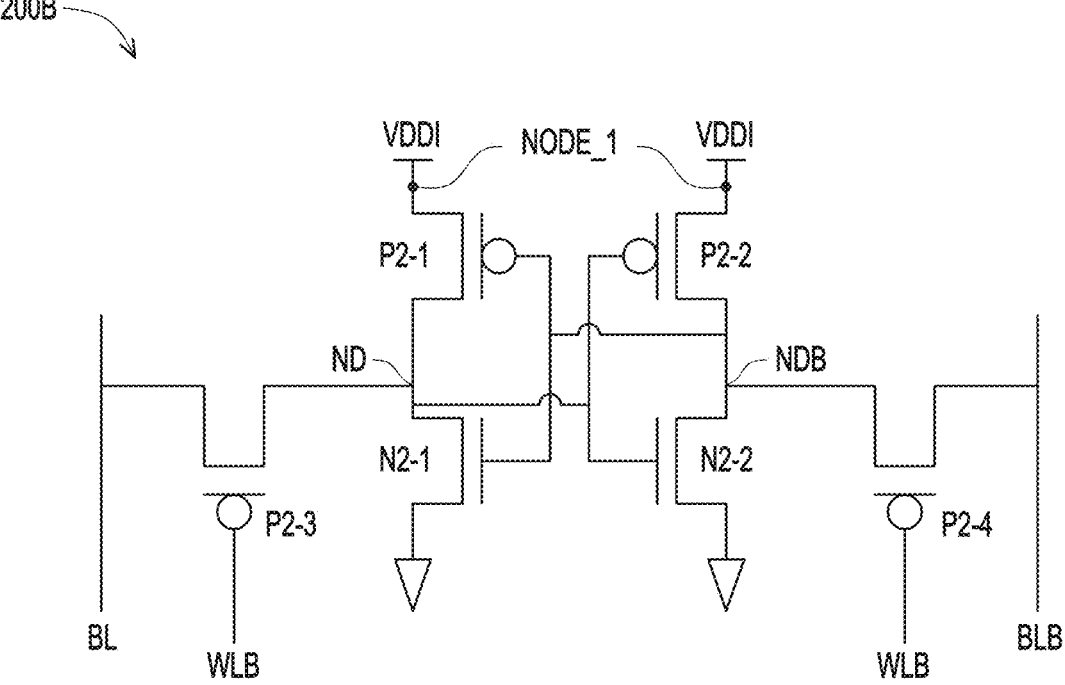

FIGS. 2A-2B are corresponding circuit diagrams of corresponding memory cells 200A and 200B usable in FIGS. 1A-1C, in accordance with some embodiments.

FIG. 2A is a circuit diagram of a memory cell 200A usable in FIGS. 1A-1C, in accordance with some embodiments.

At least one of memory cell 200A or 200B is usable as one or more memory cells MCB in at least one of memory cell array 110AR of FIGS. 1A-1C or memory device 112 of FIGS. 1A-1C.

At least one of memory cell 200A or 200B is usable as one or more memory cells MCB in at least one of memory cell array 100B of FIG. 1B or memory cell array 100C of FIG. 1C.

In some embodiments, a bit line BL in at least FIGS. 2A-2B is at least one of bit line BL_BS or bit line BL1_BS, and similar detailed description is omitted for brevity.

In some embodiments, a bit line bar BLB in at least FIGS. 2A-2B is at least one of bit line bar BLB_BS or bit line bar BLB1_BS, and similar detailed description is omitted for brevity.

At least one of memory cell 200A or 200B is a six transistor (6T) single port (SP) SRAM memory cell used for illustration. In some embodiments, at least one of memory cell 200A or 200B employs a number of transistors other than eight. Other types of memory are within the scope of various embodiments.

Memory cell 200A comprises two P field effect transistors (PFET) transistors P2-1 and P2-2, and four NFET transistors N2-1, N2-2, N2-3, and N2-4. PFET transistors P2-1 and P2-2, and NFET transistors N2-1 and N2-2 form a cross latch or a pair of cross-coupled inverters. For example, PFET transistor P2-1 and NFET transistor N2-1 form a first inverter while PFET transistor P2-2 and NFET transistor N2-2 form a second inverter.

A source terminal of each of PFET transistors P2-1 and P2-2 is configured as a voltage supply node NODE_1. Each voltage supply node NODE_1 is coupled to a first voltage supply VDDI.

Each of a drain terminal of PFET transistor P2-1, a drain terminal of NFET transistor N2-1, a gate terminal of PFET transistor P2-2, a gate terminal of NFET transistor N2-2, and a source terminal of NFET transistor N2-3 are coupled together, and are configured as a storage node ND.

Each of a drain terminal of PFET transistor P2-2, a drain terminal of NFET transistor N2-2, a gate terminal of PFET transistor P2-1, a gate terminal of NFET transistor N2-1, and a source terminal of NFET transistor N2-4 are coupled together, and are configured as a storage node NDB.

A source terminal of each of NFET transistors N2-1 and N2-2 is configured as a reference voltage supply node (not labelled) having a reference supply voltage VSS. The source terminal of each of NFET transistors N2-1 and N2-2 is also coupled to reference voltage supply VSS.

A word line WL is coupled with a gate terminal of each of NFET transistors N2-3 and N2-4. Word line WL is also called a write control line because NFET transistors N2-3 and N2-4 are configured to be controlled by a signal on word line WL in order to transfer data between bit lines BL, BLB and corresponding nodes ND, NDB.

A drain terminal of NFET transistor N2-3 is coupled to a bit line BL. A drain terminal of NFET transistor N2-4 is coupled to a bit line BLB.

Bit lines BL and BLB are configured as both data input and output for memory cell 200A-200B. In some embodiments, in a write operation, applying a logical value to a bit line BL and the opposite logical value to the other bit line BLB enables writing the logical values on the bit lines to memory cell 200A-200B. Each of bit lines BL and BLB is called a data line because the data carried on bit lines BL and BLB are written to and read from corresponding nodes ND and NDB.

Other configurations of memory cell 200A are within the scope of the present disclosure.

FIG. 2B is a circuit diagram of a memory cell 200B usable in FIGS. 1A-1C, in accordance with some embodiments.

Memory cell 200B is a variation of memory cell 200A of FIG. 2A, and similar detailed description is therefore omitted. In comparison with memory cell 200A of FIG. 2A, PFET transistors P2-3 and P2-4 replace corresponding NFET transistors N2-3 and N2-4, and similar detailed description is therefore omitted.

In comparison with memory cell 200A of FIG. 2A, word line bar WLB replaces word line WL, and similar detailed description is therefore omitted.

Memory cell 200B comprises PFET transistors P2-1, P2-2, P2-3 and P2-4, and NFET transistors N2-1 and N2-2.

Each of a drain terminal of PFET transistor P2-1, a drain terminal of NFET transistor N2-1, a gate terminal of PFET transistor P2-2, a gate terminal of NFET transistor N2-2, and a source terminal of PFET transistor P2-3 are coupled together, and are configured as a storage node ND.

Each of a drain terminal of PFET transistor P2-2, a drain terminal of NFET transistor N2-2, a gate terminal of PFET transistor P2-1, a gate terminal of NFET transistor N2-1, and a source terminal of PFET transistor P2-4 are coupled together, and are configured as a storage node NDB.

A drain terminal of PFET transistor P2-3 is coupled to the bit line BL. A drain terminal of PFET transistor P2-4 is coupled to the bit line BLB.

A word line bar WLB is coupled with a gate terminal of each of PFET transistors P2-3 and P2-4. Word line bar WLB is also called a write control line because PFET transistors P2-3 and P2-4 are configured to be controlled by a signal on word line bar WLB in order to transfer data between bit lines BL, BLB and corresponding nodes ND, NDB.

In some embodiments, the signal of the word line bar WLB is equal to a voltage supply VDD. In some embodiments, when the signal of the word line bar WLB is equal to the voltage supply VDD, the PFET transistors P2-3 and P2-4 are turned off. In some embodiments, when the signal of the word line bar WLB is equal to the reference supply voltage VSS, the PFET transistors P2-3 and P2-4 are turned on.

Other configurations of memory cell 200B are within the scope of the present disclosure.

Figure 3A:
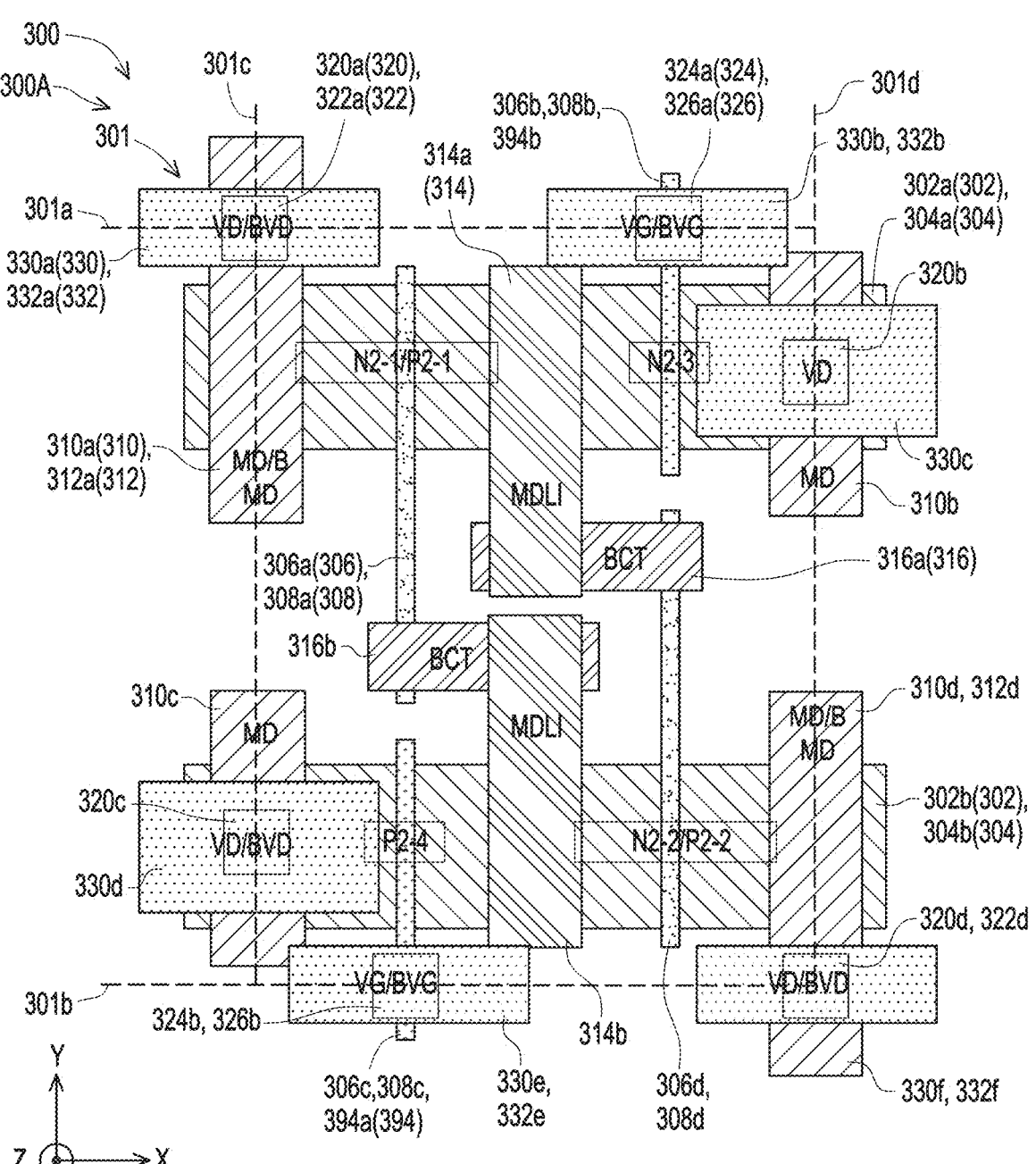
FIGS. 3A-3C are corresponding diagrams of corresponding portions of a layout design of a corresponding integrated circuit, in accordance with some embodiments.
Figure 3B:
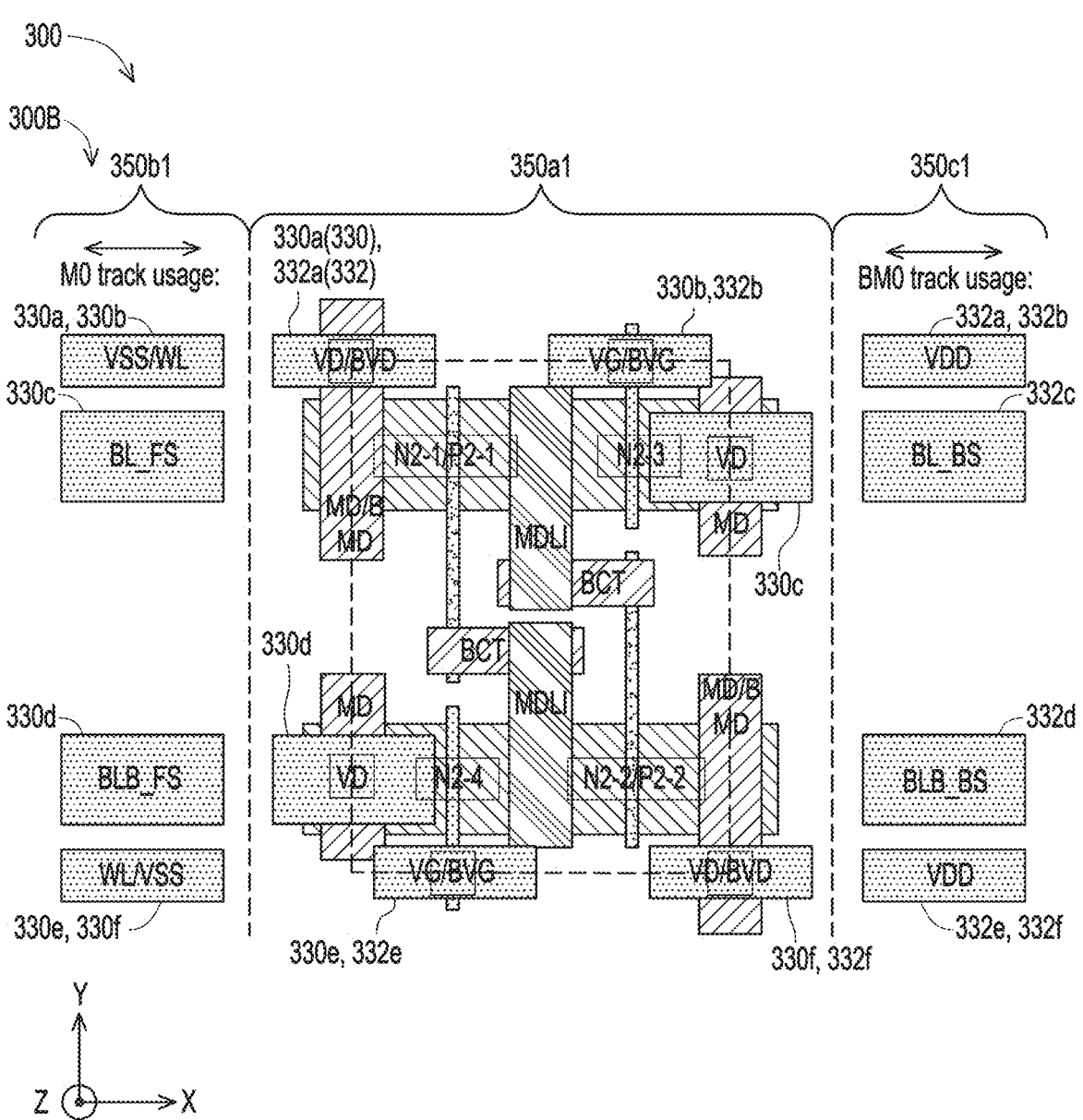
Figure 3C:
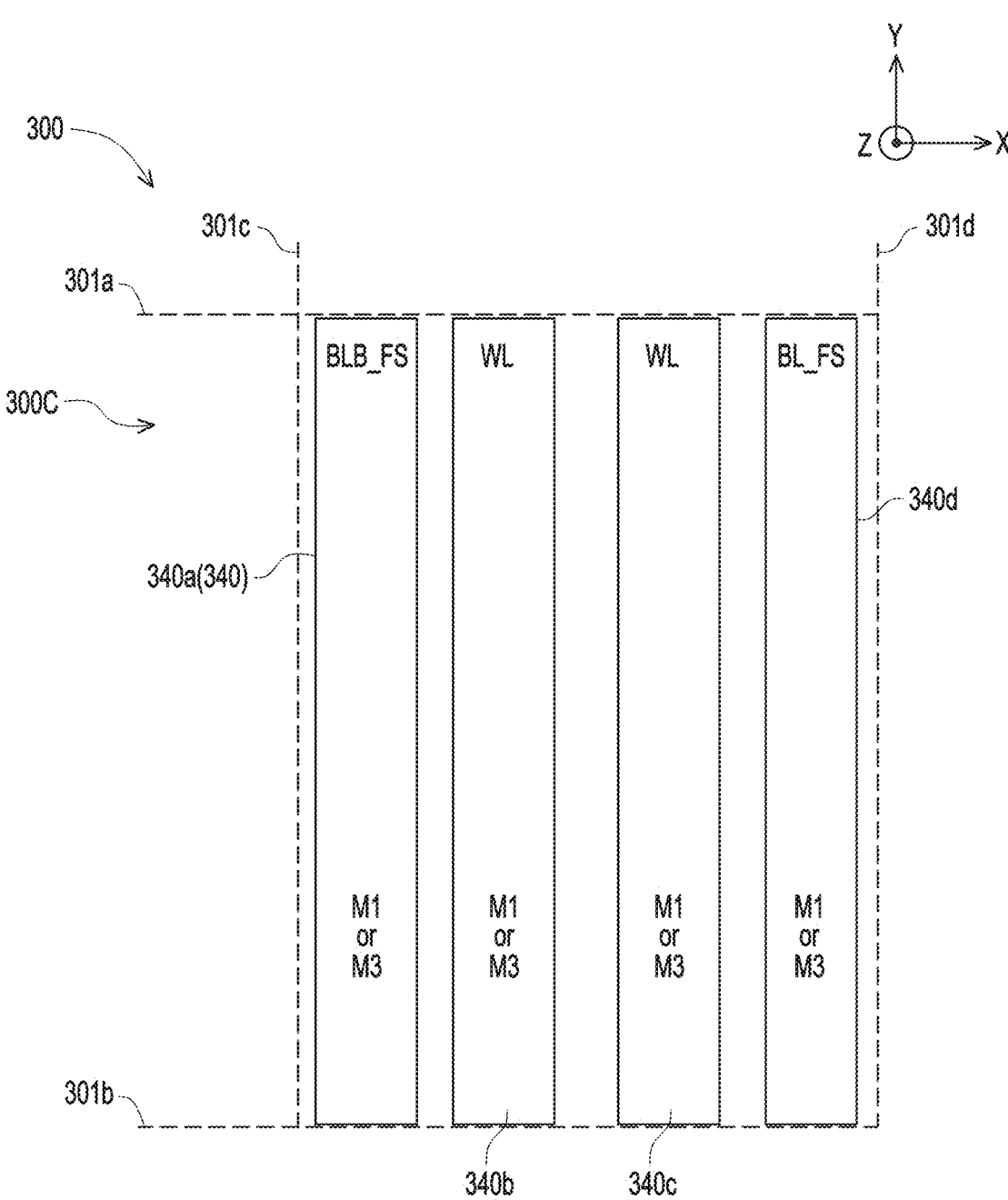

FIGS. 3A-3C are corresponding diagrams of corresponding portions 300A-300C of a layout design 300 of a corresponding integrated circuit, in accordance with some embodiments.

Layout design 300 is a layout of an integrated circuit 400 of FIGS. 4A-4H or memory cell 200A. Layout design 300 is a layout of memory cell 200A of FIG. 2A. In some embodiments, layout design is a layout of at least one of memory cell 150a or 150b.

Portion 300A includes one or more features of layout design 300 of an active level or an oxide diffusion (OD) level, a gate (POLY) level, a metal over diffusion (MD) level, a backside metal over diffusion (BMD) level, a metal over diffusion local interconnect (MDLI) level, a butted contact (BCT) level, a metal 0 (M0) level, a backside metal 0 (BM0) level, a via over gate (VG) level, a backside via over gate (BVG) level, a via over diffusion (VD) level, and a backside via over diffusion (BVD) level.

Portion 300B includes one or more features of layout design 300 of the OD level, the POLY level, the MD level, the MDLI level, the BCT level, the M0 level, the VG level, the VD level, the BMD level, the BM0 level, the BVG level, and the BVD level.

Portion 300C includes one or more features of layout design 300 of a metal 1 (M1) level. In some embodiments, portion 300C includes one or more features of layout design 300 of a metal 2 (M2) level. In some embodiments, portion 300C includes one or more features of layout design 300 of a metal 3 (M3) level.

FIGS. 3A-3C are corresponding diagrams of corresponding portions 300A-300C of layout design 300, simplified for ease of illustration.

For ease of illustration, some of the labeled elements of one or more of FIGS. 1A-6G are not labelled in one or more of FIGS. 1A-6G. In some embodiments, layout design 300 includes additional elements not shown in FIGS. 3A-3C.

Layout design 300 includes one or more features of the OD level, the POLY level, the MD level, the M0 level, the VG level, the VD level, the V0 level, the BMD level, the BM0 level, the BVG level, the BVD level and one of the M1 level, the M2 level or the M3 level. In some embodiments, at least layout design 300 or 500, or integrated circuit 400 or 600 includes additional elements not shown in FIG. 3A-3C, 4A-4H, 5A-5C or 6A-6G.

Layout design 300 is usable to manufacture integrated circuit 400 of FIGS. 4A-4H.

Figure 4A:
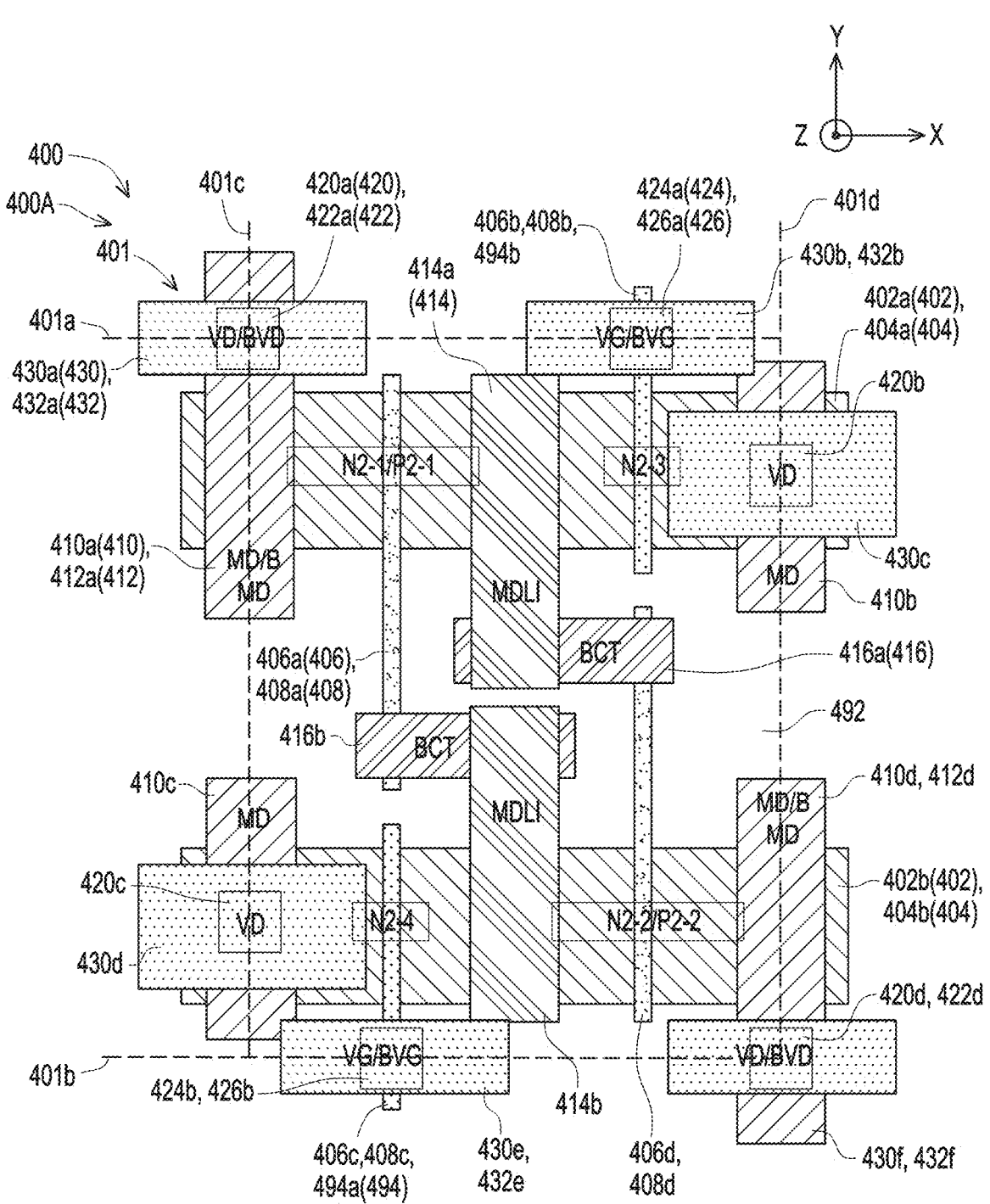
FIGS. 4A-4H are diagrams of an integrated circuit, in accordance with some embodiments.
Figure 4B:
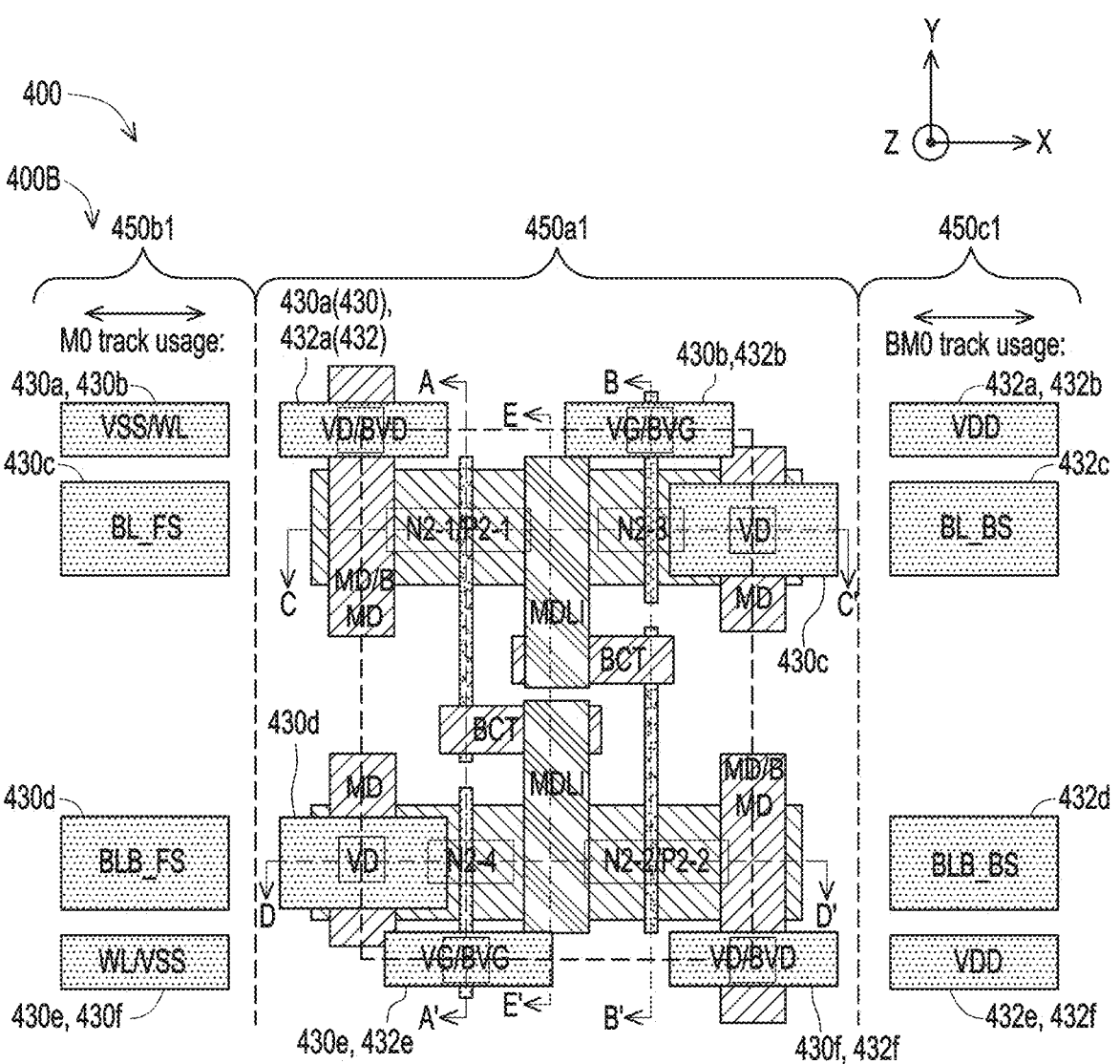
Figure 4C:
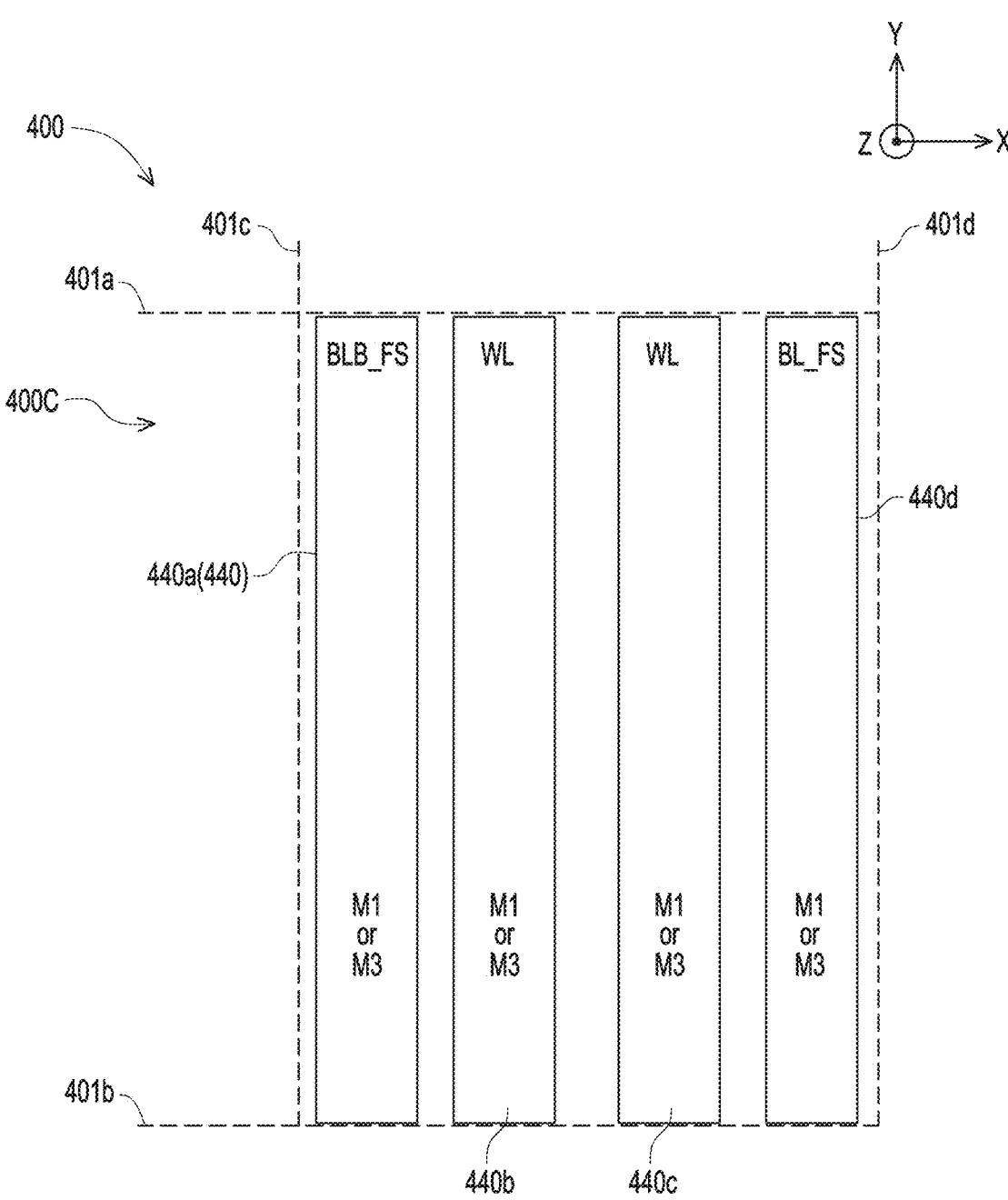

Portion 300A is a layout of portion 400A of integrated circuit 400 of FIG. 4A, portion 300B is a layout of portion 400B of integrated circuit 400 of FIG. 4B, and portion 300C is a layout of portion 400C of integrated circuit 400 of FIG. 4C, and similar detailed description is omitted for brevity.

Layout design 300 includes a cell 301. The cell 301 has cell boundaries 301a and 301b that extend in a first direction X, and cell boundaries 301c and 301d that extend in a second direction Y. In some embodiments, at least one of the first direction X, the second direction Y or a third direction Z is different from another of the first direction X, the second direction Y or the third direction Z. In some embodiments, layout design 300 abuts other cell layout designs (not shown) along cell boundaries 301c and 301d. In some embodiments, layout design 300 abuts other cell layout designs (not shown) along cell boundaries 301a and 301b that extend in the first direction X. In some embodiments, layout design 300 is a single height standard cell. In some embodiments, cell 301 is useable to manufacture a cell 401.

In some embodiments, cell 301 is a standard cell, and layout design 300 corresponds to a layout of a standard cell defined by cell boundaries 301a, 301b, 301c and 301d. In some embodiments, a cell 301 is a predefined portion of layout design 300 including one or more transistors and electrical connections configured to perform one or more circuit functions. In some embodiments, cell 301 is bounded by cell boundaries 301a, 301b, 301c and 301d, and thus corresponds to a region of functional circuit components or devices that are part of a standard cell. In some embodiments, layout design 300 is a layout design of a memory cell, such as memory cell 200A of FIG. 2A.

Layout design 300 includes one or more active region layout patterns 302a or 302b (collectively referred to as a "set of active region patterns 302") or one or more active region layout patterns 304a or 304b (collectively referred to as a "set of active region patterns 304") extending in the first direction X.

Embodiments of the present disclosure use the term "layout pattern" which is hereinafter also referred to as "patterns" in the remainder of the present disclosure for brevity.

The set of active region patterns 302 is above the set of active region patterns 304.

Active region patterns 302*a* and 302*b* of the set of active region patterns 302 are separated from one another in the second direction Y. Active region patterns 304*a* and 304*b* of the set of active region patterns 304 are separated from one another in the second direction Y.

Active region patterns 302*a* and 304*a* are separated from one another in a third direction Z. Active region patterns 302*b* and 304*b* are separated from one another in the third direction Z.

The set of active region patterns 302 is usable to manufacture a corresponding set of active regions 402 of integrated circuit 100A-100C, 200A, 200B, 400 or 600. The set of active region patterns 304 is usable to manufacture a corresponding set of active regions 404 of integrated circuit 100A-100C, 200A, 200B, 400 or 600.

In some embodiments, at least one of the set of active regions 402 or 404 are located on the front-side 403*a* of integrated circuit 100A-100C, 200A, 200B, 400 or 600. In some embodiments, at least one of the set of active regions 402 or 404 corresponds to source and drain regions of one or more complementary FET (CFET) transistors. In some embodiments, at least one of the set of active regions 402 or 404 correspond to source and drain regions of one or more nanosheet transistors or nanowire transistors. Other transistor types are within the scope of the present disclosure. In some embodiments, at least one of the set of active regions 402 or 404 corresponds to source and drain regions of one or more finFET transistors.

In some embodiments, active region patterns 302*a*, 302*b* are usable to manufacture corresponding active regions 402*a*, 402*b* of the set of active regions 402 of integrated circuit 100A-100C, 200A, 200B, 400 or 600. In some embodiments, active region patterns 304*a*, 304*b* are usable to manufacture corresponding active regions 404*a*, 404*b* of the set of active regions 404 of integrated circuit 100A-100C, 200A, 200B, 400 or 600.

In some embodiments, the set of active region patterns 302 and 304 are referred to as an oxide diffusion (OD) region which defines the source or drain diffusion regions of at least integrated circuit 100A-100C, 200A, 200B, 400 or 600 or layout design 300 or 500.

In some embodiments, active region patterns 302*a* and 302*b* are usable to manufacture source and drain regions of NFET transistors of integrated circuits 100, 200A, 200B, 400 or 600, and active region patterns 304*a* and 304*b* are usable to manufacture source and drain regions of PFET transistors of integrated circuits 100, 200A, 200B, 400 or 600.

In some embodiments, active region patterns 302*a* and 302*b* are usable to manufacture source and drain regions of PFET transistors of integrated circuits 100, 200A, 200B, 400 or 600, and active region patterns 304*a* and 304*b* are usable to manufacture source and drain regions of NFET transistors of integrated circuits 100, 200A, 200B, 400 or 600.

In some embodiments, the set of active region patterns 302 or 304 is located on a first layout level. In some embodiments, the first layout level corresponds to an active level or an OD level of one or more of layout design 300 or 500 or integrated circuits 100, 200A, 200B, 400 or 600. In some embodiments, the OD level is above the BM0 and the BM1 level.

Other configurations, arrangements on other layout levels or quantities of patterns in the set of active region patterns 302 or 304 are within the scope of the present disclosure.

Layout design 300 further includes one or more gate patterns 306*a*, 306*b*, 306*c* or 306*d* (collectively referred to as a "set of gate patterns 306"), one or more gate patterns 308*a*, 308*b*, 308*c* or 308*d* (collectively referred to as a "set of gate patterns 308") extending in the second direction Y.

The set of gate patterns 306 is above the set of gate patterns 308.

Gate patterns 306*a* and 306*c* are separated from one another in the second direction Y. Gate patterns 308*a* and 308*c* are separated from one another in the second direction Y.

Gate patterns 306*b* and 306*d* are separated from one another in the second direction Y. Gate patterns 308*b* and 308*d* are separated from one another in the second direction Y.

Gate patterns 306*a* and 306*b* are separated from one another in the first direction X. Gate patterns 308*a* and 308*b* are separated from one another in the first direction X.

Gate patterns 306*c* and 306*d* are separated from one another in the first direction X. Gate patterns 308*c* and 308*d* are separated from one another in the first direction X.

In some embodiments, gate patterns 306*b* and 308*b* are separated from one another in the third direction Z. In some embodiments, gate patterns 306*c* and 308*c* are separated from one another in the third direction Z.

The set of gate patterns 306 is usable to manufacture a corresponding set of gates 406 of integrated circuit 100A-100C, 200A, 200B, 400 or 600. The set of gate patterns 308 is usable to manufacture a corresponding set of gates 408 of integrated circuit 100A-100C, 200A, 200B, 400 or 600.

In some embodiments, gate patterns 306*a*, 306*b*, 306*c* or 306*d* are usable to manufacture corresponding gates 406*a*, 406*b*, 406*c* or 406*d* of the set of gates 406 of integrated circuit 100A-100C, 200A, 200B, 400 or 600. In some embodiments, gate patterns 308*a*, 308*b*, 308*c* or 308*d* are usable to manufacture corresponding gates 408*a*, 408*b*, 408*c* or 408*d* of the set of gates 408 of integrated circuit 100A-100C, 200A, 200B, 400 or 600.

In some embodiments, at least one of the set of gates 406 or 408 are located on the front-side 403*a* of integrated circuit 100A-100C, 200A, 200B, 400 or 600.

In some embodiments, each of the gate patterns in the set of gate patterns 306 and 308 is shown in FIGS. 3A-3B and 5A-5B with labels "N2-1, P2-1, N2-2, P2-2, N2-3, P2-3, N2-4, P2-4" that identify corresponding transistors of FIGS. 2A-2B manufactured by the corresponding gate pattern in FIGS. 3A-3C and 5A-5C, and are omitted for brevity.

In some embodiments, in FIG. 3A-3B, gate pattern 308*b* is a dummy transistor, and corresponds to PFET transistor P2-3 (shown in FIG. 2B). In some embodiments, in FIG. 3A-3B, gate pattern 308*c* is a dummy transistor, and corresponds to PFET transistor P2-4 (shown in FIG. 2B). In some embodiments, a dummy transistor is a non-functional transistor.

In some embodiments, the set of gate patterns 306 or 308 encapsulate the set of active region patterns 302 and 304. In some embodiments, a portion of the set of gate patterns 306 or 308 is above the set of active region patterns 302 and 304. In some embodiments, another portion of the set of gate patterns 306 or 308 is below the set of active region patterns 302 and 304.

The set of gate patterns 306 or 308 is positioned on a second layout level. In some embodiments, the second layout level is different from the first layout level. In some embodiments, the second layout level corresponds to the POLY level of one or more of layout design 300 or 500 or integrated circuits 100, 200A, 200B, 400 or 600. In some embodiments, the POLY level is above the BMD and the BM0 level.

Other configurations, arrangements on other layout levels or quantities of patterns in the set of gate patterns 306 or 308 are within the scope of the present disclosure.

Layout design 300 further includes one or more insulating region patterns 394a or 394b (collectively referred to as a "set of insulating region patterns 394") extending in the second direction Y.

In some embodiments, the set of insulating region patterns 394 is between the set of gate patterns 306 and the set of gate patterns 308. In some embodiments, the set of insulating region patterns 394 is above the set of gate patterns 308. In some embodiments, the set of insulating region patterns 394 is below the set of gate patterns 306.

In some embodiments, gate pattern 306b and gate pattern 308b are separated from each other in the third direction Z by the insulating region pattern 394b of the set of insulating region patterns 394.

In some embodiments, gate pattern 306c and gate pattern 308c are separated from each other in the third direction Z by insulating region pattern 394a of the set of insulating region patterns 394.

The set of insulating region patterns 394 is usable to manufacture a corresponding set of insulating regions 494 of integrated circuit 100A-100C, 200A, 200B, 400 or 600. The set of insulating region patterns 394 is usable to manufacture a corresponding set of insulating region patterns 494a, 494b of integrated circuit 100A-100C, 200A, 200B, 400 or 600.

Other configurations, arrangements on other layout levels or other numbers of portions in insulating region pattern 394 are within the scope of the present disclosure.

Layout design 300 further includes one or more contact patterns 310a, 310b, 310c, 310d (collectively referred to as a "set of contact patterns 310") extending in the second direction Y.

Each of the contact patterns of the set of contact patterns 310 is separated from an adjacent contact pattern of the set of contact patterns 310 in at least the first direction X or the second direction Y.

The set of contact patterns 310 is usable to manufacture a corresponding set of contacts 410 of integrated circuit 100A-100C, 200A, 200B, 400 or 600.

In some embodiments, contact pattern 310a, 310b, 310c, 310d of the set of contact patterns 310 is usable to manufacture corresponding contact 410a, 410b, 410c, 410d of the set of contact patterns 410. In some embodiments, the set of contact patterns 310 is also referred to as a set of metal over diffusion (MD) patterns.

In some embodiments, at least one of contact pattern 310a, 310b, 310c, 310d of the set of contact patterns 310 is usable to manufacture source or drain terminals of one of the NFET or PFET transistors of integrated circuit 100A-100C, 200A, 200B, 400 or 600.

In some embodiments, contact pattern 310a is usable to manufacture source terminals of NFET transistor N2-1, contact pattern 310b is usable to manufacture source terminals of NFET transistor N2-3, contact pattern 310c is usable to manufacture source terminals of NFET transistor N2-4, and contact pattern 310d is usable to manufacture source terminals of NFET transistor N2-2.

In some embodiments, the set of contact patterns 310 overlap the set of active region patterns 302 or 304. The set of contact patterns 310 is located on a third layout level. In some embodiments, the third layout level corresponds to the contact level or an MD level of one or more of layout design 300 or 500 or integrated circuits 100, 200A, 200B, 400 or 600. In some embodiments, the third layout level is different from at least one of the first layout level or the second layout level. Other configurations, arrangements on other layout levels or quantities of patterns in the set of contact patterns 310 are within the scope of the present disclosure.

Layout design 300 further includes one or more contact patterns 312a, 312d (collectively referred to as a "set of contact patterns 312") extending in the second direction Y.

Each of the contact patterns of the set of contact patterns 312 is separated from an adjacent contact pattern of the set of contact patterns 312 in at least the first direction X or the second direction Y.

The set of contact patterns 310 and 312 are separated from one another in the third direction Z. In some embodiments, contact patterns 310a and 312a are separated from one another in the third direction Z. In some embodiments, contact patterns 310d and 312d are separated from one another in the third direction Z.

The set of contact patterns 312 is usable to manufacture a corresponding set of contacts 412 of integrated circuit 100A-100C, 200A, 200B, 400 or 600.

In some embodiments, contact pattern 312a, 312d of the set of contact patterns 312 is usable to manufacture corresponding contact 412a, 412d of the set of contacts 412. In some embodiments, the set of contacts 412 are on a back-side 403b of integrated circuit 400. In some embodiments, the back-side 403b of integrated circuit 400 is opposite from the front-side of integrated circuit 400. In some embodiments, the set of contacts patterns 312 is also referred to as a set of back-side MD (BMD) patterns.

In some embodiments, contact pattern 312a is usable to manufacture source terminals of PFET transistor P2-1, and contact pattern 312d is usable to manufacture source terminals of PFET transistor P2-2.

In some embodiments, the set of contact patterns 312 are overlapped by the set of active region patterns 302 or 304. The set of contact patterns 312 is located on a fourth layout level. In some embodiments, the fourth layout level corresponds to the back-side contact level or a back-side MD (BMD) level of one or more of layout design 300 or 500 or integrated circuits 100, 200A, 200B, 400 or 600. In some embodiments, the fourth layout level is different from at least one of the first layout level, the second layout level or the third layout level.

In some embodiments, the BMD level is above the BM0 level. In some embodiments, the BMD level is below the back-side 403b of integrated circuit 400. In some embodiments, the BMD level is below the OD level, the POLY level, the MD level and the M0 level.

Other configurations, arrangements on other layout levels or quantities of patterns in the set of contact patterns 312 are within the scope of the present disclosure.

Layout design 300 further includes one or more contact patterns 314a, 314b (collectively referred to as a "set of contact patterns 314") extending in the second direction Y.

Each of the contact patterns of the set of contact patterns 314 is separated from an adjacent contact pattern of the set of contact patterns 314 in at least the first direction X or the second direction Y.

In some embodiments, the set of contact patterns 314 is between the set of contact patterns 310 and 312. Contact pattern 314a is between contact patterns 310a and 310b. Contact pattern 314b is between contact patterns 310c and 310d.

In some embodiments, contact pattern 314a includes one or more separate discontinuous patterns. In some embodiments, contact pattern 314b includes one or more separate discontinuous patterns.

Contact patterns 314a and 314b are separated from one another in the second direction Y.

The set of contact patterns 314 is usable to manufacture a corresponding set of contacts 414 of integrated circuit 100A-100C, 200A, 200B, 400 or 600.

In some embodiments, contact pattern 314a, 314b of the set of contact patterns 314 is usable to manufacture corresponding contact 414a, 414b of the set of contacts 414. In some embodiments, the set of contacts 414 are on a front-side 403a of integrated circuit 400. In some embodiments, the set of contacts patterns 314 is also referred to as a set of metal over diffusion local interconnect (MDLI) patterns.

In some embodiments, at least one of contact pattern 314a, 314b of the set of contact patterns 314 is usable to manufacture interconnect structures usable to connect source or drain terminals of one of the NFET or PFET transistors of integrated circuit 100A-100C, 200A, 200B, 400 or 600.

In some embodiments, contact pattern 314a is usable to manufacture drain terminal of PFET transistor P2-1, drain terminal of NFET transistor N2-1, and drain terminal of NFET transistor N2-3.

In some embodiments, contact pattern 314b is usable to manufacture drain terminal of PFET transistor P2-2, drain terminal of NFET transistor N2-2, and drain terminal of NFET transistor N2-4.

In some embodiments, at least a first portion of the set of contact patterns 314 are overlapped by one or more of the set of active region patterns 302 or 304. In some embodiments, at least a second portion of the set of contact patterns 314 is between the set of active region patterns 302 or 304. In some embodiments, at least a third portion of the set of contact patterns 314 is coplanar with the set of contact patterns 310 or the set of contact patterns 312.

The set of contact patterns 314 is located on a fifth layout level. In some embodiments, the fifth layout level corresponds to the MDLI level of one or more of layout design 300 or 500 or integrated circuits 100, 200A, 200B, 400 or 600. In some embodiments, the fifth layout level is different from at least one of the first layout level or the second layout level.

In some embodiments, the MDLI level includes the MD level and the BMD level. In some embodiments, the MDLI level is below the M0 level. In some embodiments, the MDLI level is above the BM0 level.

Other configurations, arrangements on other layout levels or quantities of patterns in the set of contact patterns 314 are within the scope of the present disclosure.

Layout design 300 further includes one or more contact patterns 316a and 316b (collectively referred to as a "set of contact patterns 316") extending in the first direction X.

Each of the contact patterns of the set of contact patterns 316 is separated from an adjacent contact pattern of the set of contact patterns 316 in at least the first direction X or the second direction Y.

Contact patterns 316a and 316b are separated from one another in the second direction Y.

The set of contact patterns 316 is usable to manufacture a corresponding set of contacts 416 of integrated circuit 100A-100C, 200A, 200B, 400 or 600.

In some embodiments, contact pattern 316a, 316b of the set of contact patterns 316 is usable to manufacture corresponding contact 416a, 416b of the set of contacts 416. The set of contacts 416 is on the front-side 403a of integrated circuit 400. Contact 416a or 416b is on the front-side 403a of integrated circuit 400. In some embodiments, the set of contacts patterns 316 is also referred to as a set of butted contacts (BCT) patterns. In some embodiments, the set of contacts 416 is also referred to as a set of butted contacts (BCT).

In some embodiments, at least one of contact pattern 316a, 316b of the set of contact patterns 316 is usable to manufacture interconnect structures usable to connect at least a gate terminal of one of the NFET or PFET transistors of integrated circuit 100A-100C, 200A, 200B, 400 or 600 to source or drain terminals of another of the NFET or PFET transistors of integrated circuit 100A-100C, 200A, 200B, 400 or 600.

In some embodiments, the set of contact patterns 316 overlap one or more of the set of active region patterns 302, the set of active region patterns 304, the set of gate patterns 306 or the set of gate patterns 308.

In some embodiments, contact pattern 316a overlaps at least one of gate pattern 306d, gate pattern 308d or contact pattern 314a. In some embodiments, contact pattern 316b overlaps at least one of gate pattern 306a, gate pattern 308a or contact pattern 314b.

In some embodiments, the set of contact patterns 316 overlap one or more of the set of active region patterns 302 or 304, the set of gate patterns 306 or 308, the set of contact patterns 310 or 312 or the set of contact patterns 314. The set of contact patterns 316 is located on a sixth layout level. In some embodiments, the sixth layout level corresponds to the BCT level of one or more of layout design 300 or 600 or integrated circuits 100, 200A, 200B, 400 or 600. In some embodiments, the sixth layout level is different from at least one of the first layout level, the second layout level, the third layout level, the fourth layout level or the fifth layout level. In some embodiments, the BCT level is between the M0 level and at least one of the OD level, the POLY level, the MD level or the MDLI level. In some embodiments, the BCT level is above at least one of the OD level, the POLY level, the MD level or the MDLI level. In some embodiments, the MDLI level is below the M0 level.

Other configurations, arrangements on other layout levels or quantities of patterns in the set of contact patterns 316 are within the scope of the present disclosure.

Layout design 300 further includes one or more conductive feature patterns 330a, 330b, 330c, 330d, 330e, 330f (collectively referred to as a "set of conductive feature patterns 330") extending in the first direction X.

Each conductive feature pattern in the set of conductive feature patterns 330 is separated from another conductive feature pattern in the set of conductive feature patterns 330 in the second direction Y.

The set of conductive feature patterns 330 overlap at least one of the set of active region patterns 302 or 304, the set of gate patterns 306 or 308 or the set of contact patterns 310, 312, 314 or 316.

The set of conductive feature patterns 330 is usable to manufacture a corresponding set of conductors 430 of integrated circuit 100A-100C, 200A, 200B, 400 or 600. Conductive feature patterns 330a, 330b, 330c, 330d, 330e, 330f are usable to manufacture corresponding conductors 430a, 430b, 430c, 430d, 430e, 430f of integrated circuit 100A-100C, 200A, 200B, 400 or 600. In some embodiments, at least one conductor of the set of conductors 430 is located on the front-side 403a of integrated circuit 100A-100C, 200A, 200B, 400 or 600.

In some embodiments, the set of conductive feature patterns 330 is located on a seventh layout level. In some embodiments, the seventh layout level is different from at least one of the first layout level, the second layout level, the third layout level, the fourth layout level, the fifth layout level or the sixth layout level. In some embodiments, the seventh layout level corresponds to the M0 level of one or more of layout design 300 or 500 or integrated circuits 100, 200A, 200B, 400 or 600. In some embodiments, the M0 level is above the OD level, the POLY level, the MD level, the BMD level and the BM0 level.

In some embodiments, the set of conductive feature patterns 330 correspond to 4 M0 routing tracks. Other numbers of M0 routing tracks are within the scope of the present disclosure.

Other configurations, arrangements on other layout levels or quantities of patterns in the set of conductive feature patterns 330 are within the scope of the present disclosure.

Layout design 300 further includes one or more conductive feature patterns 332*a*, 332*b*, 332*e*, 332*f* (collectively referred to as a "set of conductive feature patterns 332") extending in the first direction X.

Each conductive feature pattern in the set of conductive feature patterns 332 is separated from another conductive feature pattern in the set of conductive feature patterns 332 in the second direction Y.

The set of conductive feature patterns 332 is overlapped by at least one of the set of active region patterns 302 or 304, the set of gate patterns 306 or 308 or the set of contact patterns 310, 312, 314 or 316.

The set of conductive feature patterns 330 and 332 are separated from one another in the third direction Z. In some embodiments, conductive feature patterns 330*a* and 332*a* are separated from one another in the third direction Z. In some embodiments, conductive feature patterns 330*b* and 332*b* are separated from one another in the third direction Z. In some embodiments, conductive feature patterns 330*e* and 332*e* are separated from one another in the third direction Z. In some embodiments, conductive feature patterns 330*f* and 332*f* are separated from one another in the third direction Z.

The set of conductive feature patterns 332 is usable to manufacture a corresponding set of conductors 432 of integrated circuit 100A-100C, 200A, 200B, 400 or 600. Conductive feature patterns 332*a*, 332*b*, 332*e*, 332*f* are usable to manufacture corresponding conductors 432*a*, 432*b*, 432*e*, 432*f* of integrated circuit 100A-100C, 200A, 200B, 400 or 600. In some embodiments, at least one conductor of the set of conductors 432 is located on the back-side 403*b* of integrated circuit 100A-100C, 200A, 200B, 400 or 600.

In some embodiments, the set of conductive feature patterns 332 is located on an eighth layout level. In some embodiments, the eighth layout level is different from at least one of the first layout level, the second layout level, the third layout level, the fourth layout level, the fifth layout level, the sixth layout level or the seventh layout level. In some embodiments, the eighth layout level corresponds to the BM0 level of one or more of layout design 300 or 500 or integrated circuits 100, 200A, 200B, 400 or 600. In some embodiments, the BM0 level is below the OD level, the POLY level, the MD level and the BMD level.

In some embodiments, the set of conductive feature patterns 332 correspond to 4 BM0 routing tracks. Other numbers of BM0 routing tracks are within the scope of the present disclosure.

Other configurations, arrangements on other layout levels or quantities of patterns in the set of conductive feature patterns 332 are within the scope of the present disclosure.

Layout design 300 further includes one or more via patterns 320*a*, 320*b*, 320*c*, 320*d* (collectively referred to as a "set of via patterns 320").

The set of via patterns 320 is usable to manufacture a corresponding set of vias 420 of integrated circuit 100A-100C, 200A, 200B, 400 or 600. In some embodiments, via patterns 320*a*, 320*b*, 320*c*, 320*d* of the set of via patterns 320 are usable to manufacture corresponding vias 420*a*, 420*b*, 420*c*, 420*d* of the set of vias 420 of integrated circuit 100A-100C, 200A, 200B, 400 or 600.

In some embodiments, the set of via patterns 320 is between the set of contact patterns 310 and the set of conductive feature patterns 330. Via pattern 320*a* is between contact pattern 310*a* and conductive feature pattern 330*a*. Via pattern 320*b* is between contact pattern 310*b* and conductive feature pattern 330*c*. Via pattern 320*c* is between contact pattern 310*c* and conductive feature pattern 330*d*. Via pattern 320*d* is between contact pattern 310*d* and conductive feature pattern 330*f*.

The set of via patterns 320 is positioned at a via over diffusion (VD) level of one or more of layout design 300 or 500 or integrated circuits 100, 200A, 200B, 400 or 600. In some embodiments, the VD level is above the OD level, the POLY level, the MD level, the BMD level and the BM0 level. In some embodiments, the VD level is below the M0 level. In some embodiments, the VD level is between the MD level and the M0 level. In some embodiments, the VD level is between the third layout level and the seventh layout level. Other layout levels are within the scope of the present disclosure.

Other configurations, arrangements on other layout levels or quantities of patterns in at least set of via patterns 320 are within the scope of the present disclosure.

Layout design 300 further includes one or more via patterns 322*a*, 322*d* (collectively referred to as a "set of via patterns 322").

The set of via patterns 322 is usable to manufacture a corresponding set of vias 422 of integrated circuit 100A-100C, 200A, 200B, 400 or 600. In some embodiments, via patterns 322*a*, 322*d* of the set of via patterns 322 are usable to manufacture corresponding vias 422*a*, 422*d* of the set of vias 422 of integrated circuit 100A-100C, 200A, 200B, 400 or 600.

In some embodiments, the set of via patterns 322 is between the set of contact patterns 312 and the set of conductive feature patterns 332. Via pattern 322*a* is between contact pattern 312*a* and conductive feature pattern 332*a*. Via pattern 322*d* is between contact pattern 312*d* and conductive feature pattern 332*f*.

The set of via patterns 322 is positioned at a back-side via over diffusion (BVD) level of one or more of layout design 300 or 500 or integrated circuits 100, 200A, 200B, 400 or 600. In some embodiments, the BVD level is below the OD level, the POLY level, the MD level, the BMD level and the M0 level. In some embodiments, the BVD level is above the BM0 level. In some embodiments, the BVD level is between the BMD level and the BM0 level. In some embodiments, the BVD level is between the fourth layout level and the eighth layout level. Other layout levels are within the scope of the present disclosure.

Other configurations, arrangements on other layout levels or quantities of patterns in at least set of via patterns 322 are within the scope of the present disclosure.

Layout design 300 further includes one or more via patterns 324*a*, 324*b* (collectively referred to as a "set of via patterns 324").

The set of via patterns 324 is usable to manufacture a corresponding set of vias 424 of integrated circuit 100A-100C, 200A, 200B, 400 or 600. In some embodiments, via patterns 324*a*, 324*b* of the set of via patterns 324 are usable to manufacture corresponding vias 424a, 424b of the set of vias 424 of integrated circuit 100A-100C, 200A, 200B, 400 or 600.

In some embodiments, the set of via patterns 324 is between the set of gate patterns 306 and the set of conductive feature patterns 330. Via pattern 324a is between gate pattern 306b and conductive feature pattern 330b. Via pattern 324b is between gate pattern 306c and conductive feature pattern 330e.

The set of via patterns 324 is positioned at a via over gate (VG) level of one or more of layout design 300 or 500 or integrated circuits 100, 200A, 200B, 400 or 600. In some embodiments, the VG level is above the OD level, the POLY level, the MD level, the MDLI level, the BCT level, the BMD level, the BM0 level and the BM1 level. In some embodiments, the VG level is below the M0 level. In some embodiments, the VG level is between the POLY level and the M0 level. In some embodiments, the VG level is between the second layout level and the seventh layout level. Other layout levels are within the scope of the present disclosure.

Other configurations, arrangements on other layout levels or quantities of patterns in at least set of via patterns 324 are within the scope of the present disclosure.

Layout design 300 further includes one or more via patterns 326a, 326b (collectively referred to as a "set of via patterns 326").

The set of via patterns 326 is usable to manufacture a corresponding set of vias 426 of integrated circuit 100A-100C, 200A, 200B, 400 or 600. In some embodiments, via patterns 326a, 326b of the set of via patterns 326 are usable to manufacture corresponding vias 426a, 426b of the set of vias 426 of integrated circuit 100A-100C, 200A, 200B, 400 or 600.

In some embodiments, the set of via patterns 326 is between the set of gate patterns 308 and the set of conductive feature patterns 332. Via pattern 326a is between gate pattern 308b and conductive feature pattern 332b. Via pattern 326b is between gate pattern 308c and conductive feature pattern 332e.

The set of via patterns 326 is positioned at a back-side via over gate (BVG) level of one or more of layout design 300 or 500 or integrated circuits 100, 200A, 200B, 400 or 600. In some embodiments, the BVG level is below the OD level, the POLY level, the MD level, the MDLI level, the BCT level, the BMD level and the M0 level. In some embodiments, the BVG level is above the BM0 level. In some embodiments, the BVG level is between the POLY level and the BM0 level. In some embodiments, the BVG level is between the second layout level and the eighth layout level. Other layout levels are within the scope of the present disclosure.

Other configurations, arrangements on other layout levels or quantities of patterns in at least set of via patterns 326 are within the scope of the present disclosure.

Layout design 300 further includes one or more conductive feature patterns 340a, 340b, 340c, 340d (collectively referred to as a "set of conductive feature patterns 340") extending in the second direction Y.

Each conductive feature pattern in the set of conductive feature patterns 340 is separated from another conductive feature pattern in the set of conductive feature patterns 340 in the first direction X.

The set of conductive feature patterns 340 overlap at least one of the set of active region patterns 302 or 304, the set of gate patterns 306 or 308 or the set of contact patterns 310, 312, 314 or 316 or the set of conductive feature patterns 330 or 332.

The set of conductive feature patterns 340 is usable to manufacture a corresponding set of conductors 440 of integrated circuit 100A-100C, 200A, 200B, 400 or 600. Conductive feature patterns 340a, 340b, 340c, 340d are usable to manufacture corresponding conductors 440a, 440b, 440c, 440d of integrated circuit 100A-100C, 200A, 200B, 400 or 600. In some embodiments, at least one conductor of the set of conductors 440 is located on the front-side 403a of integrated circuit 100A-100C, 200A, 200B, 400 or 600.

In some embodiments, conductive feature pattern 340a corresponds to the bit line bar BLB_FS. In some embodiments, conductive feature pattern 340b corresponds to the word line WL. In some embodiments, conductive feature pattern 340c corresponds to the word line WL. In some embodiments, conductive feature pattern 340d corresponds to the bit line BL_FS. In some embodiments, conductive feature pattern 340b and conductive feature pattern 340c are a single, continuous pattern.

In some embodiments, the set of conductive feature patterns 340 is located on a ninth layout level. In some embodiments, the ninth layout level is different from at least one of the first layout level, the second layout level, the third layout level, the fourth layout level, the fifth layout level, the sixth layout level, the seventh layout level or the eighth layout level. In some embodiments, the ninth layout level corresponds to one of the M1, M2 or M3 level of one or more of layout design 300 or 500 or integrated circuits 100A-100C, 200A, 200B, 400 or 600. In some embodiments, the M1, M2 or M3 level is above the OD level, the POLY level, the MD level, the BMD level, the BM0 level and the BM1 level.

In some embodiments, the set of conductive feature patterns 340 corresponds to 4 M1 routing tracks. Other numbers of M1 routing tracks are within the scope of the present disclosure.

In some embodiments, the set of conductive feature patterns 340 corresponds to 4 M2 routing tracks. Other numbers of M2 routing tracks are within the scope of the present disclosure.

In some embodiments, the set of conductive feature patterns 340 corresponds to 4 M3 routing tracks. Other numbers of M3 routing tracks are within the scope of the present disclosure.

Other configurations, arrangements on other layout levels or quantities of patterns in the set of conductive feature patterns 340 are within the scope of the present disclosure.

FIG. 3B is a diagram of a portion 300B of layout design 300, simplified for ease of illustration.

Portion 300B is a variation of portion 300A of layout design 300, and similar detailed description is omitted for brevity.

Portion 300B includes a region 350a1, a region 350b1 and a region 350c1.

Region 350a1 is portion 300A of FIG. 3A, and similar detailed description is omitted for brevity.

Region 350b1 identifies M0 track usage for the set of conductive feature patterns 330. Stated differently, region 350b1 identifies M0 signals for corresponding conductive feature patterns in the set of conductive feature patterns 330 for the front-side of integrated circuit 400. For example, conductive feature pattern 330a is useable for the reference supply voltage VSS, conductive feature pattern 330b is useable for the word line WL, conductive feature pattern 330c is useable for the bit line BL_FS, conductive feature pattern 330d is useable for the bit line bar BLB_FS, conductive feature pattern 330e is useable for the word line WL, and conductive feature pattern 330*f* is useable for the reference supply voltage VSS, and in accordance with some embodiments.

Region 350*c*1 identifies BM0 track usage for the set of conductive feature patterns 332. Stated differently, region 350*c*1 identifies BM0 signals for corresponding conductive feature patterns in the set of conductive feature patterns 332 for the back-side of integrated circuit 400. For example, conductive feature pattern 332*a* is useable for the supply voltage VDD, conductive feature pattern 332*b* is useable for the supply voltage VDD, conductive feature pattern 332*e* is useable for the supply voltage VDD, and conductive feature pattern 332*f* is useable for the supply voltage VDD, and in accordance with some embodiments.

In some embodiments, conductive feature pattern 332*c* and conductive feature pattern 332*d* are shown in region 350*c*1 merely for illustration of BM0 metal tracks, and region 350*c*1 does not include conductive feature pattern 332*c* and conductive feature pattern 332*d*. In some embodiments, if layout design 300 included a bit line and a bit line bar on the back-side, then conductive feature pattern 332*c* is useable for the bit line BL_BS, conductive feature pattern 332*d* is useable for the bit line bar BLB_BS.

Other M0 track assignments are within the scope of the present disclosure.

In some embodiments, by configuring one or more conductive feature patterns of the set of conductive feature patterns 330 as a bit line BL_FS configured to transmit/receive a corresponding bit line signal to/from the front-side of the substrate thereby causes layout design 300 to have reduced resistance capacitance (RC) loading compared to other approaches thereby causing the layout design 300 to have increased speed and reduced power consumption than other approaches.

In some embodiments, by configuring one or more conductive feature patterns of the set of conductive feature patterns 330 as a bit line bar BLB_FS configured to transmit/receive a corresponding bit line signal to/from the front-side of the substrate thereby causes layout design 300 to have reduced RC loading compared to other approaches thereby causing the layout design 300 to have increased speed and reduced power consumption than other approaches.

Other configurations, arrangements on other layout levels or quantities of patterns in layout design 300 are within the scope of the present disclosure.

FIGS. 4A-4H are diagrams of an integrated circuit 400, in accordance with some embodiments.

FIGS. 4A-4C are corresponding diagrams of corresponding portions 400A-400C of an integrated circuit 400, simplified for ease of illustration.

Portion 400A includes one or more features of integrated circuit 400 of the OD level, the POLY level, the MD level, the MDLI level, the BCT level, the M0 level, the VG level, the VD level, the BMD level, the BM0 level, the BVG level, and the BVD level. Portion 400A is manufactured by portion 300A.

Portion 400B includes one or more features of integrated circuit 400 of the OD level, the POLY level, the MD level, the MDLI level, the BCT level, the M0 level, the VG level, the VD level, the BMD level, the BM0 level, the BVG level, and the BVD level. Portion 400B is manufactured by portion 300B.

Portion 400C includes one or more features of integrated circuit 400 of the M1 level. In some embodiments, portion 400C includes one or more features of integrated circuit 400 of the M2 level. In some embodiments, portion 400C includes one or more features of integrated circuit 400 of the M3 level.

Figure 4D:
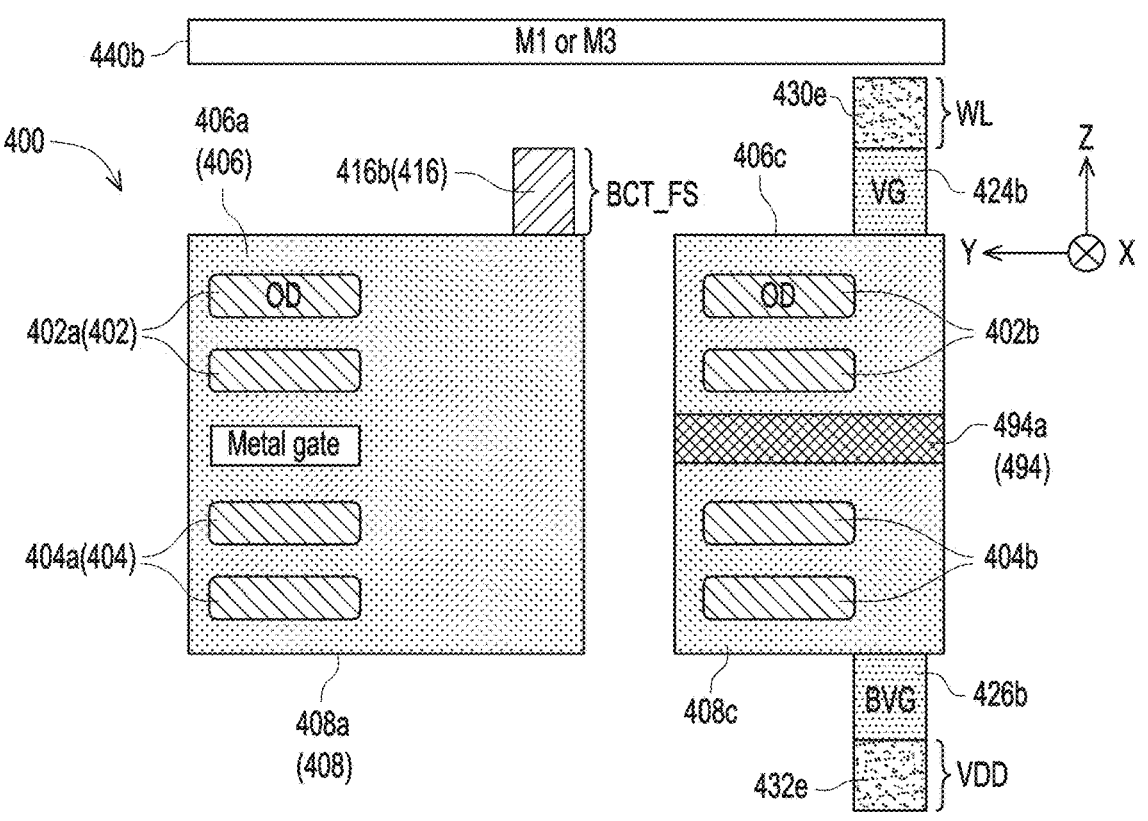
Figure 4E:
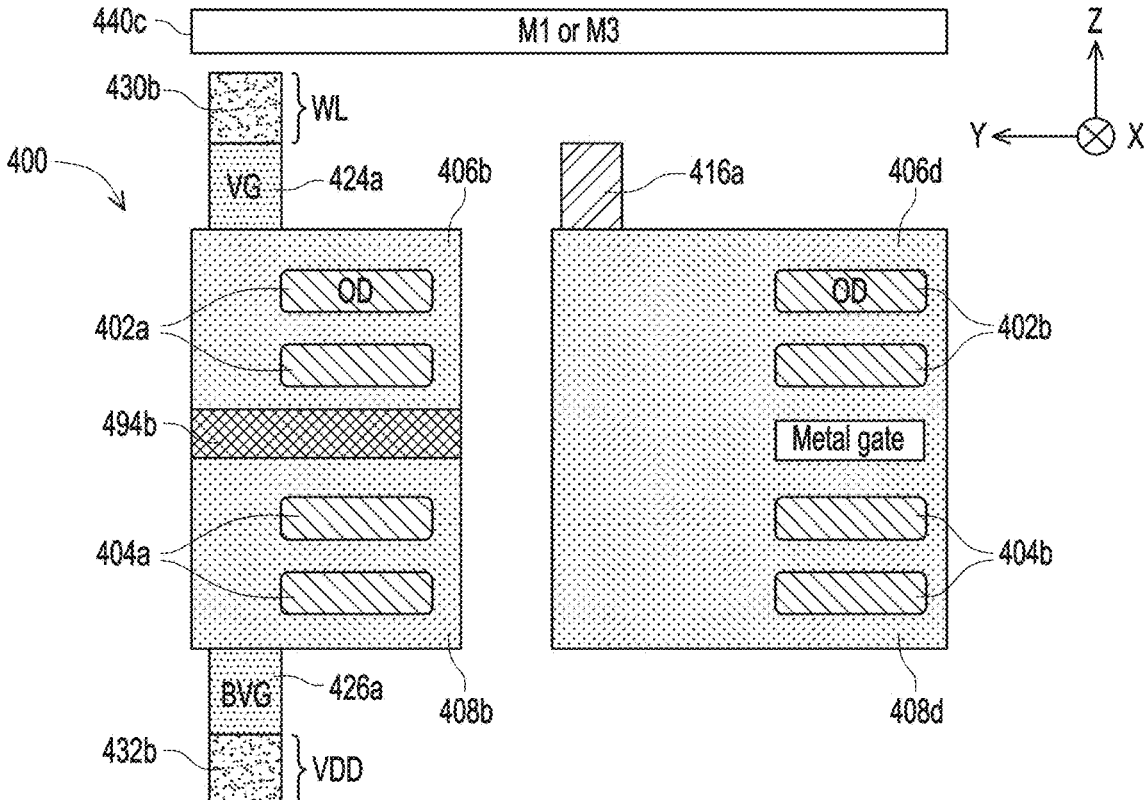
Figures 4F, 4G:
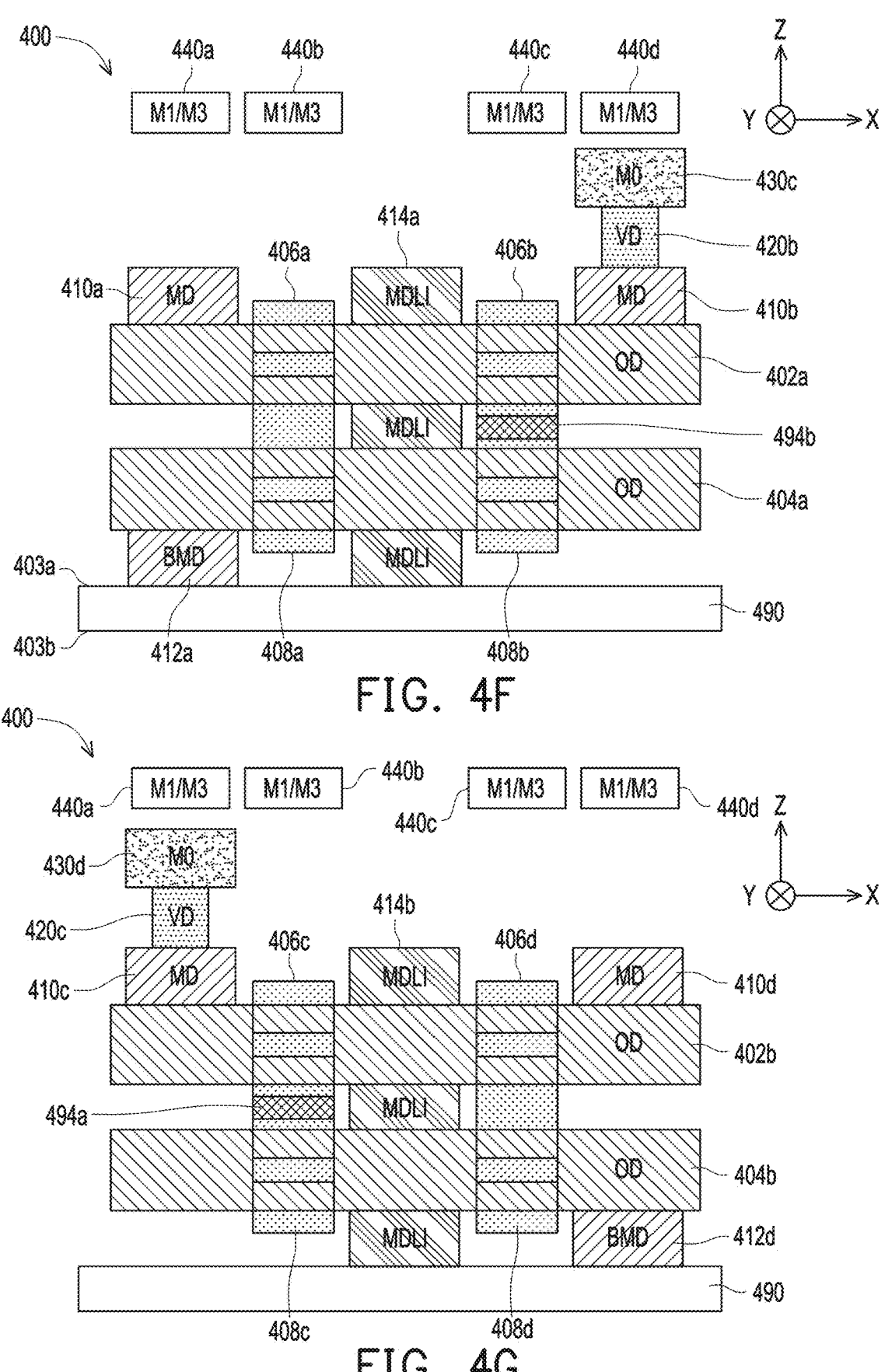
Figure 4H:
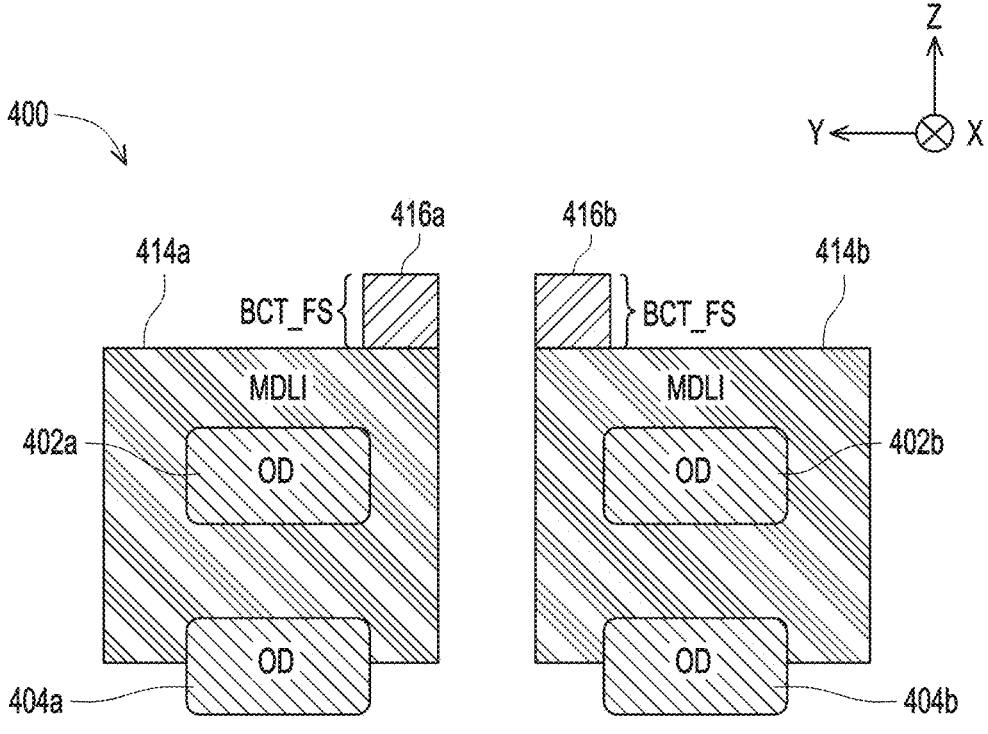

FIGS. 4D-4H are corresponding cross-sectional views of integrated circuit 400, in accordance with some embodiments. FIG. 4D is a cross-sectional view of integrated circuit 400 as intersected by plane A-A', in accordance with some embodiments. FIG. 4E is a cross-sectional view of integrated circuit 400 as intersected by plane B-B', in accordance with some embodiments. FIG. 4F is a cross-sectional view of integrated circuit 400 as intersected by plane C-C', in accordance with some embodiments. FIG. 4G is a cross-sectional view of integrated circuit 400 as intersected by plane D-D', in accordance with some embodiments. FIG. 4H is a cross-sectional view of integrated circuit 400 as intersected by plane E-E', in accordance with some embodiments.

Components that are the same or similar to those in one or more of FIGS. 1, 2A-2B, 3A-3D, 4A-4H, 5A-5C and 6A-6G are given the same reference numbers, and detailed description thereof is thus omitted.

Integrated circuit 400 is manufactured by layout design 300. Integrated circuit 400 is cell 401. Structural relationships including alignment, lengths and widths, as well as configurations and layers of integrated circuit 400 and 600 are similar to the structural relationships and configurations and layers of layout design 300 or 500 of FIGS. 3A-3C and 5A-5C, and similar detailed description will not be described in at least FIGS. 4A-4H, for brevity. For example, in some embodiments, at least one or more widths, lengths or pitches of layout design 300 or 500 is similar to corresponding widths, lengths or pitches of integrated circuit 400 and 600, and similar detailed description is omitted for brevity. For example, in some embodiments, at least cell boundary 301*a* or 301*b* is similar to at least corresponding cell boundary 401*a* or 401*b* of integrated circuit 400, and similar detailed description is omitted for brevity.

Integrated circuit 400 includes at least the set of active regions 402 and 404, the set of gates 406 and 408, the set of contacts 410, the set of contacts 412, the set of contacts 414, the set of contacts 416, the set of conductors 430, the set of conductors 432, the set of vias 420, the set of vias 422, the set of vias 424, the set of vias 426, the set of conductors 440, a substrate 490, an insulating region 492 and a set of insulating regions 494.

The set of active regions 402 and 404 are embedded in substrate 490. Substrate 490 has a front-side 403*a* and a back-side 403*b* opposite from the front-side 403*a*. In some embodiments, at least the set of active regions 402 and 404, the set of gates 406 and 408 or the set of contacts 410, 412, 414 and 416 are formed in the front-side 403*a* of substrate 490.

In some embodiments, the set of active regions 402 and 404 correspond to active regions of CFET transistors. In some embodiments, the set of active regions 402 and 404 correspond to nanosheet structures (not labelled) of nanosheet transistors. In some embodiments, the set of active regions 402 include drain regions and source regions grown by an epitaxial growth process. In some embodiments, the set of active regions 402 include drain regions and source regions that are grown with an epitaxial material at the corresponding drain regions and source regions.

Other transistor types are within the scope of the present disclosure. For example, in some embodiments, the set of active regions 402 corresponds to nanowire structures (not shown) of nanowire transistors. In some embodiments, the set of active regions 402 corresponds to planar structures (not shown) of planar transistors. In some embodiments, the set of active regions 402 corresponds to fin structures (not shown) of finFETs.

In some embodiments, active regions 402a and 402b correspond to source and drain regions of NFET transistors of integrated circuit 100A-100C, 200A, 200B, 400 or 600, and active regions 404a and 404b correspond to source and drain regions of PFET transistors of integrated circuit 100A-100C, 200A, 200B, 400 or 600.

In some embodiments, active regions 402a and 402b correspond to source and drain regions of PFET transistors of integrated circuit 100A-100C, 200A, 200B, 400 or 600, and active regions 404a and 404b correspond to source and drain regions of NFET transistors of integrated circuit 100A-100C, 200A, 200B, 400 or 600.

In some embodiments, at least active region 402a or 402b is an N-type doped S/D region, and at least active region 404a or 404b is a P-type doped S/D region embedded in a dielectric material of substrate 490. In some embodiments, at least active region 402a or 402b is a P-type doped S/D region, and at least active region 404a or 404b is an N-type doped S/D region embedded in a dielectric material of substrate 490.

Other configurations, arrangements on other layout levels or quantities of structures in the set of active regions 402 or 404 are within the scope of the present disclosure.

Figure 7:
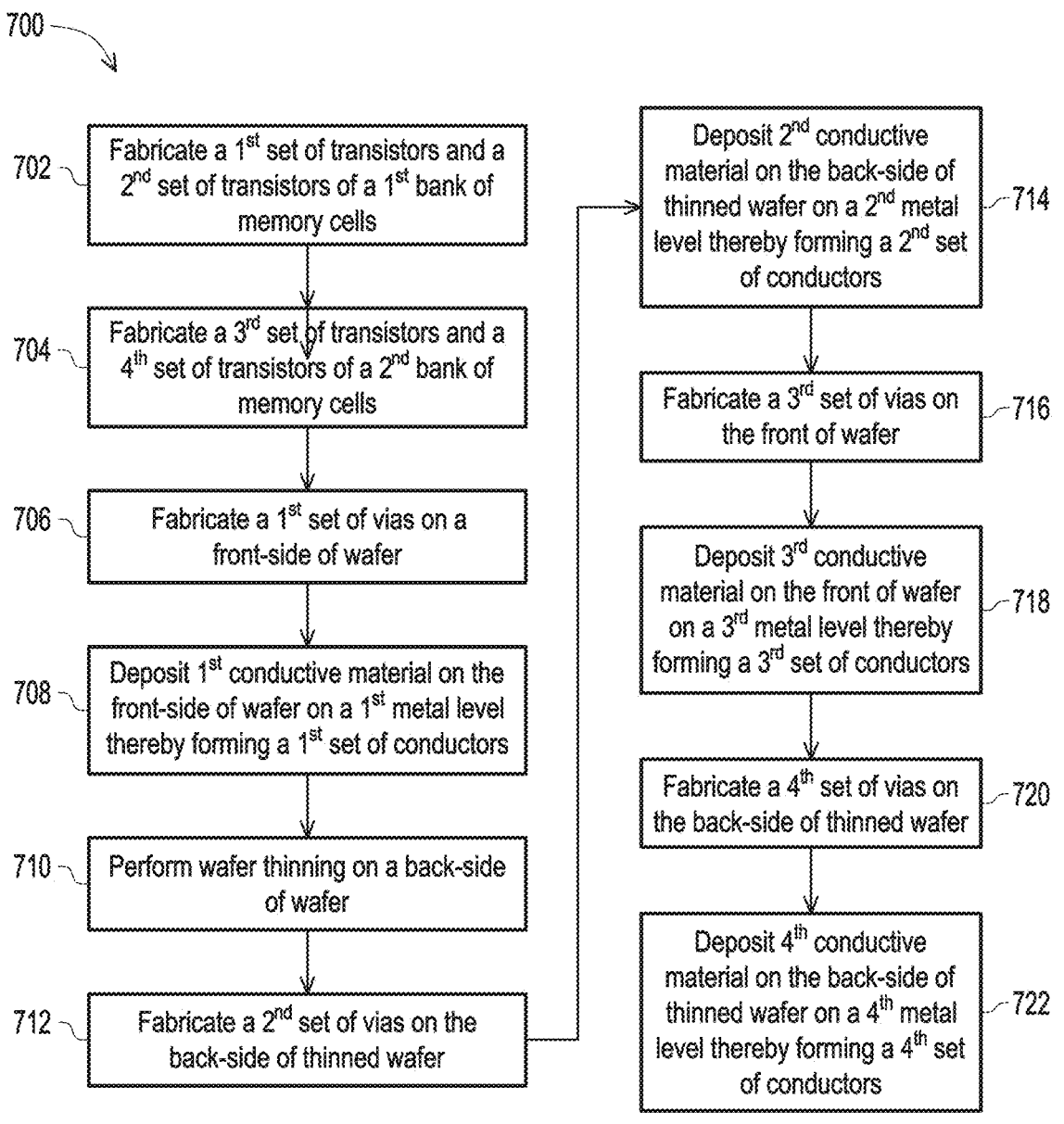
FIG. 7 is a functional flow chart of a method of manufacturing an integrated circuit, in accordance with some embodiments.

Insulating region 492 is configured to electrically isolate one or more elements of the set of active regions 402 and 404, the set of gates 406 and 408, the set of contacts 410, the set of contacts 412, the set of contacts 414, the set of contacts 416, the set of conductors 430, the set of conductors 432, the set of vias 420, the set of vias 422, the set of vias 424, the set of vias 426 or the set of conductors 440 from one another. In some embodiments, insulating region 492 includes multiple insulating regions deposited at different times from each other during method 700 (FIG. 7). In some embodiments, insulating region 492 is a dielectric material. In some embodiments, the dielectric material includes silicon dioxide, silicon oxy-nitride, or the like.

Other configurations, arrangements on other layout levels or other numbers of portions in insulating region 492 are within the scope of the present disclosure.

The set of gates 406 and 408 correspond to one or more gates of transistors N2-1, P2-1, N2-2, P2-2, N2-3, P2-3, N2-4, P2-4 of integrated circuits 100, 200A, 200B, 400 or 600. In some embodiments, each of the gates in the set of gates 406 and 408 are shown in FIGS. 4A-4B and FIGS. 6A-6B with labels "N2-1, P2-1, N2-2, P2-2, N2-3, P2-3, N2-4, P2-4" that identify corresponding transistors of FIGS. 2A-2B having corresponding gates in FIGS. 4A-4B and FIGS. 6A-6B, and are omitted for brevity.

In some embodiments, gate 406a is a gate of NFET transistor N2-1, gate 408a is a gate of PFET transistor P2-1, gate 406b is a gate of NFET transistor N2-3, gate 406c is a gate of NFET transistor N2-4, gate 406d is a gate of NFET transistor N2-2, and gate 408d is a gate of PFET transistor P2-2.

In some embodiments, gate 408b is a dummy gate of a dummy transistor. In some embodiments, gate 408c is another dummy gate of another dummy transistor.

In some embodiments, in FIGS. 4A-4B, gate 408b corresponds to PFET transistor P2-3 (shown in FIG. 2B), and PFET transistor P2-3 is a dummy transistor. In some embodiments, in FIGS. 4A-4B, gate 408c corresponds to PFET transistor P2-4 (shown in FIG. 2B), and PFET transistor P2-4 is a dummy transistor.

In some embodiments, gate 406a and gate 408a are coupled together. In some embodiments, gate 406a and gate 408a are part of the same continuous structure. In some embodiments, gate 406d and gate 408d are coupled together. In some embodiments, gate 406d and gate 408d are part of the same continuous structure.

In some embodiments, gate 406b and gate 408b are separated from each other in the third direction Z. In some embodiments, gate 406b and gate 408b are separated from each other in the third direction Z by an insulating region 494b of the set of insulating regions 494.

In some embodiments, gate 406c and gate 408c are separated from each other in the third direction Z. In some embodiments, gate 406c and gate 408c are separated from each other in the third direction Z by an insulating region 494a of the set of insulating regions 494.

In some embodiments, the set of gates 406 or 408 encapsulates the set of active regions 402 or 404.

Other configurations, arrangements on other layout levels or quantities of gates in the set of gates 406 and 408 are within the scope of the present disclosure.

The set of insulating regions 494 includes at least one of insulating region 494a or 494b. In some embodiments, the set of insulating regions 494 are also referred to as a set of gate isolation layers. In some embodiments, at least one of insulating region 494a or 494b is referred to as a corresponding gate isolation layer.

The set of insulating regions 494 is configured to electrically isolate one or more gates of the set of gates 406 or 408 from another gate of the set of gates 406 or 408.

In some embodiments, insulating region 494a is configured to electrically isolate gate 406c and gate 408c from each other. In some embodiments, insulating region 494b is configured to electrically isolate gate 406b and gate 408b from each other.

In some embodiments, set of insulating regions 494a or 494b includes a single insulating region deposited at a single instant of time during method 700 (FIG. 7). In some embodiments, insulating region 494a or 494b includes multiple insulating regions deposited at different times from each other during method 700 (FIG. 7). In some embodiments, insulating region 494 is a dielectric material. In some embodiments, the dielectric material includes silicon dioxide, silicon oxy-nitride, or the like.

Other configurations, arrangements on other layout levels or other numbers of portions in the set of insulating regions 494 are within the scope of the present disclosure.

Each contact of the set of contacts 410 or 412 corresponds to one or more drain or source terminals of transistors N2-1, P2-1, N2-2, P2-2, N2-3, N2-4 of integrated circuits 100, 200A, 200B, 400 or 600. In some embodiments, one or more contacts of the set of contacts 410 or 412 overlaps a pair of active regions of the set of active regions 402 and 404, thereby electrically coupling the pair of active regions of the set of active regions 402 and 404, and the source or drain of the corresponding transistors.

In some embodiments, the set of contacts 410 or 412 encapsulates the set of active regions 402 or 404.

In some embodiments, contact 410a corresponds to the source terminal of NFET transistor N2-1. In some embodiments, contact 412a corresponds to the source terminal of PFET transistor P2-1.

In some embodiments, contact 410b corresponds to the source terminal of NFET transistor N2-3.

In some embodiments, contact 410c corresponds to the source terminal of NFET transistor N2-4.

In some embodiments, contact 410d corresponds to the source terminal of NFET transistor N2-2. In some embodiments, contact 412d corresponds to the source terminal of PFET transistor P2-2.

In some embodiments, contact 414a corresponds to the drain terminals of NFET transistors N2-1 and N2-3, and the drain terminal of PFET transistor P2-1.

In some embodiments, contact 414b corresponds to the drain terminals of NFET transistors N2-4 and N2-2, and the drain terminals of PFET transistor P2-2.

In some embodiments, contact 416a is in direct contact with at least one of gate 406d, gate 408d or contact 414a. In some embodiments, contact 416a couples gate 406d and gate 408d with contact 414a, thereby electrically coupling the gate terminals of transistors N2-2 and P2-2 with the drain terminals of transistors N2-1 and P2-1 and transistor N2-3 together.

In some embodiments, contact 416b is in direct contact with at least one of gate 406a, gate 408a or contact 414b. In some embodiments, contact 416b couples gate 406a and gate 408a with contact 414b, thereby electrically coupling the gate terminals of transistors N2-1 and P2-1 with the drain terminals of transistors N2-4 and transistors N2-2 and P2-2 together.

Other configurations, arrangements on other layout levels or quantities of contacts in the set of contacts 410, 412, 414 and 416 are within the scope of the present disclosure.

The set of conductors 430 and 432 are M0 routing tracks. In some embodiments, the set of conductors 430 and 432 are routing tracks in other layers. In some embodiments, the set of conductors 430 or 432 corresponds to 4 M0 routing tracks.

In some embodiments, the set of conductors 430 corresponds to at least one of the bit line BL_FS, the bit line bar BLB_FS or the word line WL. In some embodiments, the set of conductors 430 is configured to supply the reference supply voltage VSS.

In some embodiments, the set of conductors 432 is configured to supply the supply voltage VDD.

In some embodiments, conductor 430a is configured to supply the reference supply voltage VSS, conductor 430b is the word line WL, conductor 430c is the bit line BL_FS, conductor 430d is the bit line bar BLB_FS, conductor 430e is the word line WL, and conductor 430f is configured to supply the reference supply voltage VSS.

In some embodiments, conductor 432a is configured to supply the supply voltage VDD, conductor 432b is configured to supply the supply voltage VDD, conductor 432e is supply the supply voltage VDD, and conductor 432f is configured to supply the supply voltage VDD.

Other configurations, arrangements on other layout levels or quantities of conductors in the set of conductors 430 and 432 are within the scope of the present disclosure.

The set of vias 420 is configured to electrically couple a corresponding source or drain region of the set of active regions 402 to the set of conductors 430 by the set of contacts 410, and vice versa. The set of vias 420 is between the set of contacts 410 and the set of conductors 430.

The set of vias 422 is configured to electrically couple a corresponding source or drain region of the set of active regions 404 to the set of conductors 432 by the set of contacts 412, and vice versa. The set of vias 422 is between the set of contacts 412 and the set of conductors 432.

The set of vias 424 is configured to electrically couple one or more gates of the set of gates 406 to the set of conductors 430, and vice versa. The set of vias 424 is between the set of gates 406 and the set of conductors 430.

The set of vias 426 is configured to electrically couple one or more gates of the set of gates 408 to the set of conductors 432, and vice versa. The set of vias 426 is between the set of gates 408 and the set of conductors 432.

Via 420a electrically couples conductor 430a and contact 410a together. Via 420b electrically couples conductor 430c and contact 410b together. Via 420c electrically couples conductor 430d and contact 410c together. Via 420d electrically couples conductor 430f and contact 410d together.

Via 422a electrically couples conductor 432a and contact 412a together. Via 422d electrically couples conductor 432f and contact 412d together.

Via 424a electrically couples conductor 430b and gate 406b together. Via 424b electrically couples conductor 430e and gate 406c together.

Via 426a electrically couples conductor 432b and gate 408b together. Via 426b electrically couples conductor 432e and gate 408c together.

Other configurations, arrangements on other layout levels or quantities of vias in the set of vias 420, 422, 424 and 426 are within the scope of the present disclosure.

In some embodiments, the set of conductors 440 corresponds to 4 M1 routing tracks. Other numbers of M1 routing tracks are within the scope of the present disclosure.

In some embodiments, the set of conductors 440 corresponds to 4 M2 routing tracks. Other numbers of M2 routing tracks are within the scope of the present disclosure.

In some embodiments, the set of conductors 440 corresponds to 4 M3 routing tracks. Other numbers of M3 routing tracks are within the scope of the present disclosure.

In some embodiments, the set of conductors 440 corresponds to at least one of the bit line BL_FS, the bit line bar BLB_FS or the word line WL.

In some embodiments, conductor 440a corresponds to the bit line bar BLB_FS, conductor 440b corresponds to the word line WL, conductor 440c corresponds to the word line WL, and conductor 440d corresponds to the bit line BL_FS.

Other configurations, arrangements on other layout levels or quantities of conductors in the set of conductors 440 are within the scope of the present disclosure.

FIG. 4B is a diagram of a portion 400B of integrated circuit 400, simplified for ease of illustration.

Portion 400B is a variation of portion 400A, and similar detailed description is omitted for brevity.

Portion 400B includes a region 450a1, a region 450b1 and a region 450c1.

Region 450a1 is portion 400A of FIG. 4A, and similar detailed description is omitted for brevity.

Region 450b1 identifies M0 track usage for the set of conductors 430. Stated differently, region 450b1 identifies M0 signals for corresponding conductors in the set of conductors 430 for the front-side of integrated circuit 400. For example, conductor 430a is useable for the reference supply voltage VSS, conductor 430b is useable for the word line WL, conductor 430c is useable for the bit line BL_FS, conductor 430d is useable for the bit line bar BLB_FS, conductor 430e is useable for the word line WL, and conductor 430f is useable for the reference supply voltage VSS, and in accordance with some embodiments.

Region 450c1 identifies BM0 track usage for the set of conductors 432. Stated differently, region 450c1 identifies BM0 signals for corresponding conductors in the set of conductors 432 for the back-side of integrated circuit 400. For example, conductor 432a is useable for the supply voltage VDD, conductor 432b is useable for the supply voltage VDD, conductor 432e is useable for the supply voltage VDD, and conductor 432*f* is useable for the supply voltage VDD, and in accordance with some embodiments.

In some embodiments, conductor 432*c* and conductor 432*d* are shown in region 450*c*1 merely for illustration of BM0 metal tracks, and region 450*c*1 does not include conductor 432*c* and conductor 432*d*. In some embodiments, if integrated circuit 400 included a bit line and a bit line bar on the back-side, then conductor 432*c* is useable for the bit line BL_BS, conductor 432*d* is useable for the bit line bar BLB_BS.

Other M0 track assignments are within the scope of the present disclosure.

In some embodiments, at least one gate of the set of gates 406 or 408 are formed using a doped or non-doped polycrystalline silicon (or polysilicon). In some embodiments, at least one gate of the set of gates 406 or 408 include a metal, such as Al, Cu, W, Ti, Ta, TiN, TaN, NiSi, CoSi, other suitable conductive materials, or combinations thereof.

In some embodiments, at least one contact of the set of contacts 410, 412, 414, 416, 610 or 612, or at least one conductor of the set of conductors 430, 432, 440, 630, 632 or 642, or at least one via of the set of vias 420, 422, 424, 426, 620 or 622 includes one or more layers of a conductive material, a metal, a metal compound or a doped semiconductor. In some embodiments, the conductive material includes Tungsten, Cobalt, Ruthenium, Copper, or the like or combinations thereof. In some embodiments, a metal includes at least Cu (Copper), Co, W, Ru, Al, or the like. In some embodiments, a metal compound includes at least AlCu, W—TiN, TiSix, NiSix, TiN, TaN, or the like. In some embodiments, a doped semiconductor includes at least doped silicon, or the like.

In some embodiments, the gate isolation layer 494*b* electrically insulates gate 406*b* and gate 408*b* from each other. In some embodiments, the gate isolation layer 494*a* electrically insulates gate 406*c* and gate 408*c* from each other.

In some embodiments, by configuring one or more conductors of the set of conductors 430 as a bit line BL_FS configured to transmit/receive a corresponding bit line signal to/from the front-side of the substrate thereby causes integrated circuit 400 to have reduced resistance capacitance (RC) loading compared to other approaches thereby causing the integrated circuit 400 to have increased speed and reduced power consumption than other approaches.

In some embodiments, by configuring one or more conductors of the set of conductors 430 as a bit line bar BLB_FS configured to transmit/receive a corresponding bit line signal to/from the front-side of the substrate thereby causes integrated circuit 400 to have reduced RC loading compared to other approaches thereby causing the integrated circuit 400 to have increased speed and reduced power consumption than other approaches.

Other configurations or arrangements of integrated circuit 400 are within the scope of the present disclosure.

Figure 5A:
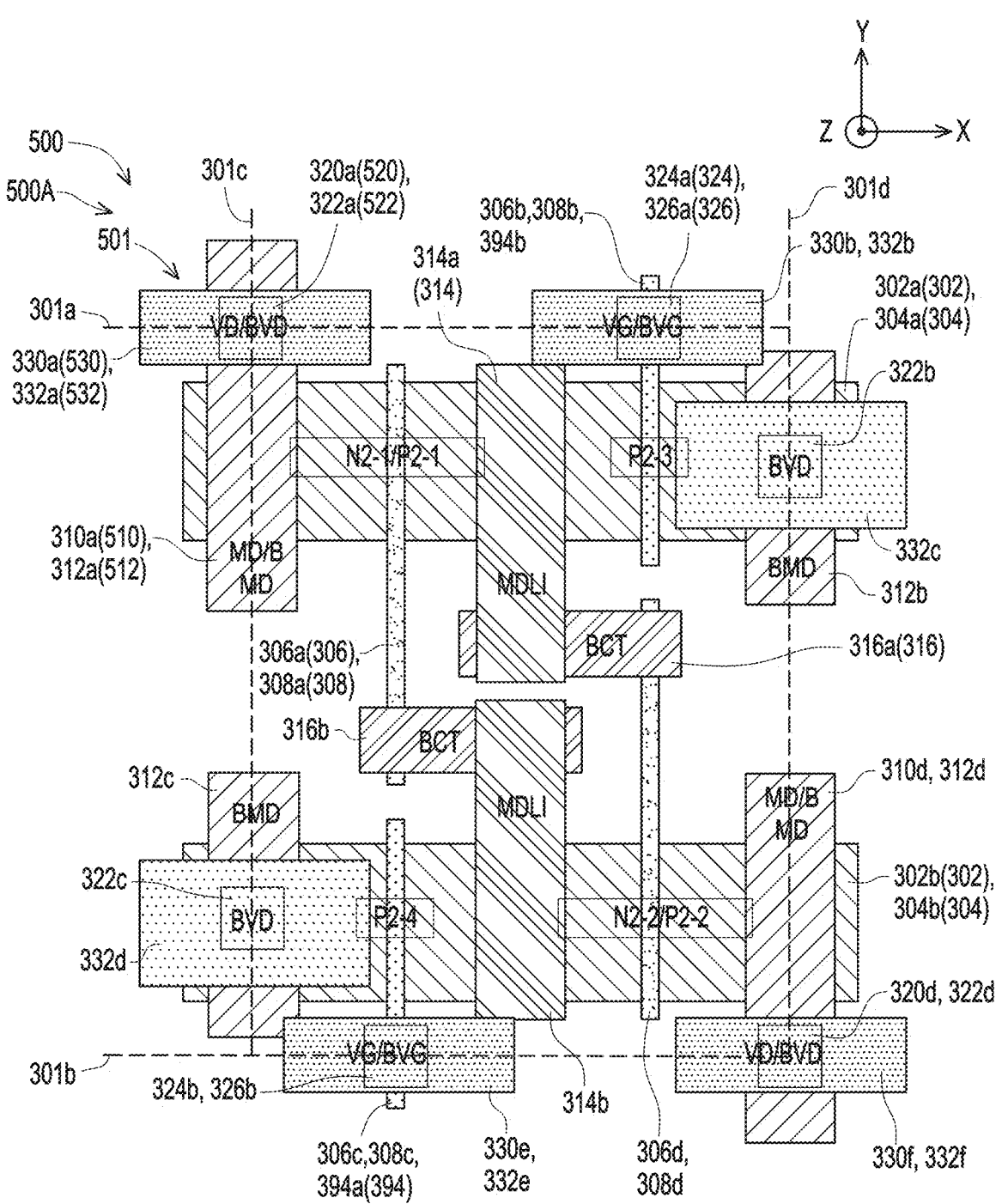
FIGS. 5A-5C are corresponding diagrams of corresponding portions of a layout design of a corresponding integrated circuit, in accordance with some embodiments.
Figure 5B:
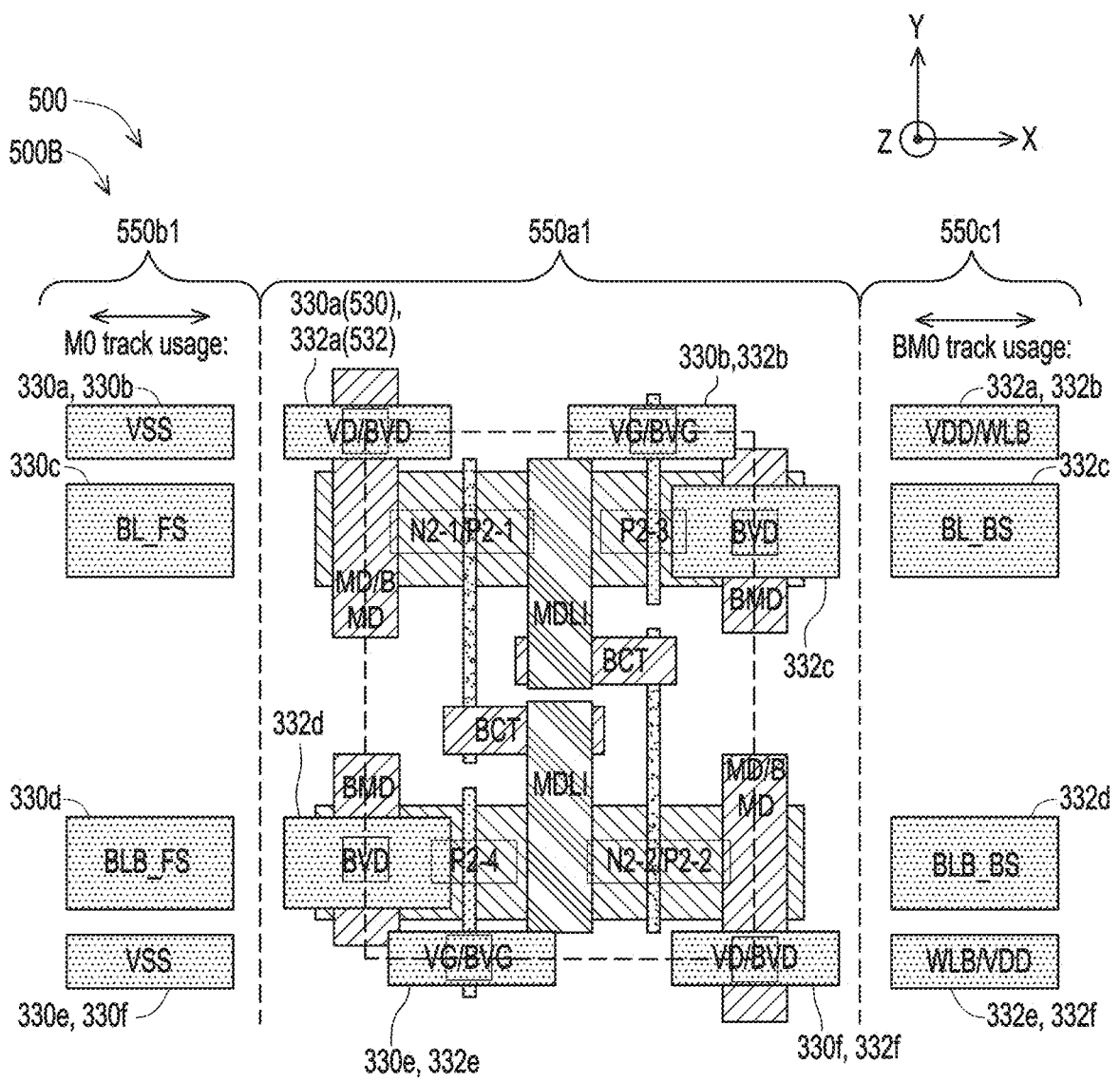
Figure 5C:
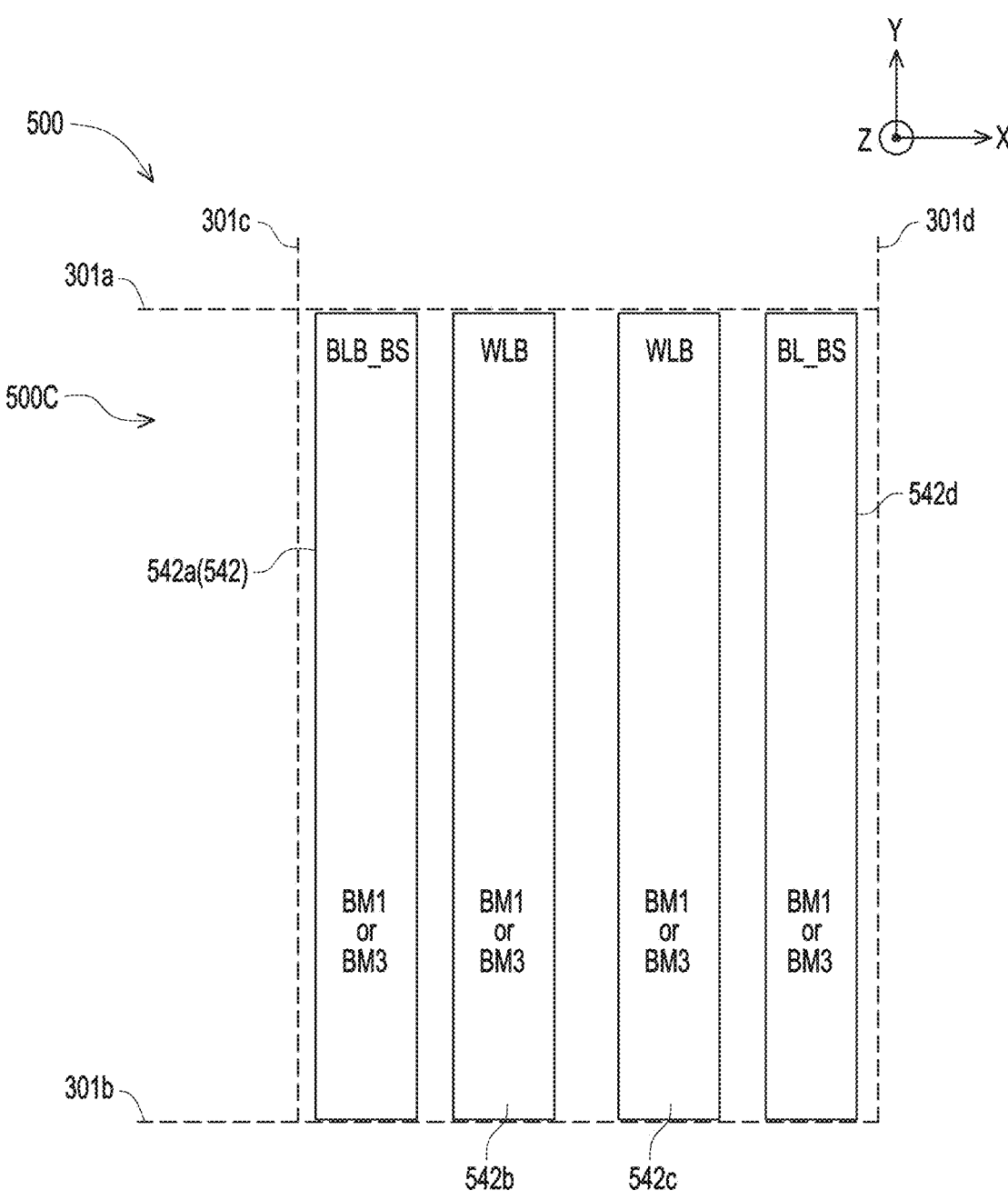

FIGS. 5A-5C are corresponding diagrams of corresponding portions 500A-500C of a layout design 500 of a corresponding integrated circuit, in accordance with some embodiments.

Layout design 500 is a layout of an integrated circuit 600 of FIGS. 6A-6G or memory cell 200B. Layout design 500 is a layout of memory cell 200B of FIG. 2B. In some embodiments, layout design is a layout of at least one of memory cell 152*a* or 152*b*.

Layout design 500 is a variation of layout design 300 of FIGS. 3A-3C, and similar detailed description is omitted for brevity.

In comparison with layout design 300 of FIGS. 3A-3C, a set of contact patterns 510 replaces set of contact patterns 310 of layout design 300, a set of contact patterns 512 replaces set of contact patterns 312 of layout design 300, a set of conductive feature patterns 530 replaces set of conductive feature patterns 330 of layout design 300, a set of conductive feature patterns 532 replaces set of conductive feature patterns 332 of layout design 300, a set of via patterns 520 replaces set of via patterns 320 of layout design 300, and a set of via patterns 522 replaces set of via patterns 322 of layout design 300, a set of conductive feature patterns 542 replaces set of conductive feature patterns 340 of layout design 300, and similar detailed description is omitted for brevity.

In some embodiments, the set of active region patterns 302 in FIGS. 5A-5C corresponds to NFET transistors N2-1 and N2-2.

In some embodiments, the set of active region patterns 304 in FIGS. 5A-5C corresponds to PFET transistors P2-1, P2-2, P2-3 and P2-4.

In some embodiments, gate pattern 308*b* corresponds to PFET transistor P2-3 (shown in FIG. 2B), and gate pattern 308*c* corresponds to PFET transistor P2-4 (shown in FIG. 2B).

In some embodiments, in FIGS. 5A-5B, gate pattern 306*b* is a dummy transistor and corresponds to NFET transistor N2-3 (shown in FIG. 2A). In some embodiments, in FIGS. 5A-5B, gate pattern 306*c* is a dummy transistor, and corresponds to NFET transistor N2-4 (shown in FIG. 2A).

The set of contact patterns 510 includes at least one of contact pattern 310*a* or 310*d*.

In some embodiments, contact pattern 310*a* or 310*d* of the set of contact patterns 510 is usable to manufacture corresponding contact 410*a* or 410*d* of the set of contacts 610.

In some embodiments, contact pattern 310*a* is usable to manufacture source terminals of NFET transistor N2-1, and contact pattern 310*d* is usable to manufacture source terminals of NFET transistor N2-2.

Other configurations, arrangements on other layout levels or quantities of patterns in the set of contact patterns 510 are within the scope of the present disclosure.

The set of contact patterns 512 includes at least one of contact pattern 312*a*, 312*b*, 312*c* or 312*d*. In comparison with set of contact patterns 312 of layout design 300, at least one of contact pattern 312*b* or 312*c* of the set of contact patterns 512 is similar to at least one of contact pattern 312*a* or 312*d*, and similar detailed description is omitted for brevity.

In some embodiments, contact pattern 312*a*, 312*b*, 312*c*, 312*d* of the set of contact patterns 512 is usable to manufacture corresponding contact 412*a*, 412*b*, 412*c*, 412*d* of the set of contacts 612.

In some embodiments, contact pattern 312*a* is usable to manufacture source terminals of PFET transistor P2-1, contact pattern 312*b* is usable to manufacture source terminals of PFET transistor P2-3, contact pattern 312*c* is usable to manufacture source terminals of PFET transistor P2-4, and contact pattern 312*d* is usable to manufacture source terminals of PFET transistor P2-2.

Other configurations, arrangements on other layout levels or quantities of patterns in the set of contact patterns 512 are within the scope of the present disclosure.

In some embodiments, contact pattern 314*a* is usable to manufacture drain terminal of PFET transistor P2-1, drain terminal of NFET transistor N2-1, and drain terminal of PFET transistor P2-3.

In some embodiments, contact pattern 314*b* is usable to manufacture drain terminal of PFET transistor P2-2, drain terminal of NFET transistor N2-2, and drain terminal of PFET transistor P2-4.

Other configurations, arrangements on other layout levels or quantities of patterns in the set of contact patterns 314 are within the scope of the present disclosure.

The set of conductive feature patterns 530 includes at least one of conductive feature pattern 330*a*, 330*b*, 330*e* or 330*f*.

Other configurations, arrangements on other layout levels or quantities of patterns in the set of conductive feature patterns 530 are within the scope of the present disclosure.

The set of conductive feature patterns 532 includes at least one of conductive feature pattern 332*a*, 332*b*, 332*c*, 332*d*, 332*e* or 332*f*. In comparison with the set of conductive feature patterns 332 of layout design 300, at least one of conductive feature patterns 332*c* or 332*d* of the set of conductive feature patterns 532 is similar to at least one of conductive feature pattern 332*a*, 332*b*, 332*e* or 332*f*, and similar detailed description is omitted for brevity.

The set of conductive feature patterns 532 is usable to manufacture a corresponding set of conductors 632 of integrated circuit 600. Conductive feature patterns 332*a*, 332*b*, 332*c*, 332*d*, 332*e*, 332*f* are usable to manufacture corresponding conductors 432*a*, 432*b*, 432*c*, 432*d*, 432*e*, 432*f* of integrated circuit 600. In some embodiments, at least one conductor of the set of conductors 632 is located on the back-side 403*b* of integrated circuit 100A-100C, 200A, 200B, 400 or 600.

Other configurations, arrangements on other layout levels or quantities of patterns in the set of conductive feature patterns 532 are within the scope of the present disclosure.

The set of via patterns 520 includes at least one of via pattern 520*a* or 520*d*.

In some embodiments, via pattern 520*a* or 520*d* of the set of via patterns 520 is usable to manufacture corresponding via 420*a* or 420*d* of the set of vias 620.

Other configurations, arrangements on other layout levels or quantities of patterns in at least set of via patterns 520 are within the scope of the present disclosure.

The set of via patterns 522 includes at least one of via pattern 322*a*, 322*b*, 322*c* or 322*d*.

In comparison with the set of via patterns 322 of layout design 300, at least one of via patterns 322*b* or 322*c* of the set of via patterns 522 is similar to at least one of via pattern 322*a* or 322*d*, and similar detailed description is omitted for brevity.

The set of via patterns 522 is usable to manufacture a corresponding set of vias 622 of integrated circuit 100A-100C, 200A, 200B or 600. In some embodiments, via patterns 322*a*, 322*b*, 322*c*, 322*d* of the set of via patterns 522 are usable to manufacture corresponding vias 422*a*, 422*b*, 422*c*, 422*d* of the set of vias 622 of integrated circuit 100A-100C, 200A, 200B or 600.

In some embodiments, the set of via patterns 522 is between the set of contact patterns 512 and the set of conductive feature patterns 532.

Via pattern 322*b* is between contact pattern 312*b* and conductive feature pattern 332*c*. Via pattern 322*c* is between contact pattern 312*c* and conductive feature pattern 332*d*.

Other configurations, arrangements on other layout levels or quantities of patterns in at least set of via patterns 522 are within the scope of the present disclosure.

The set of conductive feature patterns 542 includes at least one of conductive feature pattern 542*a*, 542*b*, 542*c*, 542*d*. The set of conductive feature patterns 542 extend in the second direction Y.

Each conductive feature pattern in the set of conductive feature patterns 542 is separated from another conductive feature pattern in the set of conductive feature patterns 542 in the first direction X.

The set of conductive feature patterns 542 is overlapped by at least one of the set of active region patterns 302 or 304, the set of gate patterns 306 or 308 or the set of contact patterns 310, 312, 314 or 316 or the set of conductive feature patterns 330 or 332.

The set of conductive feature patterns 542 is usable to manufacture a corresponding set of conductors 642 of integrated circuit 100A-100C, 200A, 200B or 600. Conductive feature patterns 542*a*, 542*b*, 542*c*, 542*d* are usable to manufacture corresponding conductors 642*a*, 642*b*, 642*c*, 642*d* of integrated circuit 100A-100C, 200A, 200B or 600. In some embodiments, at least one conductor of the set of conductors 642 is located on the front-side 403*a* of integrated circuit 100A-100C, 200A, 200B or 600.

In some embodiments, conductive feature pattern 542*a* corresponds to the bit line bar BLB_BS. In some embodiments, conductive feature pattern 542*b* corresponds to the word line WLB. In some embodiments, conductive feature pattern 542*c* corresponds to the word line WLB. In some embodiments, conductive feature pattern 542*d* corresponds to the bit line BL_BS. In some embodiments, conductive feature pattern 542*b* and conductive feature pattern 542*c* are a single, continuous pattern.

In some embodiments, the set of conductive feature patterns 542 is located on a tenth layout level. In some embodiments, the tenth layout level is different from at least one of the first layout level, the second layout level, the third layout level, the fourth layout level, the fifth layout level, the sixth layout level, the seventh layout level, the eighth layout level or the ninth layout level. In some embodiments, the tenth layout level corresponds to one of the BM1, BM2 or BM3 level of one or more of layout design 300 or 500 or integrated circuits 100A-100C, 200A, 200B, 400 or 600. In some embodiments, the BM1, BM2 or BM3 level is below the OD level, the POLY level, the MD level, the BMD level and the BM0 level.

In some embodiments, the set of conductive feature patterns 542 corresponds to 4 BM1 routing tracks. Other numbers of BM1 routing tracks are within the scope of the present disclosure.

In some embodiments, the set of conductive feature patterns 542 corresponds to 4 BM2 routing tracks. Other numbers of BM2 routing tracks are within the scope of the present disclosure.

In some embodiments, the set of conductive feature patterns 542 corresponds to 4 BM3 routing tracks. Other numbers of BM3 routing tracks are within the scope of the present disclosure.

Other configurations, arrangements on other layout levels or quantities of patterns in the set of conductive feature patterns 542 are within the scope of the present disclosure.

FIG. 5B is a diagram of a portion 500B of layout design 500, simplified for ease of illustration.

Portion 500B includes a region 550*a*1, a region 550*b*1 and a region 550*c*1.

Portion 500B is a variation of portion 300B of layout design 300, and similar detailed description is omitted for brevity. In comparison with layout design 300 of FIGS. 3A-3C, region 550*a*1 replaces region 350*a*1 of layout design 300, region 550*b1* replaces region 350*b1* of layout design 300, region 550*c1* replaces region 350*c1* of layout design 300, and similar detailed description is omitted for brevity.

Layout design 500 includes region 550*a1*, region 550*b1* and region 550*c1*.

Region 550*a1* is portion 500A of FIG. 5A, and similar detailed description is omitted for brevity.

Region 550*b1* identifies M0 track usage for the set of conductive feature patterns 330. Stated differently, region 550*b1* identifies M0 signals for corresponding conductive feature patterns in the set of conductive feature patterns 530 for the front-side of integrated circuit 600. For example, conductive feature pattern 330*a* is useable for the reference supply voltage VSS, conductive feature pattern 330*b* is useable for the reference supply voltage VSS, conductive feature pattern 330*e* is useable for the reference supply voltage VSS, and conductive feature pattern 330*f* is useable for the reference supply voltage VSS, and in accordance with some embodiments.

In some embodiments, conductive feature pattern 330*c* and conductive feature pattern 330*d* are shown in region 550*b1* merely for illustration of M0 metal tracks, and region 550*b1* does not include conductive feature pattern 330*c* and conductive feature pattern 330*d*. In some embodiments, if layout design 500 included a bit line and a bit line bar on the front-side, then conductive feature pattern 332*c* is useable for the bit line BL_FS, conductive feature pattern 332*d* is useable for the bit line bar BLB_FS.

Region 550*c1* identifies BM0 track usage for the set of conductive feature patterns 532. Stated differently, region 550*c1* identifies BM0 signals for corresponding conductive feature patterns in the set of conductive feature patterns 532 for the back-side of integrated circuit 600. For example, conductive feature pattern 332*a* is useable for the supply voltage VDD, conductive feature pattern 332*b* is useable for the word line bar WLB, conductive feature pattern 332*c* is useable for the bit line BL_BS, conductive feature pattern 332*d* is useable for the bit line bar BLB_BS, conductive feature pattern 332*e* is useable for the word line bar WLB, and conductive feature pattern 332*f* is useable for the supply voltage VDD, and in accordance with some embodiments.

Other M0 track assignments are within the scope of the present disclosure.

In some embodiments, by configuring one or more conductive feature patterns of the set of conductive feature patterns 532 as a bit line BL_BS configured to transmit/receive a corresponding bit line signal to/from the back-side of the substrate thereby causes layout design 500 to have reduced RC loading compared to other approaches thereby causing the layout design 500 to have increased speed and reduced power consumption than other approaches.

In some embodiments, by configuring one or more conductive feature patterns of the set of conductive feature patterns 532 as a bit line bar BLB_BS configured to transmit/receive a corresponding bit line signal to/from the back-side of the substrate thereby causes layout design 500 to have reduced RC loading compared to other approaches thereby causing the layout design 500 to have increased speed and reduced power consumption than other approaches.

Other configurations, arrangements on other layout levels or quantities of patterns in layout design 500 are within the scope of the present disclosure.

FIGS. 6A-6G are diagrams of an integrated circuit 600, in accordance with some embodiments.

Figure 6A:
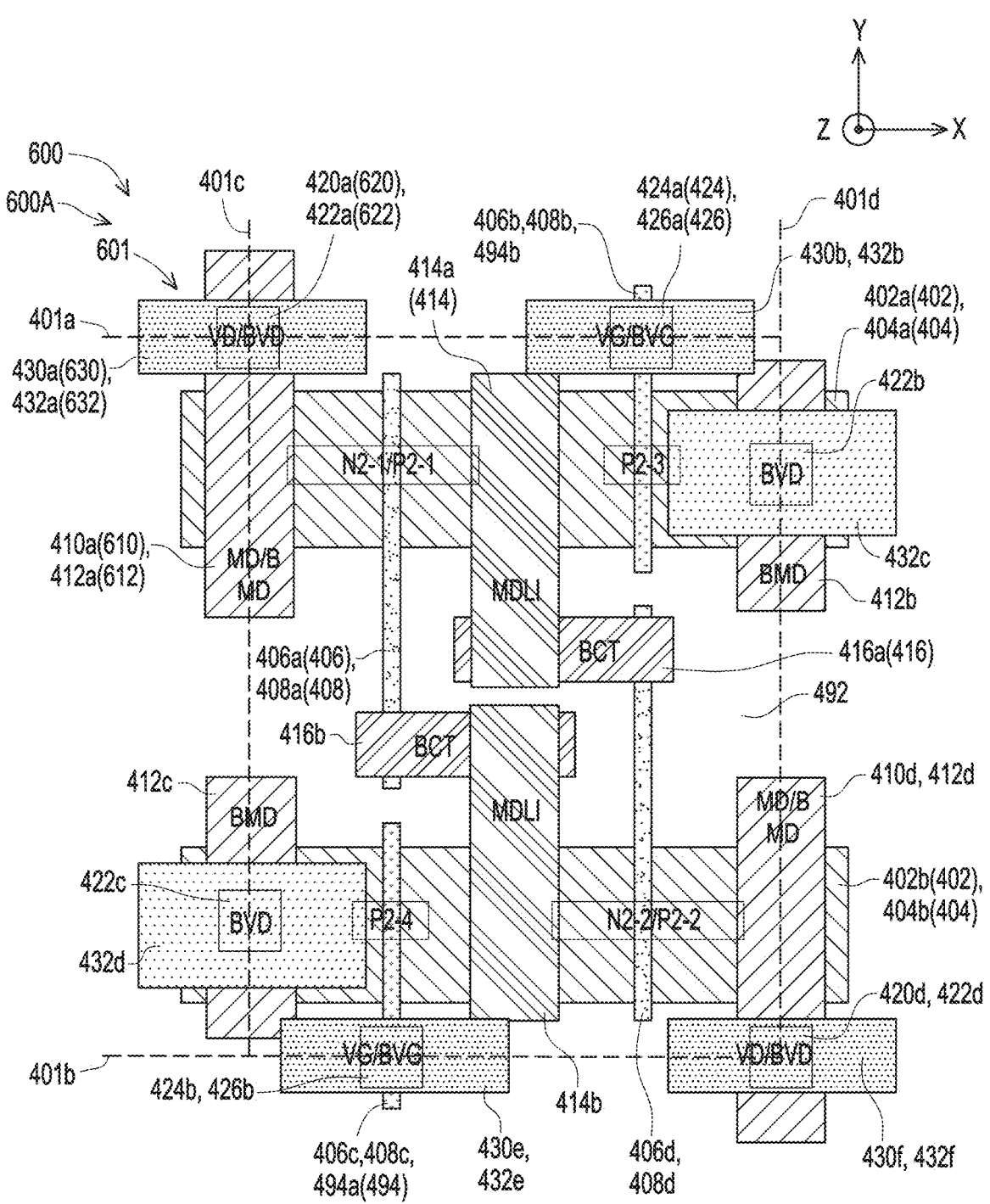
FIGS. 6A-6G are diagrams of an integrated circuit, in accordance with some embodiments.
Figure 6B:
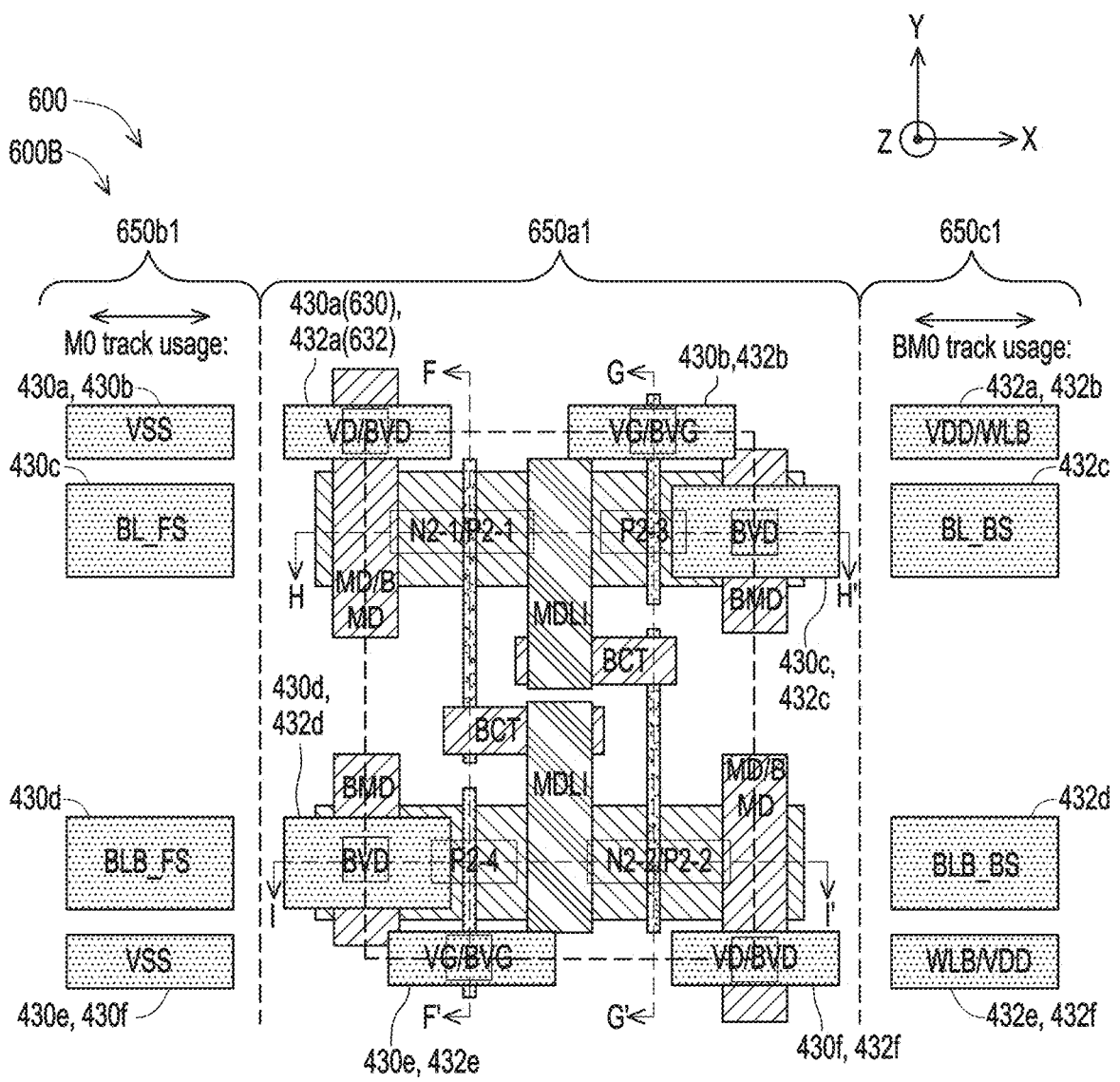
Figure 6C:
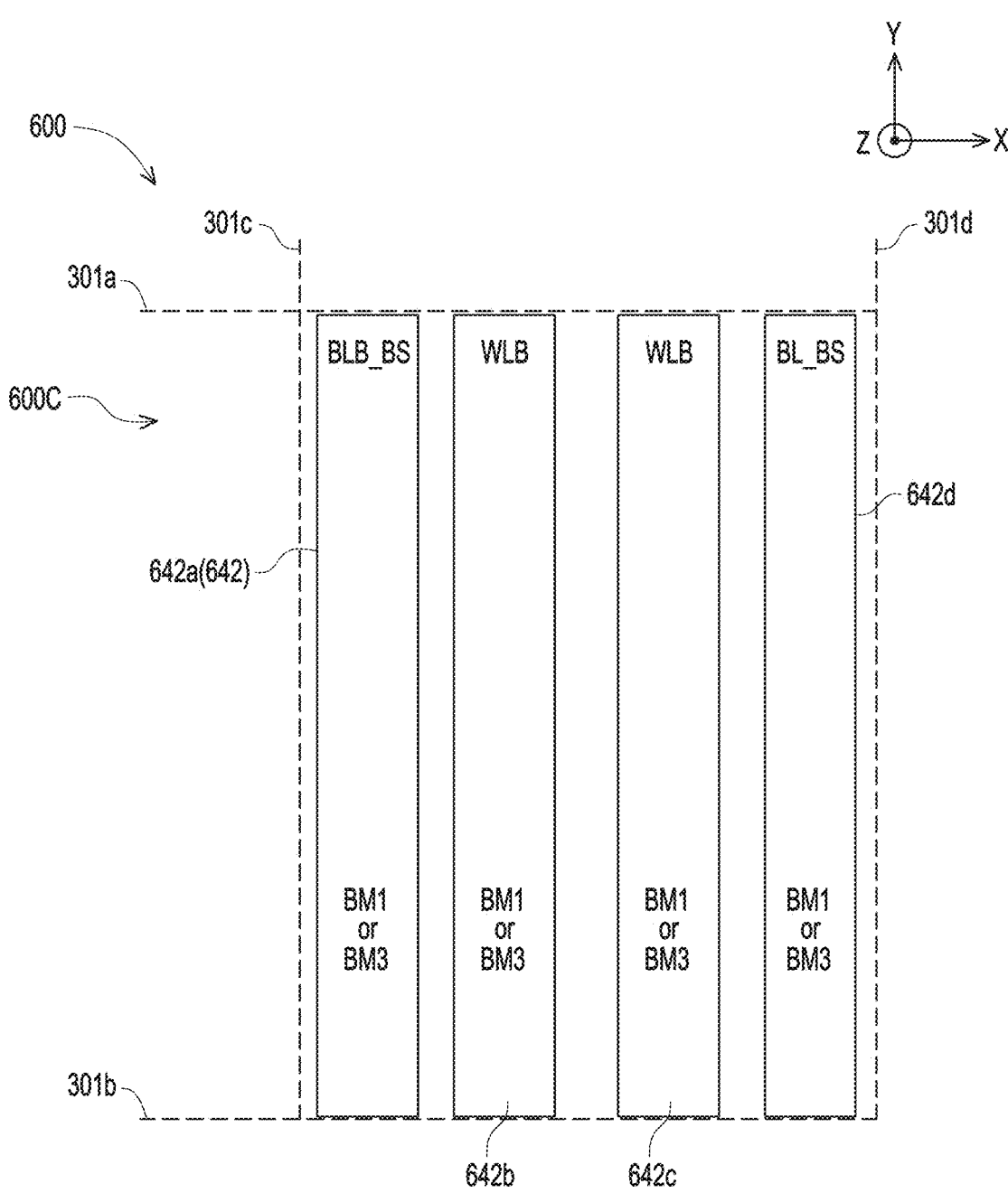

FIGS. 6A-6C are corresponding diagrams of corresponding portions 600A-600C of an integrated circuit 600, in accordance with some embodiments.

Integrated circuit 600 is a top view of memory cell 200B. Integrated circuit 600 is manufactured by layout design 500 of FIGS. 5A-5C. In some embodiments, integrated circuit 600 is a top view of at least one of memory cell 152*a* or 152*b*.

Portion 600A includes one or more features of integrated circuit 600 of the OD level, the POLY level, the MD level, the MDLI level, the BCT level, the M0 level, the VG level, the VD level, the BMD level, the BM0 level, the BVG level, and the BVD level. Portion 600A is manufactured by portion 500A.

Portion 600B includes one or more features of integrated circuit 600 of the OD level, the POLY level, the MD level, the MDLI level, the BCT level, the M0 level, the VG level, the VD level, the BMD level, the BM0 level, the BVG level, and the BVD level. Portion 600B is manufactured by portion 500B.

Portion 600C includes one or more features of integrated circuit 600 of the M1 level. In some embodiments, portion 600C includes one or more features of integrated circuit 600 of the M2 level. In some embodiments, portion 600C includes one or more features of integrated circuit 600 of the M3 level.

Figure 6D:
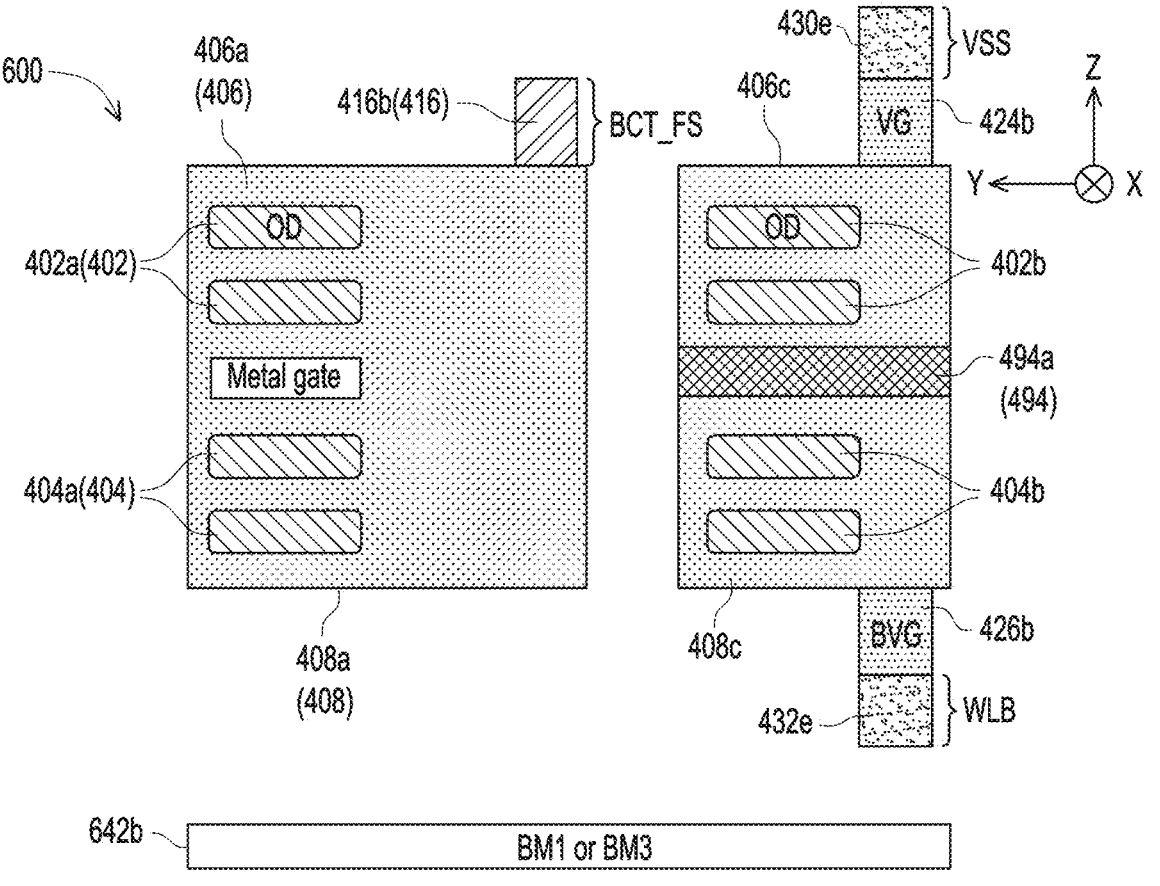
Figure 6E:
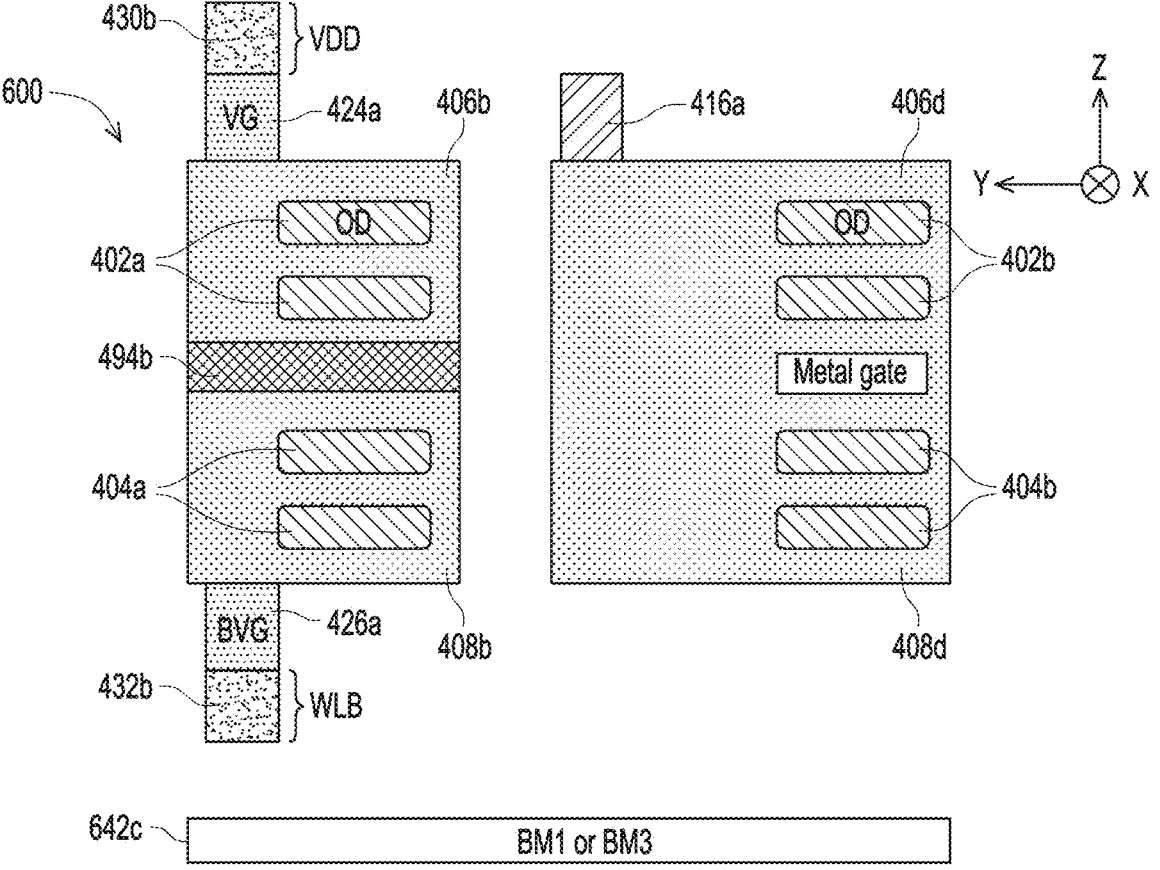
Figure 6F:
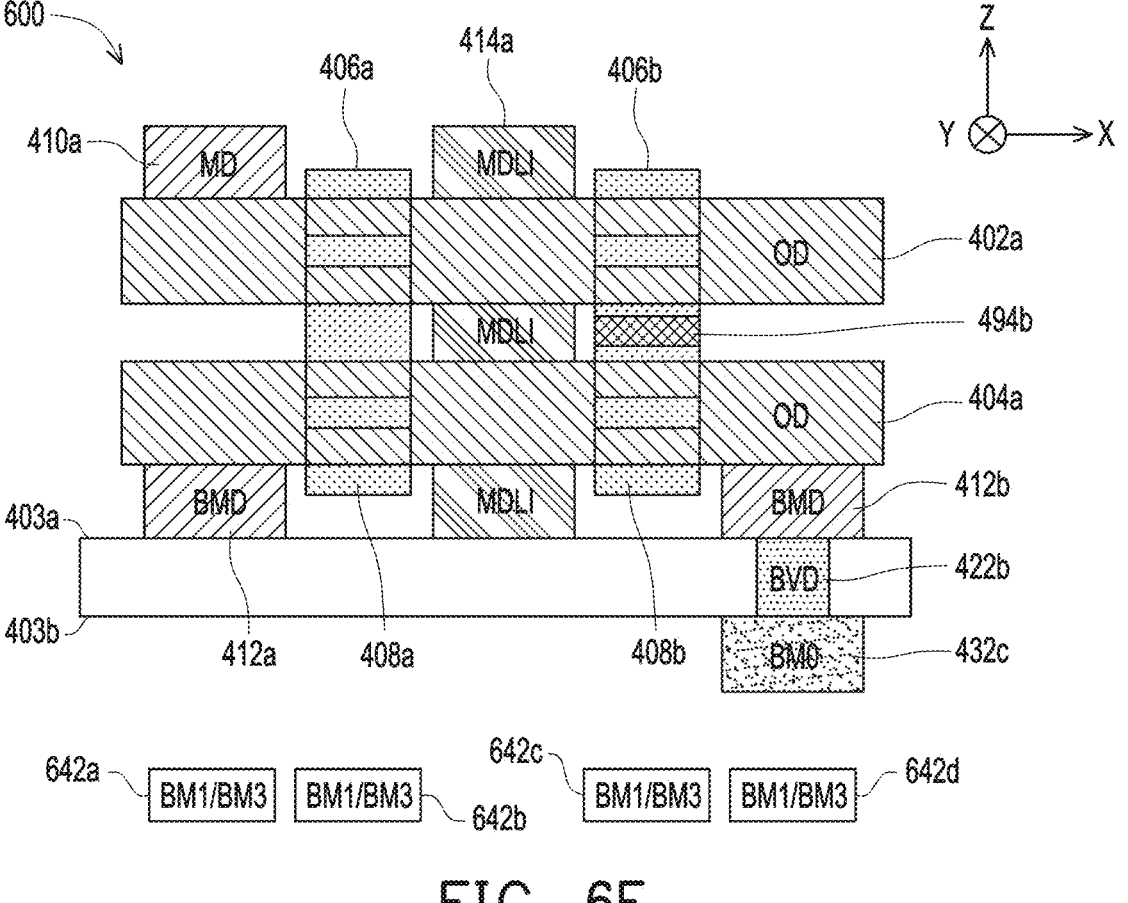
Figure 6G:
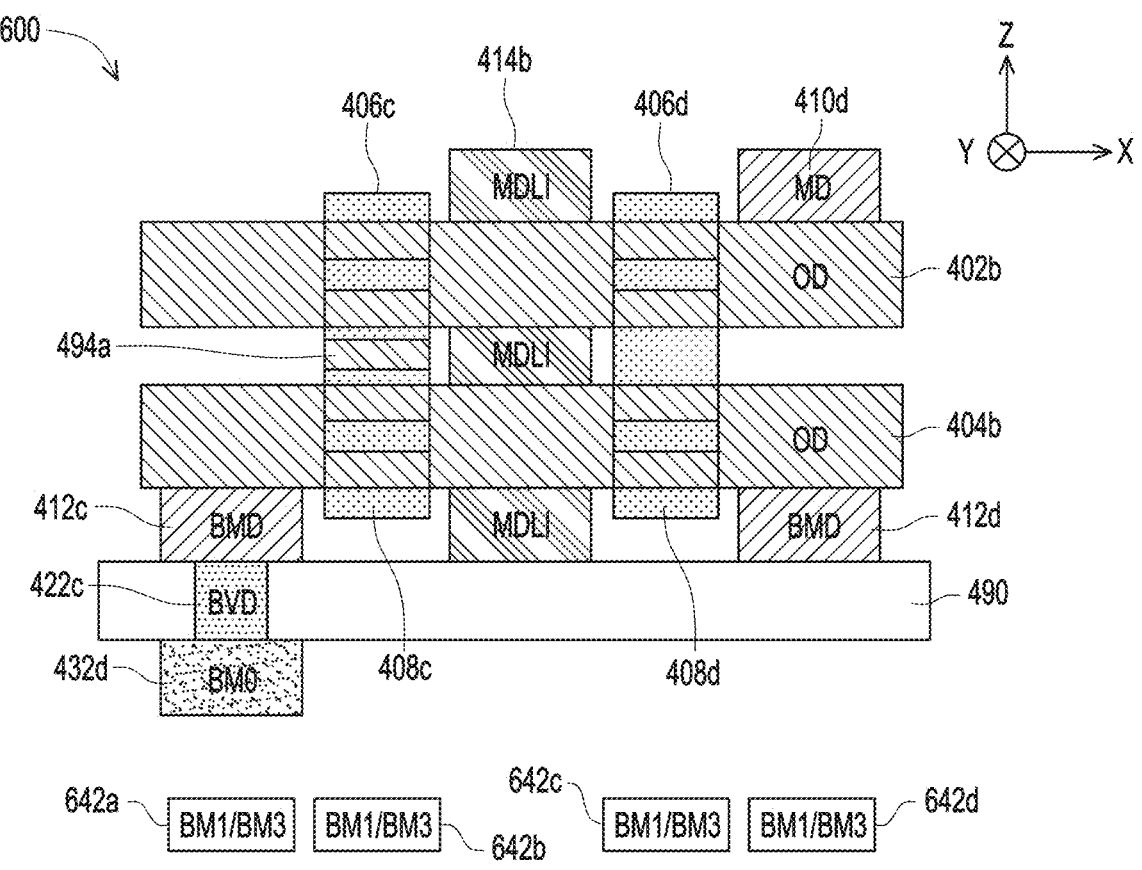

FIGS. 6D-6G are corresponding cross-sectional views of integrated circuit 600, in accordance with some embodiments. FIG. 6D is a cross-sectional view of integrated circuit 600 as intersected by plane F-F', in accordance with some embodiments. FIG. 6E is a cross-sectional view of integrated circuit 600 as intersected by plane G-G', in accordance with some embodiments. FIG. 6F is a cross-sectional view of integrated circuit 600 as intersected by plane H-H', in accordance with some embodiments. FIG. 6G is a cross-sectional view of integrated circuit 600 as intersected by plane I-I', in accordance with some embodiments.

Integrated circuit 400 includes at least the set of active regions 402 and 404, the set of gates 406 and 408, the set of contacts 610, the set of contacts 612, the set of contacts 414, the set of contacts 416, the set of conductors 630, the set of conductors 632, the set of vias 620, the set of vias 622, the set of vias 424, the set of vias 426, the set of conductors 642, a substrate 490, an insulating region 492 and a set of insulating regions 494.

Integrated circuit 600 is a variation of integrated circuit 400 of FIGS. 4A-4H, and similar detailed description is omitted for brevity.

In comparison with integrated circuit 400 of FIGS. 4A-4H, a set of contacts 610 replaces set of contacts 410 of integrated circuit 400, a set of contacts 612 replaces set of contacts 412 of integrated circuit 400, a set of conductors 630 replaces set of conductors 430 of integrated circuit 400, a set of conductors 632 replaces set of conductors 432 of integrated circuit 400, a set of vias 620 replaces set of vias 320 of integrated circuit 400, and a set of vias 622 replaces set of vias 422 of integrated circuit 400, a set of conductors 642 replaces set of conductors 440 of integrated circuit 400, and similar detailed description is omitted for brevity.

In some embodiments, the set of active regions 402 in FIGS. 6A-6G corresponds to NFET transistors N2-1 and N2-2.

In some embodiments, the set of active regions 404 in FIGS. 6A-6G corresponds to PFET transistors P2-1, P2-2, P2-3 and P2-4.

In some embodiments, gate 408*b* corresponds to PFET transistor P2-3 (shown in FIG. 2B), and gate 408*c* corresponds to PFET transistor P2-4 (shown in FIG. 2B).

In some embodiments, in FIGS. 6A-6B, gate 406*b* is a dummy transistor and corresponds to NFET transistor N2-3 (shown in FIG. 2A). In some embodiments, in FIGS. 6A-6B, gate 406*c* is a dummy transistor, and corresponds to NFET transistor N2-4 (shown in FIG. 2A).

The set of contacts 610 includes at least one of contact 410*a* or 410*d*.

In some embodiments, contact 410*a* corresponds to the source terminal of NFET transistor N2-1, and contact 410*d* corresponds to the source terminal of NFET transistor N2-2.

Other configurations, arrangements on other layout levels or quantities of patterns in the set of contacts 610 are within the scope of the present disclosure.

The set of contacts 612 includes at least one of contact 412*a*, 412*b*, 412*c* or 412*d*. In comparison with set of contacts 412 of integrated circuit 400, at least one of contact 412*b* or 412*c* of the set of contacts 612 is similar to at least one of contact 412*a* or 412*d*, and similar detailed description is omitted for brevity.

In some embodiments, contact 412*a* corresponds to the source terminal of PFET transistor P2-1, contact 412*b* corresponds to the source terminal of PFET transistor P2-3, contact 412*c* corresponds to the source terminal of PFET transistor P2-4, and contact 412*d* corresponds to the source terminal of PFET transistor P2-2.

Other configurations, arrangements on other layout levels or quantities of patterns in the set of contacts 612 are within the scope of the present disclosure.

In some embodiments, contact 414*a* corresponds to the drain terminal of PFET transistor P2-1, drain terminal of NFET transistor N2-1, and drain terminal of PFET transistor P2-3.

In some embodiments, contact 414*b* corresponds to the drain terminal of PFET transistor P2-2, drain terminal of NFET transistor N2-2, and drain terminal of PFET transistor P2-4.

Other configurations, arrangements on other layout levels or quantities of patterns in the set of contacts 414 are within the scope of the present disclosure.

The set of conductors 630 includes at least one of conductor 430*a*, 430*b*, 430*e* or 430*f*.

Other configurations, arrangements on other layout levels or quantities of patterns in the set of conductors 630 are within the scope of the present disclosure.

The set of conductors 632 includes at least one of conductor 432*a*, 432*b*, 432*c*, 432*d*, 432*e* or 432*f*. In comparison with the set of conductors 432 of integrated circuit 400, at least one of conductors 432*c* or 432*d* of the set of conductors 632 is similar to at least one of conductor 432*a*, 432*b*, 432*e* or 432*f*, and similar detailed description is omitted for brevity.

In some embodiments, at least one conductor of the set of conductors 632 is located on the back-side 403*b* of integrated circuit 100A-100C, 200A, 200B, 400 or 600.

Other configurations, arrangements on other layout levels or quantities of patterns in the set of conductors 632 are within the scope of the present disclosure.

The set of vias 620 includes at least one of via 620*a* or 620*d*.

Other configurations, arrangements on other layout levels or quantities of patterns in at least set of vias 620 are within the scope of the present disclosure.

The set of vias 622 includes at least one of via 422*a*, 422*b*, 422*c* or 422*d*.

In comparison with the set of vias 422 of integrated circuit 400, at least one of vias 422*b* or 422*c* of the set of vias 622 is similar to at least one of via 422*a* or 422*d*, and similar detailed description is omitted for brevity.

In some embodiments, the set of vias 622 is between the set of contacts 612 and the set of conductors 632.

Via 422*b* is between contact 412*b* and conductor 432*c*. Via 422*c* is between contact 412*c* and conductor 432*d*.

Other configurations, arrangements on other layout levels or quantities of patterns in at least set of vias 622 are within the scope of the present disclosure.

The set of conductors 642 includes at least one of conductor 642*a*, 642*b*, 642*c*, 642*d*. The set of conductors 642 extend in the second direction Y.

Each conductor in the set of conductors 642 is separated from another conductor in the set of conductors 642 in the first direction X.

The set of conductors 642 is overlapped by at least one of the set of active regions 402 or 404, the set of gates 406 or 408 or the set of contacts 410, 412, 414 or 316 or the set of conductors 430 or 432.

In some embodiments, at least one conductor of the set of conductors 642 is located on the back-side 403*b* of integrated circuit 100A-100C, 200A, 200B or 600.

In some embodiments, conductor 642*a* corresponds to the bit line bar BLB_BS. In some embodiments, conductor 642*b* corresponds to the word line WLB. In some embodiments, conductor 642*c* corresponds to the word line WLB. In some embodiments, conductor 642*d* corresponds to the bit line BL_BS. In some embodiments, conductor 642*b* and conductor 642*c* are a single, continuous pattern.

In some embodiments, the set of conductors 642 corresponds to 4 BM1 routing tracks. Other numbers of BM1 routing tracks are within the scope of the present disclosure.

In some embodiments, the set of conductors 642 corresponds to 4 BM2 routing tracks. Other numbers of BM2 routing tracks are within the scope of the present disclosure.

In some embodiments, the set of conductors 642 corresponds to 4 BM3 routing tracks. Other numbers of BM3 routing tracks are within the scope of the present disclosure.

Other configurations, arrangements on other layout levels or quantities of patterns in the set of conductors 642 are within the scope of the present disclosure.

FIG. 6B is a diagram of a portion 600B of integrated circuit 600, simplified for ease of illustration.

Portion 600B includes a region 650*a*1, a region 650*b*1 and a region 650*c*1.

Portion 600B is a variation of portion 400B of integrated circuit 400, and similar detailed description is omitted for brevity. In comparison with integrated circuit 400 of FIGS. 4A-4H, region 650*a*1 replaces region 450*a*1 of integrated circuit 400, region 650*b*1 replaces region 450*b*1 of integrated circuit 400, region 650*c*1 replaces region 450*c*1 of integrated circuit 400, and similar detailed description is omitted for brevity.

Integrated circuit 600 includes region 650*a*1, region 650*b*1 and region 650*c*1.

Region 650*a*1 is portion 600A of FIG. 6A, and similar detailed description is omitted for brevity.

Region 650*b*1 identifies M0 track usage for the set of conductors 430. Stated differently, region 650*b*1 identifies M0 signals for corresponding conductors in the set of conductors 630 for the front-side of integrated circuit 600. For example, conductor 430*a* is useable for the reference supply voltage VSS, conductor 430*b* is useable for the reference supply voltage VSS, conductor 430*e* is useable for the reference supply voltage VSS, and conductor 430*f* is useable for the reference supply voltage VSS, and in accordance with some embodiments.

In some embodiments, conductor 430c and conductor 430d are shown in region 650b1 merely for illustration of M0 metal tracks, and region 650b1 does not include conductor 430c and conductor 430d. In some embodiments, if integrated circuit 600 included a bit line and a bit line bar on the front-side, then conductor 432c is useable for the bit line BL_FS, conductor 432d is useable for the bit line bar BLB_FS.

Region 650c1 identifies BM0 track usage for the set of conductors 632. Stated differently, region 650c1 identifies BM0 signals for corresponding conductors in the set of conductors 632 for the back-side of integrated circuit 600. For example, conductor 432a is useable for the supply voltage VDD, conductor 432b is useable for the word line bar WLB, conductor 432c is useable for the bit line BL_BS, conductor 432d is useable for the bit line bar BLB_BS, conductor 432e is useable for the word line bar WLB, and conductor 432f is useable for the supply voltage VDD, and in accordance with some embodiments.

Other M0 track assignments are within the scope of the present disclosure.

In some embodiments, integrated circuit 600 achieves one or more of the benefits described herein.

In some embodiments, by configuring one or more conductors of the set of conductors 632 as a bit line BL_BS configured to transmit/receive a corresponding bit line signal to/from the back-side of the substrate thereby causes integrated circuit 600 to have reduced RC loading compared to other approaches thereby causing the integrated circuit 600 to have increased speed and reduced power consumption than other approaches.

In some embodiments, by configuring one or more conductors of the set of conductors 632 as a bit line bar BLB_BS configured to transmit/receive a corresponding bit line signal to/from the back-side of the substrate thereby causes integrated circuit 600 to have reduced RC loading compared to other approaches thereby causing the integrated circuit 600 to have increased speed and reduced power consumption than other approaches.

Other configurations, arrangements on other layout levels or quantities of patterns in integrated circuit 600 are within the scope of the present disclosure.

FIG. 7 is a functional flow chart of a method 700 of manufacturing an IC device, in accordance with some embodiments. It is understood that additional operations may be performed before, during, and/or after the method 700 depicted in FIG. 7, and that some other processes may only be briefly described herein.

In some embodiments, other order of operations of method 700-900 is within the scope of the present disclosure. Method 700-900 includes exemplary operations, but the operations are not necessarily performed in the order shown. Operations may be added, replaced, changed order, and/or eliminated as appropriate, in accordance with the spirit and scope of disclosed embodiments. In some embodiments, one or more of the operations of at least method 700, 800 or 900 is not performed.

In some embodiments, method 700 is an embodiment of operation 804 of method 800. In some embodiments, the methods 700-900 are usable to manufacture or fabricate at least integrated circuit 100A-100C, 200A, 200B, 400 or 600, or an integrated circuit with similar features as at least layout design 300 or 500.

In operation 702 of method 700, a first set of transistors and a second set of transistors of a first bank of memory cells is fabricated. In some embodiments, the first set of transistors and the second set of transistors are fabricated on a front-side 403a of a semiconductor wafer or substrate. In some embodiments, the first set of transistors includes at least one of NFET transistors N2-1, N2-2, N2-3 or N2-4 shown in FIG. 2A. In some embodiments, the second set of transistors includes at least one of PFET transistors P2-1 or P2-2 shown in FIG. 2A. In some embodiments, the first set of transistors are fabricated on a level above the second set of transistors. In some embodiments, the second set of transistors are fabricated on a level above the first set of transistors.

In some embodiments, the first set of transistors or the second set of transistors of method 700 includes one or more transistors in at least the set of active regions 402 or 404. In some embodiments, the first set of transistors or the second set of transistors of method 700 includes one or more transistors described herein.

In some embodiments, operation 702 comprises fabricating a first bank of memory cells. In some embodiments, the first bank of memory cells includes a first set of transistors and a second set of transistors that are fabricated on a front-side 403a of a semiconductor wafer or substrate.

In operation 704 of method 700, a third set of transistors and a fourth set of transistors of a second bank of memory cells is fabricated. In some embodiments, the third set of transistors and the fourth set of transistors are fabricated on the front-side 403a of a semiconductor wafer or substrate. In some embodiments, the third set of transistors includes at least one of NFET transistors N2-1 or N2-2 shown in FIG. 2B. In some embodiments, the fourth set of transistors includes at least one of PFET transistors P2-1, P2-2, P2-3 or P2-4 shown in FIG. 2B. In some embodiments, the third set of transistors are fabricated on a level above the fourth set of transistors. In some embodiments, the fourth set of transistors are fabricated on a level above the third set of transistors.

In some embodiments, the third set of transistors or the fourth set of transistors of method 700 includes one or more transistors in at least the set of active regions 402 or 404. In some embodiments, the third set of transistors or the fourth set of transistors of method 700 includes one or more transistors described herein.

In some embodiments, operation 704 comprises fabricating a second bank of memory cells. In some embodiments, the second bank of memory cells includes a third set of transistors and a fourth set of transistors that are fabricated on a front-side 403a of a semiconductor wafer or substrate.

In some embodiments, at least one of operation 702 or 704 includes fabricating source and drain regions of the set of transistors in a first well. In some embodiments, the first well comprises p-type dopants. In some embodiments, the p-type dopants include boron, aluminum or other suitable p-type dopants. In some embodiments, the first well comprises an epi-layer grown over a substrate. In some embodiments, the epi-layer is doped by adding dopants during the epitaxial process. In some embodiments, the epi-layer is doped by ion implantation after the epi-layer is formed. In some embodiments, the first well is formed by doping the substrate. In some embodiments, the doping is performed by ion implantation. In some embodiments, the first well has a dopant concentration ranging from $1\times10^{12}$ atoms/cm$^3$ to $1\times10^{14}$ atoms/cm$^3$.

In some embodiments, the first well comprises n-type dopants. In some embodiments, the n-type dopants include phosphorus, arsenic or other suitable n-type dopants. In some embodiments, the n-type dopant concentration ranges from about $1\times10^{12}$ atoms/cm$^3$ to about $1\times10^{14}$ atoms/cm$^3$.

In some embodiments, the formation of the source/drain features includes, a portion of the substrate is removed to form recesses at an edge of spacers, and a filling process is then performed by filling the recesses in the substrate. In some embodiments, the recesses are etched, for example, by a wet etching or a dry etching, after removal of a pad oxide layer or a sacrificial oxide layer. In some embodiments, the etch process is performed to remove a top surface portion of the active region adjacent to an isolation region, such as an STI region. In some embodiments, the filling process is performed by an epitaxy or epitaxial (epi) process. In some embodiments, the recesses are filled using a growth process which is concurrent with an etch process where a growth rate of the growth process is greater than an etch rate of the etch process. In some embodiments, the recesses are filled using a combination of growth process and etch process. For example, a layer of material is grown in the recess and then the grown material is subjected to an etch process to remove a portion of the material. Then a subsequent growth process is performed on the etched material until a desired thickness of the material in the recess is achieved. In some embodiments, the growth process continues until a top surface of the material is above the top surface of the substrate. In some embodiments, the growth process is continued until the top surface of the material is co-planar with the top surface of the substrate. In some embodiments, a portion of the first well is removed by an isotropic or an anisotropic etch process. The etch process selectively etches the first well without etching a gate structure and any spacers. In some embodiments, the etch process is performed using a reactive ion etch (RIE), wet etching, or other suitable techniques. In some embodiments, a semiconductor material is deposited in the recesses to form the source/drain features. In some embodiments, an epi process is performed to deposit the semiconductor material in the recesses. In some embodiments, the epi process includes a selective epitaxy growth (SEG) process, CVD process, molecular beam epitaxy (MBE), other suitable processes, and/or combination thereof. The epi process uses gaseous and/or liquid precursors, which interacts with a composition of substrate. In some embodiments, the source/drain features include epitaxially grown silicon (epi Si), silicon carbide, or silicon germanium. Source/drain features of the IC device associated with the gate structure are in-situ doped or undoped during the epi process in some instances. When source/drain features are undoped during the epi process, source/drain features are doped during a subsequent process in some instances. The subsequent doping process is achieved by an ion implantation, plasma immersion ion implantation, gas and/or solid source diffusion, other suitable processes, and/or combination thereof. In some embodiments, source/drain features are further exposed to annealing processes after forming source/drain features and/or after the subsequent doping process.

In some embodiments, at least one of operation 702 or 704 further includes operation 702a (not shown). In some embodiments, operation 702a includes forming contacts (e.g., set of contacts 410, 412, 414, 416, 610 or 612) of the first set of transistors, the second set of transistors, the third set of transistors or the fourth set of transistors. In some embodiments, operation 702a further includes fabricating a first set of contacts on the front-side of the substrate, thereby electrically coupling a first source/drain of a first transistor of the first, second, third or fourth set of transistors and a first source/drain of a second transistor of the first, second, third or fourth set of transistors.

In some embodiments, at least one of operation 702 or 704 further includes forming a gate region of the first set of transistors, the second set of transistors, the third set of transistors or the fourth set of transistors. In some embodiments, the gate regions of method 700 include the set of gates 406 or 408.

In some embodiments, the gate region is between the drain region and the source region. In some embodiments, the gate region is over the first well and the substrate. In some embodiments, fabricating the gate regions of at least one of operation 702 or 704 includes performing one or more deposition processes to form one or more dielectric material layers. In some embodiments, a deposition process includes a chemical vapor deposition (CVD), a plasma enhanced CVD (PECVD), an atomic layer deposition (ALD), or other process suitable for depositing one or more material layers. In some embodiments, fabricating the gate regions includes performing one or more deposition processes to form one or more conductive material layers. In some embodiments, fabricating the gate regions includes forming gate electrodes or dummy gate electrodes. In some embodiments, fabricating the gate regions includes depositing or growing at least one dielectric layer, e.g., gate dielectric. In some embodiments, gate regions are formed using a doped or non-doped polycrystalline silicon (or polysilicon). In some embodiments, the gate regions include a metal, such as Al, Cu, W, Ti, Ta, TiN, TaN, NiSi, CoSi, other suitable conductive materials, or combinations thereof.

In operation 706 of method 700, a first set of vias are formed on the front-side 403a of the thinned wafer or substrate on a first level (e.g., VD or VG). In some embodiments, the first set of vias of method 700 includes one or more portions of at least the set of vias 420, 424 or 620.

In some embodiments, operation 706 includes forming a first set of self-aligned contacts (SACs) in the insulating layer over the front-side 403a of the wafer. In some embodiments, the first set of vias is electrically coupled to at least the first set of transistors or the second set of transistors. In some embodiments, the first set of vias is electrically coupled to at least the third set of transistors or the fourth set of transistors.

In operation 708 of method 700, a first conductive material is deposited on the front-side 403a of the substrate on a first metal level thereby forming a first set of conductors on the front-side 403a of the wafer or substrate on a first metal level (e.g., M0).

In some embodiments, operation 708 includes at least depositing a first set of conductive regions over the front-side 403a of the integrated circuit. In some embodiments, the first set of conductors of method 700 includes one or more portions of at least the set of conductors 430 or 630.

In operation 710 of method 700, thinning is performed on the back-side 403b of the wafer or substrate. In some embodiments, operation 706 includes a thinning process performed on the back-side 403b of the semiconductor wafer or substrate. In some embodiments, the thinning process includes a grinding operation and a polishing operation (such as chemical mechanical polishing (CMP)) or other suitable processes. In some embodiments, after the thinning process, a wet etching operation is performed to remove defects formed on the back-side 403b of the semiconductor wafer or substrate.

In operation 712 of method 700, a second set of vias are formed on the back-side 403b of the thinned wafer or substrate on a second level (e.g., BVD or BVG). In some embodiments, the second set of vias of method 700 includes one or more portions of at least the set of vias 422, 426 or 622. In some embodiments, the second set of vias is electrically coupled to at least the first set of transistors or the second set of transistors.

In some embodiments, operation 712 includes forming a second set of self-aligned contacts (SACs) in the insulating layer over the back-side 403b of the wafer. In some embodiments, the second set of vias is electrically coupled to at least the first set of transistors or the second set of transistors.

In operation 714 of method 700, a second conductive material is deposited on the back-side 403b of the substrate on a second metal level thereby forming a second set of conductors on the back-side 403b of the wafer or substrate on a second metal level (e.g., BM0).

In some embodiments, operation 714 includes at least depositing a second set of conductive regions over the back-side 403b of the integrated circuit. In some embodiments, the second set of conductors of method 700 includes one or more portions of at least the set of conductors 432 or 632.

In operation 716 of method 700, a third set of vias are formed on the front-side 403a of the thinned wafer or substrate on a third level (e.g., V0, or V1). In some embodiments, the third set of vias of method 700 is similar to at least the set of vias 420, 424 or 620, and similar detailed description is therefore omitted.

In some embodiments, operation 716 includes forming a third set of self-aligned contacts (SACs) in the insulating layer over the front-side 403a of the wafer. In some embodiments, the third set of vias is electrically coupled to at least the first set of transistors or the second set of transistors. In some embodiments, the third set of vias is electrically coupled to at least the third set of transistors or the fourth set of transistors.

In operation 718 of method 700, a third conductive material is deposited on the front-side 403a of the substrate on a third metal level thereby forming a third set of conductors on the front-side 403a of the wafer or substrate on a third metal level. In some embodiments, the third metal level includes the M1 level, M2 level or M3 level.

In some embodiments, operation 718 includes at least depositing a third set of conductive regions over the front-side 403a of the integrated circuit. In some embodiments, the third set of conductors of method 700 includes one or more portions of at least the set of conductors 440.

In operation 720 of method 700, a fourth set of vias are formed on the back-side 403b of the thinned wafer or substrate on a fourth level (e.g., BV0 or BV1). In some embodiments, the fourth set of vias of method 700 is similar to at least the set of vias 420, 424 or 620, and similar detailed description is therefore omitted.

In some embodiments, operation 720 includes forming a fourth set of self-aligned contacts (SACs) in the insulating layer over the back-side 403b of the wafer. In some embodiments, the fourth set of vias is electrically coupled to at least the first set of transistors or the second set of transistors.

In operation 722 of method 700, a fourth conductive material is deposited on the back-side 403b of the substrate on a fourth metal level thereby forming a fourth set of conductors on the back-side 403b of the wafer or substrate on a fourth metal level. In some embodiments, the fourth metal level includes the BM1 level, BM2 level or BM3 level.

In some embodiments, operation 722 includes at least depositing a fourth set of conductive regions over the back-side 403b of the integrated circuit. In some embodiments, the fourth set of conductors of method 700 includes one or more portions of at least the set of conductors 642.

In some embodiments, one or more of operations 702, 704, 706, 708, 712, 714, 716, 718, 720 or 722 of method 700 include using a combination of photolithography and material removal processes to form openings in an insulating layer (not shown) over the substrate. In some embodiments, the photolithography process includes patterning a photoresist, such as a positive photoresist or a negative photoresist. In some embodiments, the photolithography process includes forming a hard mask, an antireflective structure, or another suitable photolithography structure. In some embodiments, the material removal process includes a wet etching process, a dry etching process, an RIE process, laser drilling or another suitable etching process. The openings are then filled with conductive material, e.g., copper, aluminum, titanium, nickel, tungsten, or other suitable conductive material. In some embodiments, the openings are filled using CVD, PVD, sputtering, ALD or other suitable formation process.

Figure 11:
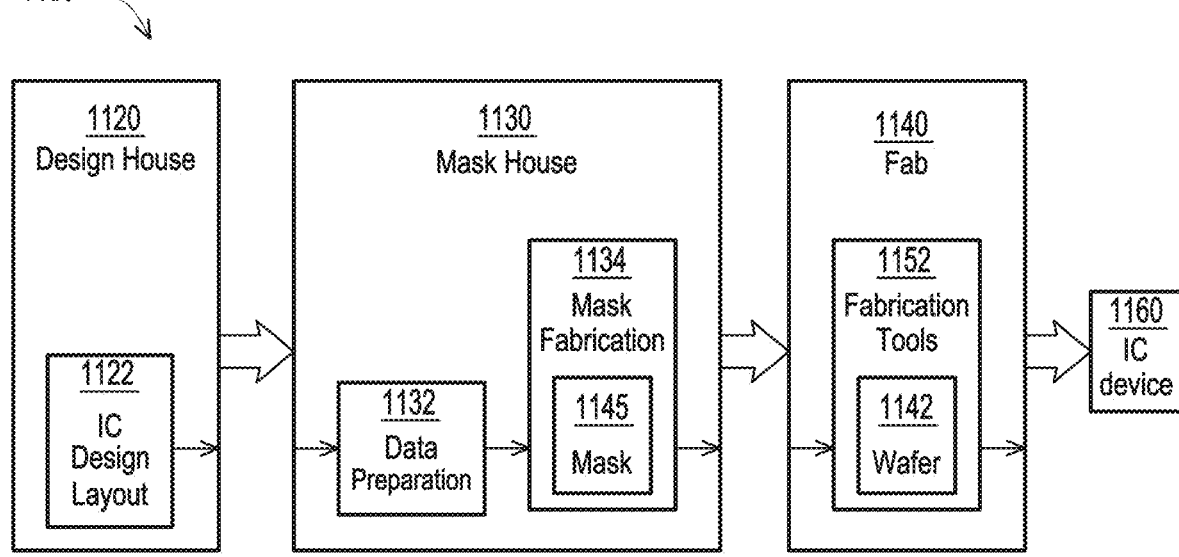
FIG. 11 is a block diagram of an IC manufacturing system, and an IC manufacturing flow associated therewith, in accordance with at least one embodiment of the present disclosure.

In some embodiments, at least one or more operations of method 700 is performed by system 1100 of FIG. 11. In some embodiments, at least one method(s), such as method 700 discussed above, is performed in whole or in part by at least one manufacturing system, including system 1100. One or more of the operations of method 700 is performed by IC fab 1140 (FIG. 11) to fabricate IC device 1160. In some embodiments, one or more of the operations of method 700 is performed by fabrication tools 1152 to fabricate wafer 1142.

In some embodiments, the conductive material includes copper, aluminum, titanium, nickel, tungsten, or other suitable conductive material. In some embodiments, the openings and trench are filled using CVD, PVD, sputtering, ALD or other suitable formation process. In some embodiments, after conductive material is deposited in one or more of operations 708, 714, 718 or 722, the conductive material is planarized to provide a level surface for subsequent steps.

In some embodiments, one or more of the operations of method 700, 800 or 900 is not performed.

One or more of the operations of methods 800-900 is performed by a processing device configured to execute instructions for manufacturing an integrated circuit, such as at least integrated circuit 100A-100C, 200A, 200B, 400 or 600. In some embodiments, one or more operations of methods 800-900 is performed using a same processing device as that used in a different one or more operations of methods 800-900. In some embodiments, a different processing device is used to perform one or more operations of methods 800-900 from that used to perform a different one or more operations of methods 800-900. In some embodiments, other order of operations of method 700, 800 or 900 is within the scope of the present disclosure. At least one of method 700, 800 or 900 includes exemplary operations, but the operations are not necessarily performed in the order shown. Operations in method 700, 800 or 900 may be added, replaced, changed order, and/or eliminated as appropriate, in accordance with the spirit and scope of disclosed embodiments.

Figure 8:
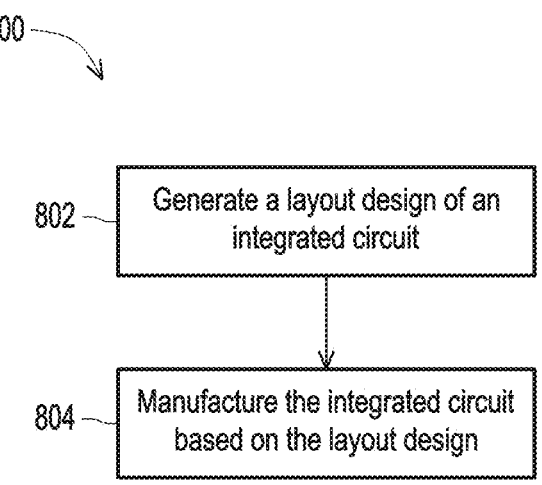
FIG. 8 is a flow chart of a method of manufacturing an integrated circuit, in accordance with some embodiments.

FIG. 8 is a flowchart of a method 800 of forming or manufacturing an integrated circuit in accordance with some embodiments. It is understood that additional operations may be performed before, during, and/or after the method 800 depicted in FIG. 8, and that some other operations may only be briefly described herein. In some embodiments, the method 800 is usable to form integrated circuits, such as at least integrated circuit 100A-100C, 200A, 200B, 400 or 600. In some embodiments, the method 800 is usable to form integrated circuits having similar features and similar structural relationships as one or more of layout design 300 or 500.

In operation 802 of method 800, a layout design of an integrated circuit is generated. Operation 802 is performed by a processing device (e.g., processor 1002 (FIG. 10)) configured to execute instructions for generating a layout design. In some embodiments, the layout design of method 800 includes one or more patterns of at least layout design 300 or 500, or one or more features similar to at least integrated circuit 100A-100C, 200A, 200B, 400 or 600. In some embodiments, the layout design of the present application is in a graphic database system (GDSII) file format. In some embodiments, operation 802 corresponds to method 900 of FIG. 9.

In operation 804 of method 800, the integrated circuit is manufactured based on the layout design. In some embodiments, operation 804 of method 800 comprises manufacturing at least one mask based on the layout design, and manufacturing the integrated circuit based on the at least one mask. In some embodiments, operation 804 corresponds to method 700 of FIG. 7.

Figure 9:
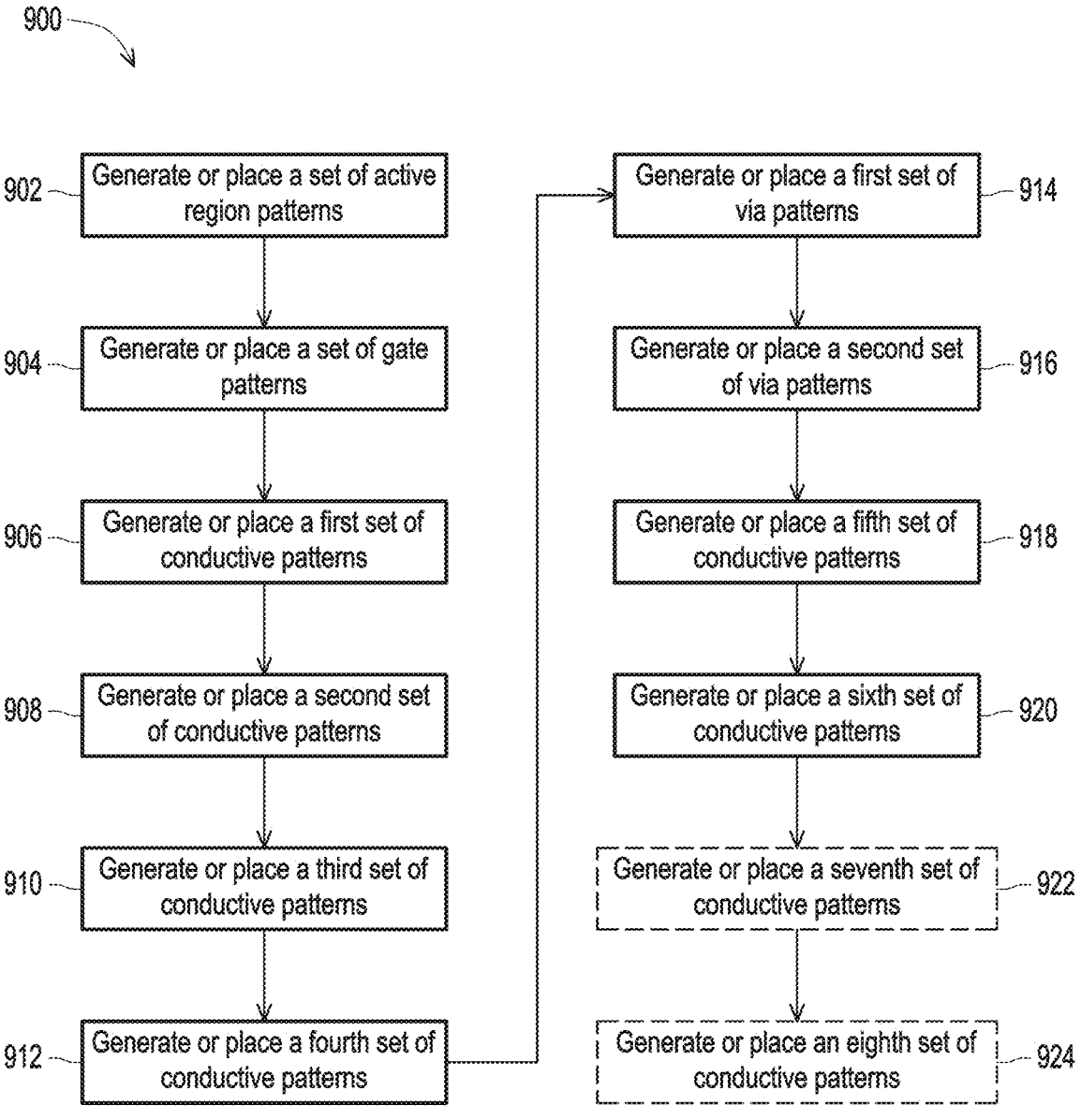
FIG. 9 is a flowchart of a method of generating a layout design of an integrated circuit, in accordance with some embodiments.

FIG. 9 is a flowchart of a method 900 of generating a layout design of an integrated circuit, in accordance with some embodiments. It is understood that additional operations may be performed before, during, and/or after the method 900 depicted in FIG. 9, and that some other processes may only be briefly described herein. In some embodiments, method 900 is an embodiment of operation 802 of method 800. In some embodiments, method 900 is usable to generate one or more layout patterns of at least layout design 300 or 500, or one or more features similar to at least integrated circuit 100A-100C, 200A, 200B, 400 or 600.

In some embodiments, method 900 is usable to generate one or more layout patterns having structural relationships including alignment, lengths and widths, as well as configurations and layers of at least layout design 300 or 500, or one or more features similar to at least integrated circuit 100A-100C, 200A, 200B, 400 or 600, and similar detailed description will not be described in FIG. 9, for brevity.

In operation 902 of method 900, a set of active region patterns is generated or placed on the layout design. In some embodiments, the set of active region patterns of method 900 includes at least portions of one or more patterns of the set of active region patterns 302 or 304. In some embodiments, the set of active region patterns of method 900 includes one or more regions similar to the set of active regions 402 or 404. In some embodiments, the set of active region patterns of method 900 includes one or more patterns or similar patterns in the OD layer.

In operation 904 of method 900, a set of gate patterns is generated or placed on the layout design. In some embodiments, the set of gate patterns of method 900 includes at least portions of one or more patterns of the set of gate patterns 306 or 308. In some embodiments, the set of gate patterns of method 900 includes one or more regions similar to the set of gates 406 or 408. In some embodiments, the set of gate patterns of method 900 includes at least portions of one or more patterns of the set of insulating patterns 394. In some embodiments, the set of gate patterns of method 900 includes one or more regions similar to the set of insulating regions 494. In some embodiments, the set of gate patterns of method 900 includes one or more patterns or similar patterns in the POLY layer.

In operation 906 of method 900, a first set of conductive patterns is generated or placed on the layout design. In some embodiments, the first set of conductive patterns of method 900 includes at least portions of one or more patterns of the set of contact patterns 310 or 510. In some embodiments, the first set of conductive patterns of method 900 includes one or more patterns similar to the set of contacts 410 or 610. In some embodiments, the first set of conductive patterns of method 900 includes one or more patterns or similar patterns in the MD layer.

In operation 908 of method 900, a second set of conductive patterns is generated or placed on the layout design. In some embodiments, the second set of conductive patterns of method 900 includes at least portions of one or more patterns of the set of contact patterns 312 or 512. In some embodiments, the second set of conductive patterns of method 900 includes one or more patterns similar to the set of contacts 412 or 612. In some embodiments, the second set of conductive patterns of method 900 includes one or more patterns or similar patterns in the BMD layer.

In operation 910 of method 900, a third set of conductive patterns is generated or placed on the layout design. In some embodiments, the third set of conductive patterns of method 900 includes at least portions of one or more patterns of the set of contact patterns 314. In some embodiments, the third set of conductive patterns of method 900 includes one or more patterns similar to the set of contacts 414. In some embodiments, the third set of conductive patterns of method 900 includes one or more patterns or similar patterns in the MDLI layer.

In operation 912 of method 900, a fourth set of conductive patterns is generated or placed on the layout design. In some embodiments, the fourth set of conductive patterns of method 900 includes at least portions of one or more patterns of the set of contact patterns 316. In some embodiments, the fourth set of conductive patterns of method 900 includes one or more patterns similar to the set of contacts 416. In some embodiments, the fourth set of conductive patterns of method 900 includes one or more patterns or similar patterns in the BCT layer.

In operation 914 of method 900, a first set of via patterns is generated or placed on the layout design. In some embodiments, the first set of via patterns of method 900 includes at least portions of one or more patterns of the set of via patterns 320, 324 or 520. In some embodiments, the first set of via patterns of method 900 includes one or more via patterns similar to at least the set of vias 420, 424 or 620. In some embodiments, the first set of via patterns of method 900 includes one or more patterns or similar vias in the VG or VD layer.

In operation 916 of method 900, a second set of via patterns is generated or placed on the layout design. In some embodiments, the second set of via patterns of method 900 includes at least portions of one or more patterns of the set of via patterns 322, 326 or 522. In some embodiments, the second set of via patterns of method 900 includes one or more via patterns similar to at least the set of vias 422, 426 or 622. In some embodiments, the second set of via patterns of method 900 includes one or more patterns or similar vias in the BVG or BVD layer.

In operation 918 of method 900, a fifth set of conductive patterns is generated or placed on the layout design. In some embodiments, the fifth set of conductive patterns of method 900 includes at least portions of one or more patterns of at least the set of conductive feature patterns 330 or 530. In some embodiments, the fifth set of conductive patterns of method 900 includes one or more conductive patterns similar to at least the set of conductors 430 or 630. In some embodiments, the fifth set of conductive patterns of method 900 includes one or more patterns or similar conductors in the M0 layer.

In operation 920 of method 900, a sixth set of conductive patterns is generated or placed on the layout design. In some embodiments, the sixth set of conductive patterns of method 900 includes at least portions of one or more patterns of at least the set of conductive feature patterns 332 or 532. In some embodiments, the sixth set of conductive patterns of method 900 includes one or more conductive patterns similar to at least the set of conductors 432 or 632. In some embodiments, the sixth set of conductive patterns of method 900 includes one or more patterns or similar conductors in the BM0 layer.

In operation 922 of method 900, a seventh set of conductive patterns is generated or placed on the layout design. In some embodiments, the seventh set of conductive patterns of method 900 includes at least portions of one or more patterns of at least the set of conductive feature patterns 340. In some embodiments, the seventh set of conductive patterns of method 900 includes one or more conductive patterns similar to at least the set of conductors 440. In some embodiments, the seventh set of conductive patterns of method 900 includes one or more patterns or similar conductors in at least one of the M1 layer, the M2 layer or the M3 layer. In some embodiments, operation 922 further includes generating or placing one or more via layout patterns between the seventh set of conductive patterns and the fifth set of conductive patterns.

In operation 924 of method 900, an eighth set of conductive patterns is generated or placed on the layout design. In some embodiments, the eighth set of conductive patterns of method 900 includes at least portions of one or more patterns of at least the set of conductive feature patterns 542. In some embodiments, the eighth set of conductive patterns of method 900 includes one or more conductive patterns similar to at least the set of conductors 642. In some embodiments, the eighth set of conductive patterns of method 900 includes one or more patterns or similar conductors in at least one of the BM1 layer, the BM2 layer or the BM3 layer. In some embodiments, operation 924 further includes generating or placing one or more via layout patterns between the eighth set of conductive patterns and the fifth set of conductive patterns.

Figure 10:
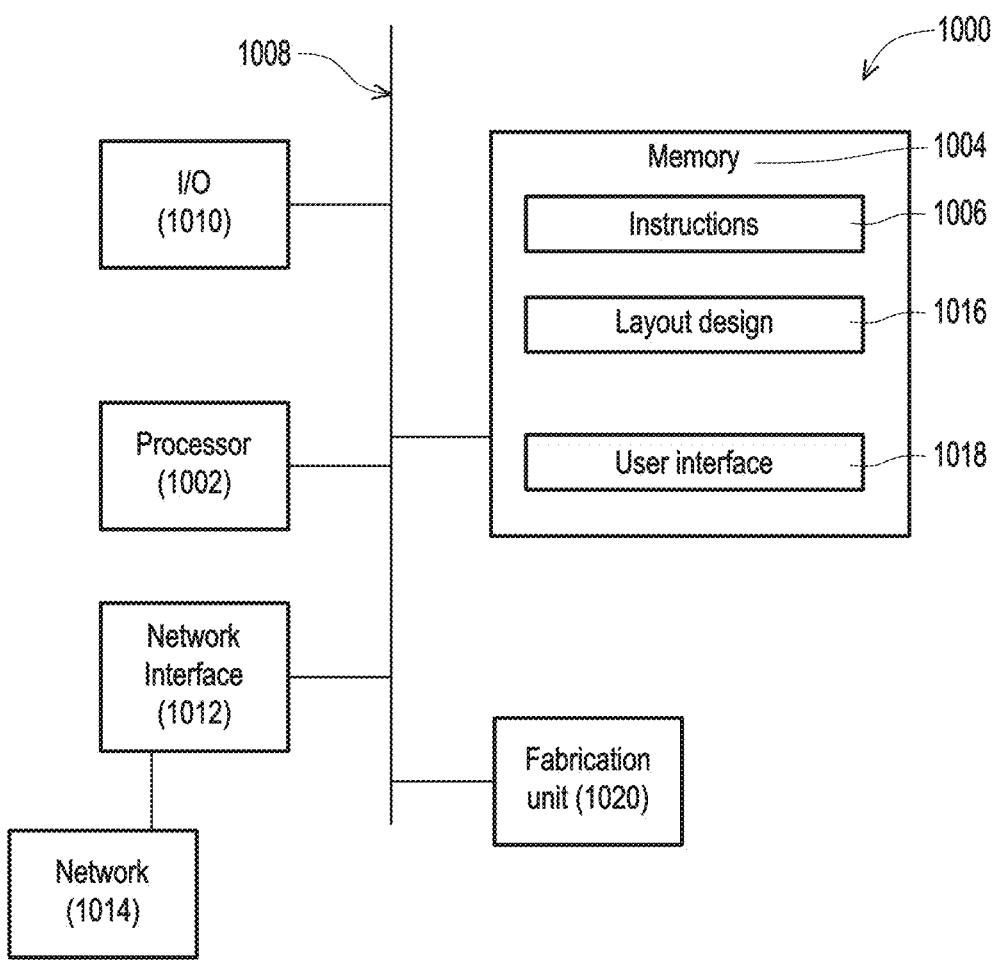
FIG. 10 is a schematic view of a system for designing an IC layout design and manufacturing an IC circuit, in accordance with some embodiments.

FIG. 10 is a schematic view of a system 1000 for designing an IC layout design and manufacturing an IC circuit in accordance with some embodiments.

In some embodiments, system 1000 generates or places one or more IC layout designs described herein. System 1000 includes a hardware processor 1002 and a non-transitory, computer readable storage medium 1004 (e.g., memory 1004) encoded with, i.e., storing, the computer program code 1006, i.e., a set of executable instructions 1006. Computer readable storage medium 1004 is configured for interfacing with manufacturing machines for producing the integrated circuit. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system

1000 to be usable for performing a portion or all of the operations as described in method 800-900.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the computer readable storage medium 1004 stores the computer program code 1006 configured to cause system 1000 to perform method 800-900. In some embodiments, the computer readable storage medium 1004 also stores information needed for performing method 800-900 as well as information generated during performing method 800-900, such as layout design 1016, user interface 1018 and fabrication unit 1020, and/or a set of executable instructions to perform the operation of method 800-900. In some embodiments, layout design 1016 comprises one or more of layout patterns of at least layout design 300 or 500, or features similar to at least integrated circuit 100A-100C, 200A, 200B, 400 or 600.

In some embodiments, the computer readable storage medium 1004 stores instructions (e.g., computer program code 1006) for interfacing with manufacturing machines. The instructions (e.g., computer program code 1006) enable processor 1002 to generate manufacturing instructions readable by the manufacturing machines to effectively implement method 800-900 during a manufacturing process.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-2094. In some embodiments, method 800-900 is implemented in two or more systems 1000, and information such as layout design, and user interface are exchanged between different systems 1000 by network 1014.

System 1000 is configured to receive information related to a layout design through I/O interface 1010 or network interface 1012. The information is transferred to processor 1002 by bus 1008 to determine a layout design for producing at least integrated circuit 100A-100C, 200A, 200B, 400 or 600. The layout design is then stored in computer readable storage medium 1004 as layout design 1016. System 1000 is configured to receive information related to a user interface through I/O interface 1010 or network interface 1012. The information is stored in computer readable storage medium 1004 as user interface 1018. System 1000 is configured to receive information related to a fabrication unit 1020 through I/O interface 1010 or network interface 1012. The information is stored in computer readable storage medium 1004 as fabrication unit 1020. In some embodiments, the fabrication unit 1020 includes fabrication information utilized by system 1000. In some embodiments, the fabrication unit 1020 corresponds to mask fabrication 1134 of FIG. 11.

In some embodiments, method 800-900 is implemented as a standalone software application for execution by a processor. In some embodiments, method 800-900 is implemented as a software application that is a part of an additional software application. In some embodiments, method 800-900 is implemented as a plug-in to a software application. In some embodiments, method 800-900 is implemented as a software application that is a portion of an EDA tool. In some embodiments, method 800-900 is implemented as a software application that is used by an EDA tool. In some embodiments, the EDA tool is used to generate a layout of the integrated circuit device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, method 800-900 is implemented by a manufacturing device to manufacture an integrated circuit using a set of masks manufactured based on one or more layout designs generated by system 1000. In some embodiments, system 1000 is a manufacturing device configured to manufacture an integrated circuit using a set of masks manufactured based on one or more layout designs of the present disclosure. In some embodiments, system 1000 of FIG. 10 generates layout designs of an integrated circuit that are smaller than other approaches. In some embodiments, system 1000 of FIG. 10 generates layout designs of integrated circuit structure that occupy less area and provide better routing resources than other approaches.

FIG. 11 is a block diagram of an integrated circuit (IC) manufacturing system 1100, and an IC manufacturing flow associated therewith, in accordance with at least one embodiment of the present disclosure. In some embodiments, based on a layout diagram, at least one of (A) one or more semiconductor masks or (B) at least one component in a layer of a semiconductor integrated circuit is fabricated using manufacturing system 1100.

In FIG. 11, IC manufacturing system 1100 (hereinafter "system 1100") includes entities, such as a design house 1120, a mask house 1130, and an IC manufacturer/fabricator ("fab") 1140, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, one or more of design house 1120, mask house 1130, and IC fab 1140 is owned by a single larger company. In some embodiments, one or more of design house 1120, mask house 1130, and IC fab 1140 coexist in a common facility and use common resources.

Design house (or design team) 1120 generates an IC design layout 1122. IC design layout 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout 1122 includes various IC features, such as an active region, gate electrode, source electrode and drain electrode, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout 1122. The design procedure includes one or more of logic design, physical design or place and route. IC design layout 1122 is presented in one or more data files having information of the geometrical patterns. For example, IC design layout 1122 can be expressed in a GDSII file format or DFII file format.

Mask house 1130 includes data preparation 1132 and mask fabrication 1134. Mask house 1130 uses IC design layout 1122 to manufacture one or more masks 1145 to be used for fabricating the various layers of IC device 1160 according to IC design layout 1122. Mask house 1130 performs mask data preparation 1132, where IC design layout 1122 is translated into a representative data file (RDF). Mask data preparation 1132 provides the RDF to mask fabrication 1134. Mask fabrication 1134 includes a mask writer. A mask writer converts the RDF to an image on a substrate, such as a mask (reticle) 1145 or a semiconductor wafer 1142. The IC design layout 1122 is manipulated by mask data preparation 1132 to comply with particular characteristics of the mask writer and/or requirements of IC fab 1140. In FIG. 11, mask data preparation 1132 and mask fabrication 1134 are illustrated as separate elements. In some embodiments, mask data preparation 1132 and mask fabrication 1134 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1134, which may undo part of the modifications performed by OPC in order to meet mask creation rules.

In some embodiments, mask data preparation 1132 includes lithography process checking (LPC) that simulates processing that will be implemented by IC fab 1140 to fabricate IC device 1160. LPC simulates this processing based on IC design layout 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1122.

It should be understood that the above description of mask data preparation 1132 has been simplified for the purposes of clarity. In some embodiments, data preparation 1132 includes additional features such as a logic operation (LOP) to modify the IC design layout according to manufacturing rules. Additionally, the processes applied to IC design layout 1122 during data preparation 1132 may be executed in a variety of different orders.

After mask data preparation 1132 and during mask fabrication 1134, a mask 1145 or a group of masks 1145 are fabricated based on the modified IC design layout 1122. In some embodiments, mask fabrication 1134 includes performing one or more lithographic exposures based on IC design layout 1122. In some embodiments, an electron-beam (e-beam) or a mechanism of multiple e-beams is used to form a pattern on a mask (photomask or reticle) 1145 based on the modified IC design layout 1122. The mask 1145 can be formed in various technologies. In some embodiments, the mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through transparent regions. In one example, a binary version of mask 1145 includes a transparent substrate (e.g., fused quartz) and an opaque material (e.g., chromium) coated in the opaque regions of the binary mask. In another example, the mask 1145 is formed using a phase shift technology. In the phase shift mask (PSM) version of mask 1145, various features in the pattern formed on the mask are configured to have proper phase difference to enhance the resolution and imaging quality. In various examples, the phase shift mask can be attenuated PSM or alternating PSM. The mask(s) generated by mask fabrication 1134 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1140 is an IC fabrication entity that includes one or more manufacturing facilities for the fabrication of a variety of different IC products. In some embodiments, IC Fab 1140 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 1140 includes wafer fabrication tools 1152 (hereinafter "fabrication tools 1152") configured to execute various manufacturing operations on semiconductor wafer 1142 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1140 uses mask(s) 1145 fabricated by mask house 1130 to fabricate IC device 1160. Thus, IC fab 1140 at least indirectly uses IC design layout 1122 to fabricate IC device 1160. In some embodiments, a semiconductor wafer 1142 is fabricated by IC fab 1140 using mask(s) 1145 to form IC device 1160. In some embodiments, the IC fabrication includes performing one or more lithographic exposures based at least indirectly on IC design layout 1122. Semiconductor wafer 1142 includes a silicon substrate or other proper substrate having material layers formed thereon. Semiconductor wafer 1142 further includes one or more of various doped regions, dielectric features, multilevel interconnects, and the like (formed at subsequent manufacturing steps).

System 1100 is shown as having design house 1120, mask house 1130 or IC fab 1140 as separate components or entities. However, it is understood that one or more of design house 1120, mask house 1130 or IC fab 1140 are part of the same component or entity.

One aspect of this description relates to a memory cell array. In some embodiments, the memory cell array includes a first bank of memory cells, a second bank of memory cells adjacent to the first bank of memory cells, a first set of bit lines and a second set of bit lines. The first set of bit lines extend in a first direction, is coupled to the first bank of memory cells, and is on at least a first metal layer above a front-side of a substrate. The second set of bit lines extend in the first direction, is coupled to the second bank of memory cells, and is on at least a second metal layer below a back-side of the substrate opposite from the front-side of the substrate.

Another aspect of this description relates to a memory cell array. In some embodiments, the memory cell array includes a first bank of memory cells and a second bank of memory cells. In some embodiments, the first bank of memory cells includes a first memory cell. In some embodiments, the second bank of memory cells includes a second memory cell. In some embodiments, the second bank of memory cells is adjacent to the first bank of memory cells. In some embodiments, the memory cell array further includes a first bit line extending in a first direction, being coupled to at least the first memory cell, and being on at least a first metal layer or a second metal layer above a front-side of a substrate. In some embodiments, the memory cell array further includes a first bit line bar extending in the first direction, being coupled to at least the first memory cell, and being on at least the first metal layer or the second metal layer. In some embodiments, the memory cell array further includes a second bit line extending in the first direction, being coupled to at least the second memory cell, and being on at least a third metal layer or a fourth metal layer below a back-side of the substrate opposite from the front-side of the substrate. In some embodiments, the memory cell array further includes a second bit line bar extending in the first direction, being coupled to at least the second memory cell, and being on at least the third metal layer or the fourth metal layer. In some embodiments, the first bit line and the first bit line bar overlap the first bank of memory cells and the second bank of memory cells. In some embodiments, the second bit line and the second bit line bar extend within the second bank of memory cells.

Still another aspect of this description relates to a method of fabricating a memory cell array. In some embodiments, the method includes fabricating a first set of transistors and a second set of transistors in a front-side of a substrate, the first set of transistors being stacked above the second set of transistors, the first set of transistors including a first pass-gate transistor and a second pass-gate transistor of a first type. In some embodiments, the method further includes fabricating a third set of transistors and a fourth set of transistors in the front-side of the substrate, the third set of transistors being stacked above the fourth set of transistors, the fourth set of transistors including a third pass-gate transistor and a fourth pass-gate transistor of a second type different from the first type. In some embodiments, the method further includes fabricating a first set of vias on the front-side of the substrate, the first set of vias being electrically coupled to at least the first set of transistors or the second set of transistors. In some embodiments, the method further includes depositing a first conductive material on the front-side of the substrate on a first metal level thereby forming a first set of conductors, the first set of conductors being electrically coupled to at least the first set of transistors or the second set of transistors by the first set of vias, the first set of transistors or the second set of transistors being configured to receive a first bit line signal from at least a first conductor of the first set of conductors from the front-side, and a first bit line bar signal from at least a second conductor of the first set of conductors from the front-side. In some embodiments, the method further includes performing thinning on a back-side of the substrate opposite from the front-side, and fabricating a second set of vias on the back-side of the thinned substrate, the second set of vias being electrically coupled to at least the third set of transistors or the fourth set of transistors. In some embodiments, the method further includes depositing a second conductive material on the front-side of the substrate on a second metal level thereby forming a second set of conductors, the second set of conductors being electrically coupled to at least the third set of transistors or the fourth set of transistors by the second set of vias, the third set of transistors or the fourth set of transistors being configured to receive a second bit line signal from at least a first conductor of the second set of conductors from the back-side, and a second bit line bar signal from at least a second conductor of the second set of conductors from the back-side.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory cell array, comprising:
a first bank of memory cells;
a second bank of memory cells adjacent to the first bank of memory cells;
a first set of bit lines extending in a first direction, being coupled to the first bank of memory cells, and being on at least a first metal layer above a front-side of a substrate; and a second set of bit lines extending in the first direction, being coupled to the second bank of memory cells, and being on at least a second metal layer below a back-side of the substrate opposite from the front-side of the substrate.

2. The memory cell array of claim 1, wherein the first bank of memory cells comprises:
a first pass-gate transistor of a first type, and the first pass-gate transistor including a first gate on a first level;
a second pass-gate transistor of the first type, and the second pass-gate transistor including a second gate on the first level; and
a first pair of cross-coupled inverters coupled to and between the first pass-gate transistor and the second pass-gate transistor.

3. The memory cell array of claim 2, wherein the second bank of memory cells comprises:
a third pass-gate transistor of a second type different from the first type, and the third pass-gate transistor including a third gate on a second level below the first level;
a fourth pass-gate transistor of the second type, and the fourth pass-gate transistor including a fourth gate on the second level; and
a second pair of cross-coupled inverters coupled to and between the third pass-gate transistor and the fourth pass-gate transistor.

4. The memory cell array of claim 3, further comprising:
a first word line extending in the first direction, being on the first metal layer, being coupled to the first pass-gate transistor and the second pass-gate transistor, and being configured to supply a first word line signal of the first bank of memory cells to the first pass-gate transistor and the second pass-gate transistor; and
a second word line extending in the first direction, being on the second metal layer, being separated from the first word line in at least a second direction different from the first direction, being coupled to the third pass-gate transistor and the fourth pass-gate transistor, and being configured to supply a second word line signal of the second bank of memory cells to the third pass-gate transistor and the fourth pass-gate transistor.

5. The memory cell array of claim 4, wherein
the first word line comprises:
a first conductor extending in the first direction, being coupled to the first pass-gate transistor, and being on the first metal layer; and
a second conductor extending in the first direction, being coupled to the second pass-gate transistor, being on the first metal layer, and being separated from the first conductor in the second direction; and
the second word line comprises:
a third conductor extending in the first direction, being coupled to the third pass-gate transistor, and being on the second metal layer; and
a fourth conductor extending in the first direction, being coupled to the fourth pass-gate transistor, being on the second metal layer, and being separated from the third conductor in the second direction.

6. The memory cell array of claim 5, wherein
the first bank of memory cells further comprises:
a first via electrically coupling the first conductor and the first gate together, the first via being between the first conductor and the first gate; and
a second via electrically coupling the second conductor and the second gate together, the second via being between the second conductor and the second gate; and the second bank of memory cells further comprises:
    a third via electrically coupling the third conductor and the third gate together, the third via being between the third conductor and the third gate; and
    a fourth via electrically coupling the fourth conductor and the fourth gate together, the fourth via being between the fourth conductor and the fourth gate.

7. The memory cell array of claim 3, wherein the first set of bit lines comprises:
    a first bit line extending in the first direction, being configured to receive a first bit line signal of the first bank of memory cells, being on the first metal layer, and being coupled to the first pass-gate transistor; and
    a first bit line bar extending in the first direction, being configured to receive a first bit line bar signal of the first bank of memory cells, being on the first metal layer, being coupled to the second pass-gate transistor, and being separated from the first bit line in a second direction different from the first direction; and
the second set of bit lines comprises:
    a second bit line extending in the first direction, being configured to receive a second bit line signal of the second bank of memory cells, being on the second metal layer, and being coupled to the third pass-gate transistor; and
    a second bit line bar extending in the first direction, being configured to receive a second bit line bar signal of the second bank of memory cells, being on the second metal layer, being coupled to the fourth pass-gate transistor, and being separated from the second bit line in the second direction.

8. The memory cell array of claim 7, wherein the first bank of memory cells further comprises:
    a first contact extending in the second direction, being on a third level above the front-side of the substrate, and being electrically coupled to a source/drain of the first pass-gate transistor; and
    a second contact extending in the second direction, being on the third level, the second contact being electrically coupled to a source/drain of the second pass-gate transistor; and
the second bank of memory cells further comprises:
    a third contact extending in the second direction, being on a fourth level different from the third level, and being electrically coupled to a source/drain of the third pass-gate transistor; and
    a fourth contact extending in the second direction, being on the fourth level, and being electrically coupled to a source/drain of the fourth pass-gate transistor.

9. The memory cell array of claim 8, wherein the first bank of memory cells further comprises:
    a first via electrically coupling the first bit line and the first contact together, the first via being between the first bit line and the first contact; and
    a second via electrically coupling the first bit line bar and the second contact together, the second via being between the first bit line bar and the second contact; and
the second bank of memory cells further comprises:
    a third via electrically coupling the second bit line and the third contact together, the third via being between the second bit line and the third contact; and a fourth via electrically coupling the second bit line bar and the fourth contact together, the fourth via being between the second bit line bar and the fourth contact.

10. The memory cell array of claim 3, wherein the first type is an N-type, and the second type is a P-type.

11. A memory cell array, comprising:
    a first bank of memory cells comprising a first memory cell;
    a second bank of memory cells adjacent to the first bank of memory cells, the second bank of memory cells comprising a second memory cell;
    a first bit line extending in a first direction, being coupled to at least the first memory cell, and being on at least a first metal layer or a second metal layer above a front-side of a substrate;
    a first bit line bar extending in the first direction, being coupled to at least the first memory cell, and being on at least the first metal layer or the second metal layer;
    a second bit line extending in the first direction, being coupled to at least the second memory cell, and being on at least a third metal layer or a fourth metal layer below a back-side of the substrate opposite from the front-side of the substrate; and
    a second bit line bar extending in the first direction, being coupled to at least the second memory cell, and being on at least the third metal layer or the fourth metal layer,
    wherein the first bit line and the first bit line bar overlap the first bank of memory cells and the second bank of memory cells, and
    the second bit line and the second bit line bar extend within the second bank of memory cells.

12. The memory cell array of claim 11, wherein the first memory cell comprises:
    a first pass-gate transistor of a first type, and the first pass-gate transistor including a first gate on a first level;
    a second pass-gate transistor of the first type, and the second pass-gate transistor including a second gate on the first level;
    a first inverter coupled to the first pass-gate transistor and the second pass-gate transistor; and
    a second inverter coupled to the first pass-gate transistor and the second pass-gate transistor.

13. The memory cell array of claim 12, wherein the second memory cell comprises:
    a third pass-gate transistor of a second type different from the first type, and the third pass-gate transistor including a third gate on a second level below the first level;
    a fourth pass-gate transistor of the second type, and the fourth pass-gate transistor including a fourth gate on the second level;
    a third inverter coupled to the third pass-gate transistor and the fourth pass-gate transistor; and
    a fourth inverter coupled to the third pass-gate transistor and the fourth pass-gate transistor.

14. The memory cell array of claim 13, wherein the first memory cell further comprises:
    a first dummy pass-gate transistor of the second type, the first dummy pass-gate transistor including a first dummy gate on the second level, and the first dummy pass-gate transistor being below the first pass-gate transistor; and
    a second dummy pass-gate transistor of the second type, the second dummy pass-gate transistor including a second dummy gate on the second level, and the second dummy pass-gate transistor being below the second pass-gate transistor, wherein the first pass-gate transistor and the first dummy pass-gate transistor are part of a first transistor stack; and the second pass-gate transistor and the second dummy pass-gate transistor are part of a second transistor stack.

15. The memory cell array of claim 14, wherein the second memory cell further comprises:

a third dummy pass-gate transistor of the first type, the third dummy pass-gate transistor including a third dummy gate on the first level, and the third dummy pass-gate transistor being above the third pass-gate transistor; and a fourth dummy pass-gate transistor of the first type, the fourth dummy pass-gate transistor including a fourth dummy gate on the first level, and the fourth dummy pass-gate transistor being above the fourth pass-gate transistor, wherein the third pass-gate transistor and the third dummy pass-gate transistor are part of a third transistor stack; and the fourth pass-gate transistor and the fourth dummy pass-gate transistor are part of a fourth transistor stack.

16. The memory cell array of claim 15, wherein the first memory cell further comprises:

a first gate isolation layer between the first gate and the first dummy gate; and a second gate isolation layer between the second gate and the second dummy gate; and the second memory cell further comprises:

a third gate isolation layer between the third gate and the third dummy gate; and a fourth gate isolation layer between the fourth gate and the fourth dummy gate.

17. The memory cell array of claim 15, further comprising:

a first word line extending in a second direction different from the first direction, being on the second metal layer, the second metal layer being different from the first metal layer, the first word line being coupled to the first pass-gate transistor and the second pass-gate transistor, and being configured to supply a first word line signal of the first bank of memory cells to the first pass-gate transistor and the second pass-gate transistor; and a second word line extending in the second direction, being on the fourth metal layer, being separated from the first word line in at least the first direction, being coupled to the third pass-gate transistor and the fourth pass-gate transistor, and being configured to supply a second word line signal of the second bank of memory cells to the third pass-gate transistor and the fourth pass-gate transistor.

18. The memory cell array of claim 11, further comprising:

a third bank of memory cells adjacent to the first bank of memory cells, the third bank of memory cells comprising a third memory cell; and a fourth bank of memory cells adjacent to the third bank of memory cells, the fourth bank of memory cells comprising a fourth memory cell;

wherein the third bank of memory cells is between the first bank of memory cells and the second bank of memory cells.

19. The memory cell array of claim 18, further comprising:

a third bit line extending in the first direction, being coupled to at least the fourth memory cell, and being on at least a fifth metal layer or a sixth metal layer above the front-side of the substrate;

a third bit line bar extending in the first direction, being coupled to at least the fourth memory cell, and being on at least the fifth metal layer or the sixth metal layer;

a fourth bit line extending in the first direction, being coupled to at least the third memory cell, and being on at least a seventh metal layer or an eighth metal layer below the back-side of the substrate opposite from the front-side of the substrate; and a fourth bit line bar extending in the first direction, being coupled to at least the third memory cell, and being on at least the seventh metal layer or the eighth metal layer, wherein the third bit line and the third bit line bar overlap the first bank of memory cells, the second bank of memory cells, the third bank of memory cells and the fourth bank of memory cells, and the fourth bit line and the fourth bit line bar extend in the first direction through the first bank of memory cells, the second bank of memory cells, and the third bank of memory cells.

20. A method of fabricating a memory cell array, the method comprising:

fabricating a first set of transistors and a second set of transistors in a front-side of a substrate, the first set of transistors being stacked above the second set of transistors, the first set of transistors including a first pass-gate transistor and a second pass-gate transistor of a first type;

fabricating a third set of transistors and a fourth set of transistors in the front-side of the substrate, the third set of transistors being stacked above the fourth set of transistors, the fourth set of transistors including a third pass-gate transistor and a fourth pass-gate transistor of a second type different from the first type;

fabricating a first set of vias on the front-side of the substrate, the first set of vias being electrically coupled to at least the first set of transistors or the second set of transistors;

depositing a first conductive material on the front-side of the substrate on a first metal level thereby forming a first set of conductors, the first set of conductors being electrically coupled to at least the first set of transistors or the second set of transistors by the first set of vias, the first set of transistors or the second set of transistors being configured to receive a first bit line signal from at least a first conductor of the first set of conductors from the front-side, and a first bit line bar signal from at least a second conductor of the first set of conductors from the front-side;

performing thinning on a back-side of the substrate opposite from the front-side;

fabricating a second set of vias on the back-side of the thinned substrate, the second set of vias being electrically coupled to at least the third set of transistors or the fourth set of transistors; and depositing a second conductive material on the front-side of the substrate on a second metal level thereby forming a second set of conductors, the second set of conductors being electrically coupled to at least the third set of transistors or the fourth set of transistors by the second set of vias, the third set of transistors or the fourth set of transistors being configured to receive a second bit line signal from at least a first conductor of the second set of conductors from the back-side, and a second bit line bar signal from at least a second conductor of the second set of conductors from the back-side.

\* \* \* \* \*